United States Patent
Kesler

(10) Patent No.: US 7,401,094 B1
(45) Date of Patent: *Jul. 15, 2008

(54) AUTOMATED GENERATION OF DYNAMIC DATA ENTRY USER INTERFACE FOR RELATIONAL DATABASE MANAGEMENT SYSTEMS

(76) Inventor: John N. Kesler, 1825 Nantucket Cir., #287, Santa Clara, CA (US) 95054

( * ) Notice: Subject to any disclaimer, the term of this patent is extended or adjusted under 35 U.S.C. 154(b) by 352 days.

This patent is subject to a terminal disclaimer.

(21) Appl. No.: 11/204,799

(22) Filed: Aug. 16, 2005

Related U.S. Application Data

(63) Continuation of application No. 10/040,851, filed on Dec. 28, 2001, now Pat. No. 7,062,502.

(51) Int. Cl.
*G06F 17/00* (2006.01)
(52) U.S. Cl. .................. 707/102; 707/4; 707/104.1
(58) Field of Classification Search ............... None
See application file for complete search history.

(56) References Cited

U.S. PATENT DOCUMENTS

| | | | |
|---|---|---|---|
| 4,631,664 A | 12/1986 | Bachman | |
| 5,428,776 A * | 6/1995 | Rothfield | 707/4 |
| 5,448,749 A | 8/1996 | Kroenke et al. | |
| 5,550,971 A | 8/1996 | Brunner et al. | |
| 5,553,218 A * | 9/1996 | Li et al. | 707/102 |
| 5,615,367 A | 3/1997 | Bennett et al. | |
| 5,701,453 A | 12/1997 | Maloney et al. | |
| 5,764,973 A | 6/1998 | Lunceford et al. | |
| 5,812,134 A | 9/1998 | Pooser et al. | |
| 5,819,264 A * | 10/1998 | Palmon et al. | 707/4 |
| 5,832,498 A | 11/1998 | Exertier | |
| 5,873,093 A | 2/1999 | Williamson et al. | |
| 5,905,985 A | 5/1999 | Malloy et al. | |
| 5,950,190 A * | 9/1999 | Yeager et al. | 707/3 |
| 5,966,707 A | 10/1999 | Van Huben et al. | |
| 5,986,673 A * | 11/1999 | Martz | 345/649 |
| 6,029,172 A | 2/2000 | Jorna et al. | |
| 6,035,300 A | 3/2000 | Cason et al. | |
| 6,058,391 A | 5/2000 | Gardner | |
| 6,069,627 A | 5/2000 | Conrad et al. | |
| 6,101,502 A | 8/2000 | Heubner et al. | |
| 6,266,675 B1 | 7/2001 | Evans et al. | |
| 6,374,252 B1 | 4/2002 | Althoff et al. | |
| 6,496,833 B1 | 12/2002 | Goldberg et al. | |
| 6,523,045 B1 * | 2/2003 | Beatty | 707/104.1 |
| 6,631,519 B1 | 10/2003 | Nicholson et al. | |
| 6,697,808 B1 | 2/2004 | Hurwood et al. | |
| 7,062,502 B1 * | 6/2006 | Kesler | 707/102 |
| 2003/0135825 A1 | 7/2003 | Gertner et al. | |

FOREIGN PATENT DOCUMENTS

WO   WO-02059792   8/2002

* cited by examiner

*Primary Examiner*—Chirstian P. Chace
*Assistant Examiner*—Jacques Veillard
(74) *Attorney, Agent, or Firm*—Jeffrey D. Myers; Peacock Myers, P.C.

(57) ABSTRACT

Computer software for, computer apparatus for, and a method of automatically generating a user interface for a relational database comprising extracting schema information from the relational database and automatically generating corresponding schema and user interface metadata, storing the metadata in a repository, and automatically developing from the metadata a user interface appropriate to the relational database.

21 Claims, 86 Drawing Sheets

Relational Database Normalization
The First 4 Normal Forms

1st Normal Form
Practical Rule: Eliminate Repeating Groups: Make a separate table for each set of related attributes, and give each table a primary key.

Formal Definition: A relation is in first normal form (1NF) if and only if all underlying simple domains contain atomic values only.

2nd Normal Form
Practical Rule: Eliminate Redundant Data: If an attribute depends on only part of a multi-valued key, remove it to a separate table.

Formal Definition: A relation is in second normal form (2NF) if and only if it is in 1NF and every non-key attribute is fully dependent on the primary key.

3rd Normal Form
Practical Rule: Eliminate Fields Not Dependent On Key: If attributes do not contribute to a description of a key, remove them to a separate table.

Formal Definition: A relation is in third normal form (3NF) if and only if it is in 2NF and every non-key attribute is non-transitively dependent on the primary key.

4th Normal Form
Practical Rule: Isolate Independent Multiple Relationships: No table may contain two or more one-to-many or many-to-many relationships that are not directly related.

Formal Definition: A relation R is in fourth normal form (4NF) if and only if, whenever there exists a multi-valued dependency in the R, say B depends on A, then all attributes of R are also functionally dependent on A.

Data Entry Control Decision Flowchart

| Line Item Input | | | | |
|---|---|---|---|---|
| Product | Quantity | Discount | Extended Price | |
| Boston Crab Meat | 5 | 0 | $92.00 | |
| Guaraná Fantástica | 25 | 0 | $90.00 | |
| Ravioli Angelo | 25 | 0 | $390.00 | |
| * | | | | |

Record (Filtered)  1 of 3

AUTOMATED GENERATION OF DYNAMIC DATA ENTRY USER INTERFACE FOR RELATIONAL DATABASE MANAGEMENT SYSTEMS

CROSS-REFERENCE TO RELATED APPLICATIONS

This application is a continuation application of U.S. patent application Ser. No. 10/040,851, filed on Dec. 28, 2001, and the specification thereof is incorporated herein by reference.

STATEMENT REGARDING FEDERALLY SPONSORED RESEARCH OR DEVELOPMENT

Not Applicable.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to computer database systems and more particularly to a data entry user interface used to populate a relational database with information.

2. Background Art

A glossary is presented in the GLOSSARY OF TERMS section below to facilitate a better understanding of the terms relevant to the present invention. Such terms are denoted by the use of italics.

Relational database management systems are well known in the prior art. A key characteristic of such systems is that data is organized and stored in tables in such a manner that various tables may be related to one another for the purpose of representing real world problems in the form of an organized data structure.

Relational databases are widely accepted in the modern business environment as a valuable tool to store information relating to an organization's business activities. But while relational database management systems provide an attractive way to organize and store data, they do not provide a convenient method to accept input from an end user for the purpose of populating the database with information.

A variety of commercial computer systems are available to provide user interfaces to relational databases. Such systems are typically developed to provide solutions to common business problems such as accounting systems for small businesses and inventory management systems for manufacturers.

However, a myriad of business problems cannot be solved with existing commercial computer systems. Many business problems are specific to a particular organization requiring a custom database structure to properly model each problem. It follows then that these custom database structures require custom user interfaces in order to populate the database with information.

Creating custom user interfaces for relational databases is a time consuming and costly process. At a high level, the process generally includes the following stages:

1. Analyze the business problem to define a set of requirements.
2. Design a data structure and a set of business rules to provide for the collection and storage of information relevant to the set of requirements defined in the previous stage.
3. Design a user interface within which users may navigate through the relational database to store and retrieve information subject to the set of business rules defined in the previous stage.
4. Create the user interface by writing computer code.
5. Test the user interface. Correct programming and design errors.
6. Implement and deploy the database and user interface.
7. Repeat stages 1 through 6 as new requirements evolve over time.

For small scale databases with approximately 25 or fewer tables, this process often requires a couple hundred hours of programming effort in addition to numerous resources necessary to gather requirements, test and deploy the system. For larger databases, the cost increases nearly in direct proportion with the size of the database. Needless to say, the cost of developing custom user interfaces is extremely expensive often prohibiting the development of such systems for many organizations.

Most data entry user interfaces are form-based in which a graphical representation of a form is presented on a video display. The form, which relates to the data being entered, contains a series of data entry controls that are used to collect data from the end user. These data entry controls typically attempt to provide the user with an intuitive data entry experience. For example, as illustrated in FIG. 1, when entering a Customer Order into the database, an edit box with a corresponding button might represent the Order Date. The user can enter a date into the edit box by: (1) using the keyboard or (2) clicking the button to obtain a calendar from which a date can then be selected.

A key problem arises with the form-based user interface depicted above in that if a new data element (i.e., field) is added to a table in the database, a new data entry control must be added to the table's corresponding form in the user interface. This modification requires further programming effort, additional testing, and a recompilation and redeployment of the user interface. So not only is the user interface extremely expensive to develop in the first place, it is also very costly to maintain over the lifetime of the database.

In order to dramatically reduce the cost and turnaround time of developing and maintaining data entry user interfaces for relational databases, it is desirable to generate the user interface, and more particularly the data entry forms, dynamically at run-time without the necessity of writing computer code. The user interface should also provide a mechanism by which users can conveniently navigate through the database for the purposes of entering and maintaining data. Finally, the user interface should be extensible so that a system administrator can modify the interface to provide users with a better data entry experience and to insure the integrity of data stored in the underlying database.

SUMMARY OF THE INVENTION

The present invention is of computer software embodied in a computer-readable medium for, computer apparatus for, and a method of automatically generating a user interface for a relational database comprising: extracting schema information from the relational database and automatically generating corresponding schema and user interface metadata; storing the metadata in a repository; and automatically developing from the metadata a user interface appropriate to the relational database. In the preferred embodiment, the schema and user interface metadata comprise entities, entity fields, entity relationships, and entity search paths. The entity relationships comprising one-to-many, many-to-one, and many-to-many relationships, and the automatically developed user interface comprises context menus specific to type of entity relationship. The schema and user interface metadata preferably additionally comprises platform attributes for abstracting syntactic differences between database implementations. The invention preferably additionally provides for addition of non-automatically-generated functionality to the developed user interface, such as scripts, external components, business rules, and/or triggers. The metadata in the repository is refreshable after schema changes are made to the relational database.

It is the primary object of the present invention to provide a method and system by which data entry forms for relational databases may be generated dynamically at run-time without the necessity of writing computer code to accomplish this task.

It is a further object of the present invention to provide a method and system by which end users may conveniently navigate through a relational database for the purposes of entering and maintaining data.

It is still a further object of the present invention to provide a method and system for the validation, insertion, update, and deletion of data.

Other objects of the present invention, including methods to provide application extensibility, will become apparent from the detailed description that follows.

GLOSSARY OF TERMS

For purposes of the specification and claims, the following terms in Table 1 are defined to have the following meanings:

TABLE 1

| TERM | DEFINITION |
| --- | --- |
| Boolean | A value that must be either TRUE (non 0) or FALSE (0). Some databases systems store Boolean values as a single bit. |
| Business Rule | The logical rules that are used to run a business. Business rules can be enforced through the user interface or in a database using triggers, stored procedures, and constraints. |
| Data Entry Control | Objects that are contained within data entry forms and are designed to display data and accept input from users. |
| Data Integrity | A state in which all the data values stored in the database are correct. If incorrect data values have been stored in a database, the database is said to have lost data integrity. |
| Datatype | An attribute that specifies what type (i.e. Boolean, text, number, date, etc) of information can be stored in a field. |
| Design Time | Anytime a computer programmer is building an application/user interface. |
| Extensible Markup Language (XML) | Extensible Markup Language (XML) is a meta-markup language that provides a format for describing structured data. This facilitates more precise declarations of content and more meaningful search results across multiple platforms. In addition, XML is enabling a new generation of Web-based data viewing and manipulation applications. |
| Field | In a database table, the area in each row that stores the data value for some attribute of the object modeled by the table. |

TABLE 1-continued

| TERM | DEFINITION |
| --- | --- |
| Foreign Key | The field or combination of fields whose values match the primary key (PK) or unique key in the same or another table. |
| Intersection Table | A table used to form a relationship between two or more indirectly related tables. |
| Metadata | Information about the properties of data, such as the type of data in a field (numeric, text, and so on) or the length of a field. It can also be information about the structure of data or information that specifies the design of objects such as tables and relationships. |
| NULL | An entry that has no explicitly assigned value. NULL is not equivalent to zero or blank. A value of NULL is not considered to be greater than, less than, or equivalent to any other value, including another value of NULL. |
| Primary Key | A field or set of fields that uniquely identify all the rows in a table. Primary keys do not allow null values. No two rows can have the same primary key value; therefore, a primary key value always uniquely identifies a single row. |
| Record | A group of related fields of information treated as a unit in a table. |
| Relational Database | A collection of information organized in related tables where each table consists of records and fields. |
| Relational Database Management System | A software system that supports relational databases. Well known examples are Microsoft Access, Microsoft SQL Server and Oracle. |
| Relationship | A link between tables that references the primary key in one table to a foreign key in another table. |
| Run-Time | Any time the user is actually running and interacting with the application/user interface. |
| Schema | A collection of database objects including tables, views, indexes, and foreign keys. |
| Stored Procedure | A precompiled collection of SQL statements stored under a name and processed as a unit. |
| Structured Query Language (SQL) | A language used to insert, retrieve, modify, and delete data in a relational database. |
| System Administrator | A generic term used throughout this document which refers to any person or persons who might perform business requirement analysis, database design and implementation duties, or make configuration changes to the metadata used by the present invention. |
| Table | A two-dimensional object, consisting of records and fields, used to store data in a relational database. |
| Table Join | As a verb, to combine the contents of two or more tables and produce a result set that incorporates rows and fields from each table. Tables are typically joined using data that they have in common. As a noun, the process or result of joining tables. |
| Unique Key Constraint | Constraints that enforce table integrity on a non-primary key. Unique constraints ensure that no duplicate values are entered in the fields, which compose the key. |
| View | A database object that can be referenced the same way as a table in SQL statements. Views are defined using a SELECT statement and are analogous to an object that contains the result set of this statement. |

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 3 summarizes the first 4 Forms of Normalization.

FIG. 23 depicts selecting the Promote Customer menu option.

FIG. 40 depicts the Data Entry Grid for the Line Item entity.

FIG. 52 depicts the NotesControl data entry control.

FIG. 63 illustrates modification of the control type for the Ship Address field in the Customer Order entity.

FIG. 80 illustrates setting the Ship Address foreign key on the Customer Order data entry form.

DETAILED DESCRIPTION OF THE INVENTION

As alluded to above, the high cost of developing and maintaining data entry user interfaces in the prior art is largely attributed to the tight coupling of data entry forms with the structure of the underlying relational database. This problem is further aggravated by the common practice of hard coding navigation, business rules and Structured Query Language (SQL) into the source code of the user interface, thus requiring a recompilation and redeployment of the user interface software when modifications to the database structure and/or changes to business logic are made.

Figure 2:
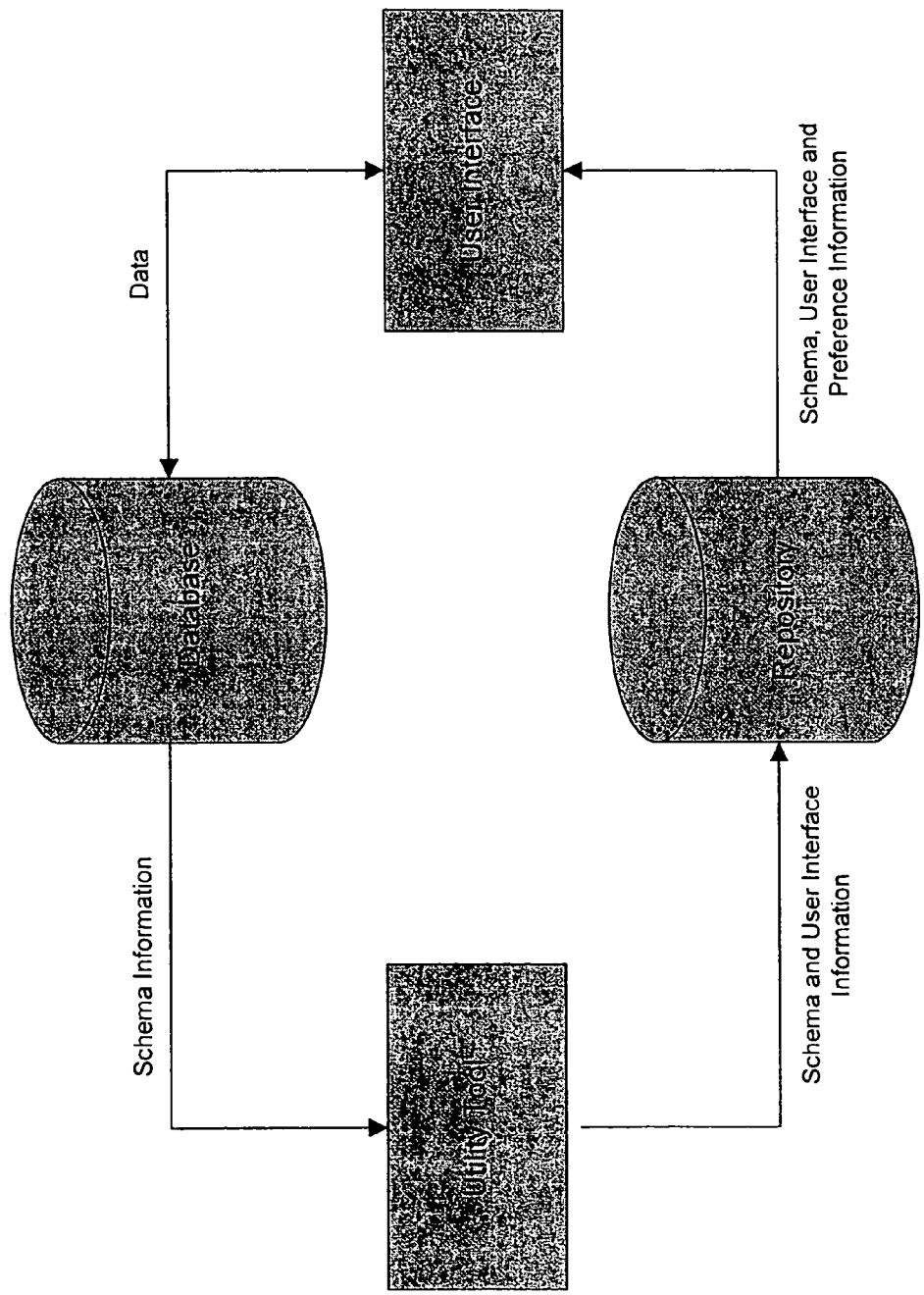
FIG. 2 depicts the high-level architecture implemented by the invention.

To overcome this problem, the present invention proposes the high level architecture depicted in FIG. 2. Under this architecture, a utility program (the "Utility Tool") interprets database schema information from the relational database. Information gleaned from the schema is used to populate a configuration repository with metadata.

This metadata is then utilized by the user interface (the "UI") to: (1) generate data entry forms, (2) provide a method of navigation through the database, including menus and sophisticated searching functionality and (3) provide a mechanism for the validation, insertion, update and deletion of data.

A key principal behind the present invention is that the structure, or schema, of a relational database provides a significant amount of useful information with respect to the data entry user interface. While it is theoretically possible to generate a user interface directly from the database schema without the use of a configuration repository, the layer of abstraction offered by the repository has numerous advantages. These advantages will be explored in depth in the remainder of this document.

In one embodiment, the present invention utilizes personal computer-based client/server architecture for the purpose of providing data entry access to a relational database. Insofar as a single personal computer (PC) can act as both client and server, it is perfectly acceptable to deploy the data entry interface and the relational database on a standalone PC. In addition, all user interaction is possible using either a keyboard or a mouse.

As web interface technology matures, other embodiments of the present invention, using very similar if not identical architecture, might well be implemented over the Internet. Under such embodiments, the "server" might be any set of computers on the Internet that look like a single database to the client. The "client" might be any computer on the Internet running one of several commercially available browsers.

The relational database should meet the following requirements:

1. Each table should have a single integer field which serves as its primary key. This requirement, a common practice in the database development community, does not preclude the use of unique key constraints on fields that compose the logical primary key, such as the social security number for a table of employees. Among other advantages, this requirement simplifies table joins by insuring that the primary key of the first table in the join is composed of a single field of the same datatype as the foreign key in the second or related table.
2. Relationships between tables should be established using foreign keys.
3. A view should be created for each table in the database. The view represents the physical table throughout the UI for the purposes of searching and displaying data. The view should include the primary key of the underlying table. The main objective of this requirement is to present users with formatted data using intuitive column names as opposed to unformatted data using cryptic database field names.

While not a requirement, it is highly recommended that the relational database be in at least $3^{rd}$ Normal Form. Normalization is widely accepted as a systematic methodology by which redundancy can be removed from relational database structures. For the reader's convenience, the first 4 Forms of Normalization are summarized in FIG. 3.

Relational Database Example

Figure 4:
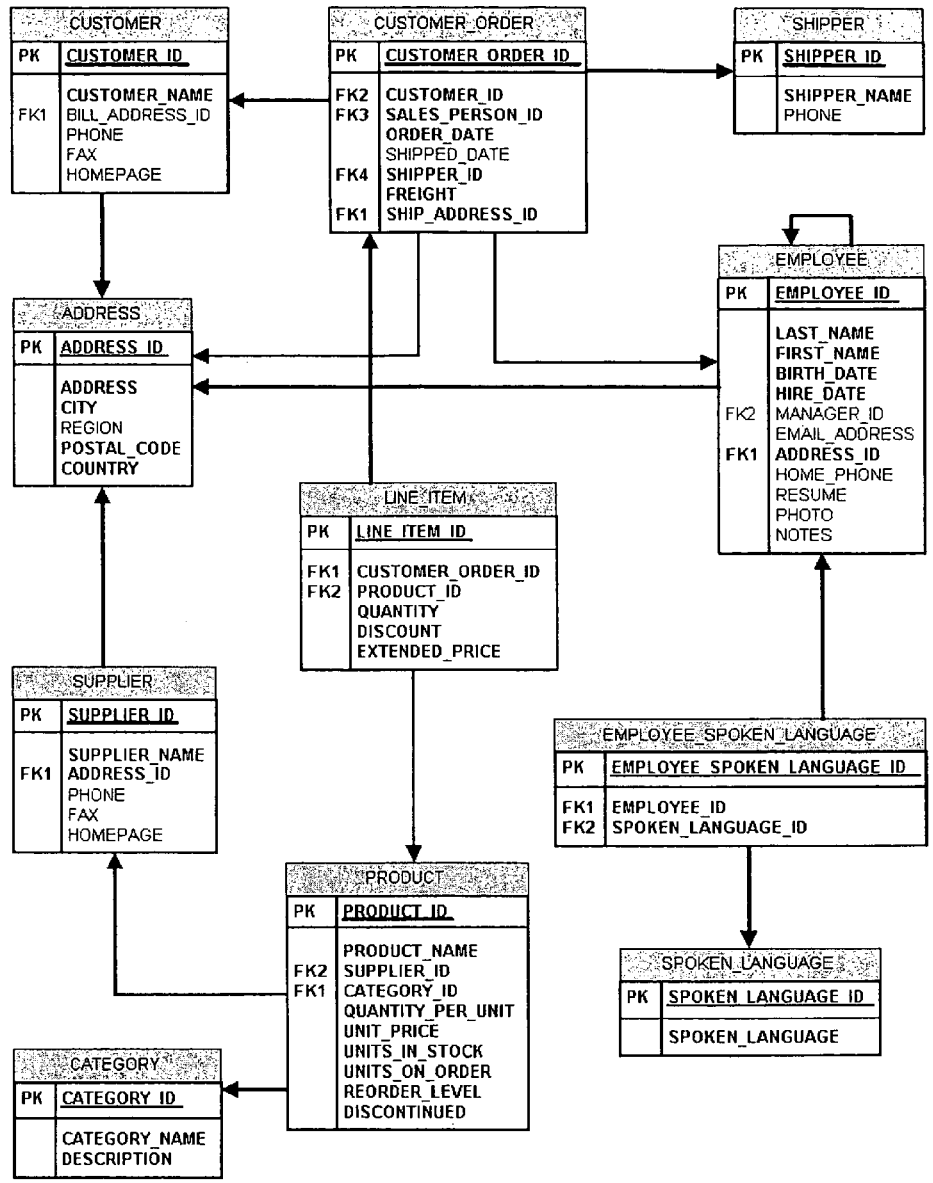
FIG. 4 depicts the Entity Relationship Diagram for the example database.

In order to help the reader better understand the present invention, an example will used throughout the remainder of the detailed description. An Entity Relationship Diagram (ERD) for the example is presented in FIG. 4. The arrows point from the foreign key table to the primary key table. For example, the CUSTOMER_ORDER table relates to the CUSTOMER table on the CUSTOMER_ID field. CUSTOMER_ORDER is the foreign key table. CUSTOMER is primary key table.

The example is a simple order entry database for a fictional company, ACME Grocery Supply, in which:

Each Customer is assumed to have one Billing Address.

Each Customer Order is taken by an Employee (i.e. Sales Person).

Each Customer Order consists of one or more Line Items.

Each Customer Order is assumed to have a single Shipping Address regardless of the number of Line Items.

Each Line Item is for a single Product. The Unit Price of a Product may be discounted on the Line Item by entering a Discount percentage.

Products are supplied by Suppliers and grouped into Categories.

The fictional company is assumed to do business on an international basis. Consequently, each Employee may speak one or more Spoken Languages.

Employees may have a Manager who is also an Employee. However, Employees cannot manage themselves.

The example database has been designed to help illustrate the fundamental principles of the present invention. With one exception, the database is in $4^{th}$ Normal Form. The lone exception has to do with the implementation of the ADDRESS table. The ADDRESS table violates normalization rules in that it contains redundancy. However, in order to simplify and limit the size and complexity of the example, Addresses have not been normalized.

Other liberties have been taken to limit the size and complexity of the example. For example, a more realistic implementation of the PRODUCT table would track price changes over time. However, the example is not intended to accurately model the real world problem of designing order entry systems. Instead, its purpose is to illustrate common database principles with respect to the present invention.

The Configuration Repository

Instead of tightly coupling the user interface with the relational database, a configuration repository is used to present a layer of abstraction between the database and the user interface. The configuration repository consists of highly structured metadata. The metadata is organized in the following manner:

Entities

Physical database tables are represented by "entities". A single table may be represented by more than one entity through a technique called "aliasing". For example, separate entities might be defined to distinguish between domestic and international Customers even though a single table, CUSTOMER, is used to store all Customer data.

A special type of entity, called a "reference entity", exists for entities that are mostly incidental to the overall business purpose behind the relational database. Reference entities help to categorize or describe data in other entities. For example, Categories help to logically organize and describe groups of related Products. But it is unlikely that most end users will ever need to interact directly the underlying CATEGORY table. Therefore, reference entities are treated differently in the UI. These differences will be made apparent in the remaining sections of this document.

Throughout the UI, with the exception of data entry forms, data relating to entities is supplied through database views. Database views provide users with easy-to-read column names and formatted data. For example, the view assigned to the Employee entity might concatenate the LAST_NAME and FIRST_NAME fields from the EMPLOYEE table into a single column, EmployeeName, as in the following example depicted in Table 2 and Table 3:

TABLE 2

| FIRST_NAME | LAST_NAME |
|---|---|
| Jane | Doe |

Becomes:

TABLE 3

| EmployeeName |
|---|
| Doe, Jane |

Searching is performed against view columns rather than table fields. Similarly, search results are presented in the form of data lists, which consist of a collection of view columns.

Entity Fields

"Entity fields" represent fields within database tables. Each entity field is assigned a single data entry control. The metadata relating to each entity field defines the behavior of its corresponding data entry control. Data entry forms consist of an ordered collection of data entry controls defined by the entity field metadata.

Logical entity fields may be defined to derive values that are not actually stored in table fields. For example, it might be desirable to display a Product's Unit Price on the Line Item data entry form even though a corresponding field does not exist in the LINE_ITEM table. A special data entry control, called a Calculated Control, may be defined to retrieve and display the Unit Price for the currently selected Product. This example will be illustrated under the USER INTERFACE GENERATION section.

Entity Relationships

Relationships between database tables, implemented through foreign keys in the database, are represented by "entity relationships". In the configuration repository, two entity relationships are generated for each foreign key defined in the database schema. For example, the PRODUCT_ID foreign key in the LINE_ITEM table would generate one relationship from the perspective of the foreign key table, LINE_ITEM, and one from the perspective of the related table (or primary key table), PRODUCT as shown in Table 4:

TABLE 4

| Relationship | Relationship Type |
|---|---|
| LINE_ITEM.PRODUCT_ID = PRODUCT.PRODUCT_ID | Many-To-One |
| PRODUCT.PRODUCT_ID = LINE_ITEM.PRODUCT_ID | One-To-Many |

There are three types of entity relationships: One-To-Many, Many-To-One, and Many-To-Many. The first relationship in the table above is of relationship type Many-To-One, as are all relationships from the perspective of the foreign key table. The second relationship in the table is of type One-To-Many, as are all relationships from the perspective of the related table.

Many-To-Many relationships are reserved for a special case in which it is desirable to form a direct logical relationship between two indirectly related entities, such as Employee and Spoken Language. This type of relationship will be explored in more detail later.

Entity relationships provide metadata to support two key pieces of functionality in the UI: (1) navigation and (2) dynamically generated SQL.

Entity Search Path

From the perspective of a particular entity, the "search path" defines the collection of directly and indirectly related entities that may be searched with respect to the entity. The entity search path is a subset of all entity relationships in the configuration repository. For example, to obtain a list of Customers who bought one or more Products from a specific Sales Person, the list of entity relationships in Table 5 must be defined on the search path of the Customer entity:

TABLE 5

| Relationship | Relationship Type |
|---|---|
| CUSTOMER.CUSTOMER_ID = CUSTOMER_ORDER.CUSTOMER_ID | One-To-Many |
| CUSTOMER_ORDER.CUSTOMER_ORDER_ID = LINE_ITEM.CUSTOMER_ORDER_ID | One-To-Many |
| CUSTOMER_ORDER.SALES_PERSON_ID = EMPLOYEE.EMPLOYEE_ID | Many-To-One |
| PRODUCT.PRODUCT_ID = LINE_ITEM.PRODUCT_ID | One-To-Many |

The entity search path also resolves circular loops that might otherwise exist between two entities. For example, two paths exist from the Customer entity to the Address entity. One path, which corresponds to the billing address, flows directly from the Customer entity to the Address entity via the BILL_ADDRESS_ID foreign key. A second path, corresponding to the shipping address, flows indirectly from the Customer entity to the Address entity through the Customer Order entity via the SHIP_ADDRESS_ID foreign key. Consequently, a circular loop exists between the Customer and Address entities:

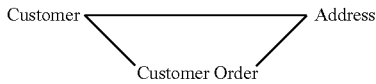

In order to allow searching of both billing and shipping addresses with respect to the Customer entity, this loop must be resolved. This can be accomplished by aliasing the Address entity into a new entity called Shipping Address. This results in the search path in Table 6 for the Customer entity:

TABLE 6

| Relationship | Relationship Type |
| --- | --- |
| CUSTOMER.CUSTOMER_ID = CUSTOMER_ORDER.CUSTOMER_ID | One-To-Many |
| CUSTOMER.BILL_ADDRESS_ID = ADDRESS.ADDRESS_ID | One-To-Many |
| CUSTOMER_ORDER.SHIP_ADDRESS_ID = ADDRESS_1.ADDRESS_ID | One-To-Man |

The aliased Address entity, Shipping Address, which corresponds to the logical table ADDRESS_1 in the third relationship above, resolves the circular loop by creating the illusion of two distinct instances of the physical ADDRESS table in the underlying database.

Another way to resolve this circular loop is to simply include Address information in the database views for both the Customer and Customer Order entities. Searching for shipping address information can then be performed against the Customer Order entity directly.

Entity and Entity Relationship Permissions

Data entry and navigation functionality in the UI are provided through "pop-up" menus. These menus are generated dynamically from metadata stored in the configuration repository. The metadata associated with menus is "predefined" in the sense that it is not derived from the database schema but instead built into the UI architecture. As will be demonstrated throughout the remainder of this document, the type of menu shown to a user at any given point is determined by the "menu context". The menu context simply describes the point from within the UI where the end user requests a menu.

As will be shown, menu contexts are tightly coupled to entities and entity relationships. Thus, permissions that provide access to menu options (stored as metadata) are granted at the entity and entity relationship level.

Platforms and Platform Attributes

Syntactic differences between various database systems such as Oracle and Microsoft SQL Server must be accounted for. The configuration repository contains a set of predefined metadata that provides a layer of abstraction between the UI and specific database systems (referred to as "platforms" within the metadata structure). One example of a syntactic difference between platforms would be the date delimiter used in SQL expressions. Consider the following SQL statement, which works fine against SQL Server but would fail against Microsoft Access:

SELECT * FROM CUSTOMER_ORDER WHERE ORDER_DATE BETWEEN '1-1-1998' AND '12-31-1998'

SQL Server uses the single-quote symbol to delimit dates whereas Microsoft Access uses the # symbol.

To account for such differences between database platforms, a set of attributes are defined which specify the various symbols and formats used by each platform. In this way, SQL can be generated generically by the UI as the following modified version of the above SQL statement shows:

SELECT * FROM CUSTOMER_ORDER
WHERE ORDER_DATE BETWEEN [DATE_DELIMITER]1-1-1998[DATE_DELIMITER]
AND [DATE_DELIMITER]12-31-1998[DATE_DELIMITER]

The "[DATE_DELIMITER]" placeholder is replaced by the appropriate symbol before the SQL statement is executed.

Another advantage of abstracting syntactic differences between database systems is that the Utility Tool and UI may be used to access new database systems by simply adding metadata to the platform and platform attribute structure.

User Interface Architecture

Figure 5:
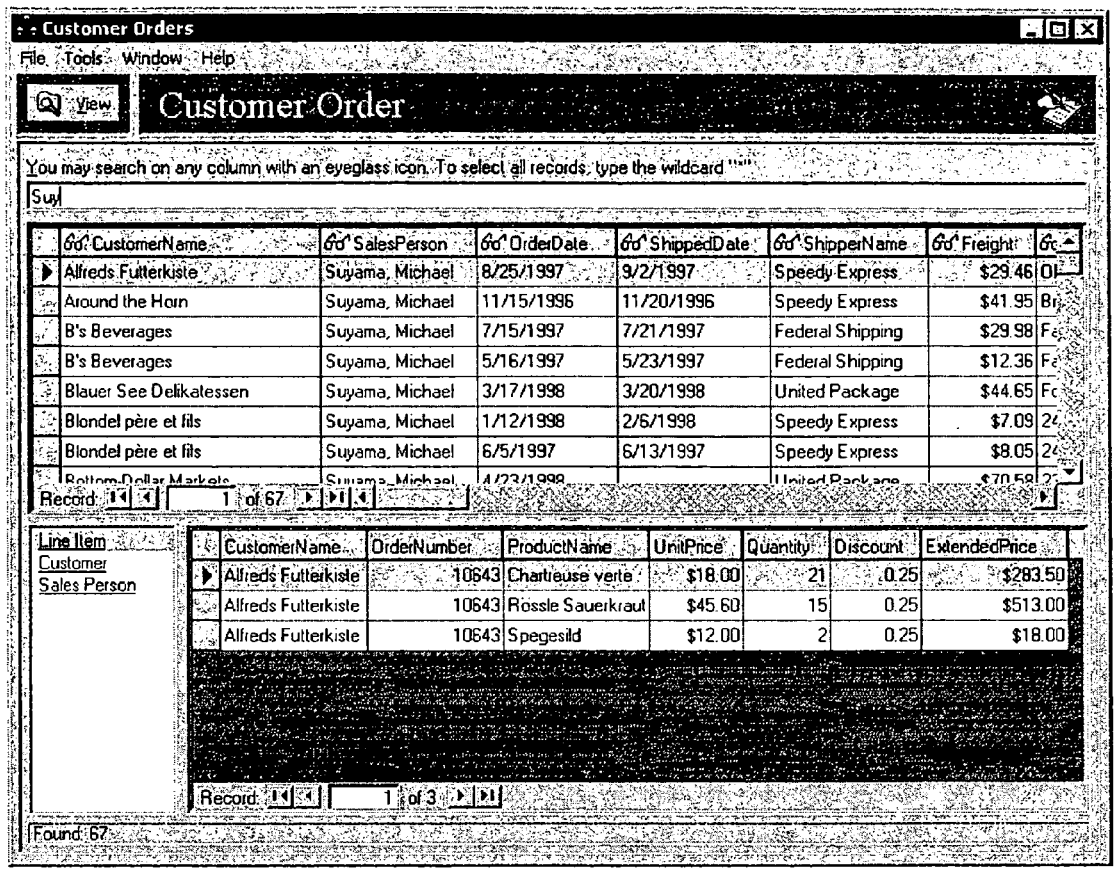
FIG. 5 depicts the parent-child paradigm implemented by the user interface.
Figure 6:
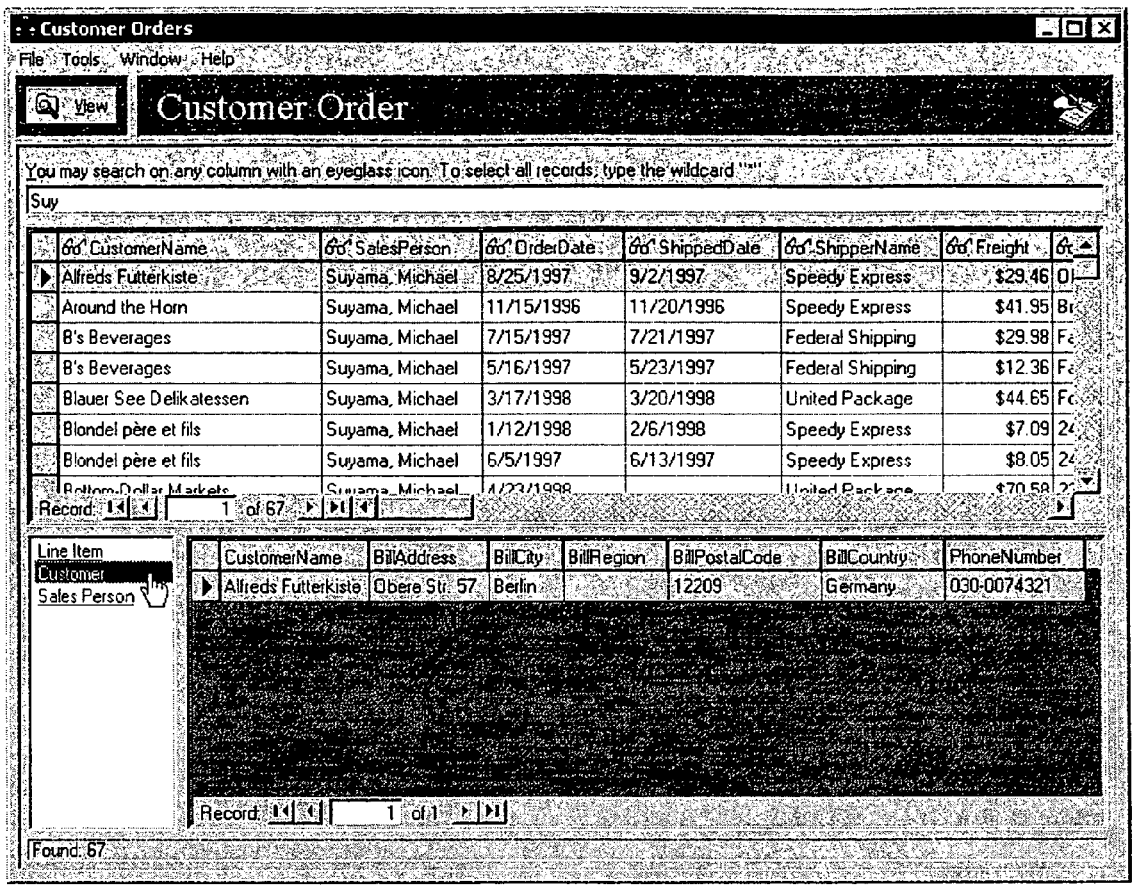
FIG. 6 depicts selecting a child entity.

The UI architecture is tightly coupled with the structure of the metadata relating to entities, entity fields, entity relationships, and entity search paths. In particular, the architecture takes advantage of the inherent parent-child paradigm offered by the entity-entity relationship structure. FIG. 5 illustrates this paradigm quite clearly by presenting the main screen of the UI. On the top portion of the screen, we see that the focus of the interface is with respect to the Customer Order entity. On the bottom left side of the screen, we see a list of related entities (exclusive of reference entities, a detail that will be discussed momentarily). Under the current context of the interface, Customer Order is the "parent" entity. The list of related entities are called "children". This list is derived from the entity relationships that are defined for the Customer Order entity. The currently selected child is Line Item. In FIG. 6, the selected child has been switched to Customer.

Figure 7:
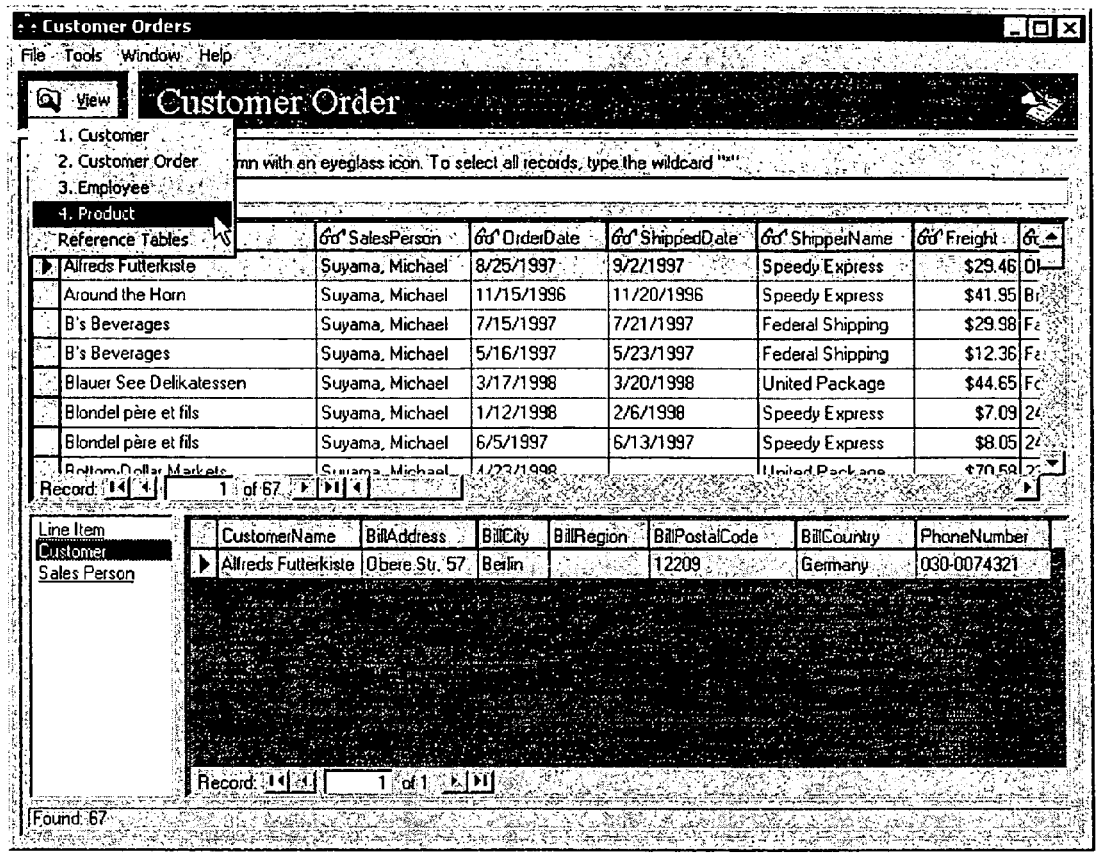
FIG. 7 depicts the View Menu in the user interface.

The parent entity may be changed by selecting a different entity through the View menu depicted in FIG. 7.

Note that data display is list-driven. As mentioned earlier, all data lists are based on database views. In FIG. 5, a list of Customer Orders is shown on the top half of the screen. This list is the result of a "quick-text search" which will be discussed shortly. A list of Line Items for the currently selected Customer Order is displayed on the bottom half of the screen. The architecture attempts to maximize the amount of information displayed with the effective use of data lists in conjunction with the parent-child entity paradigm. Switching the selected child entity results in a filtered list of information relating to the newly selected child. Regardless, of the type of relationship between parent and child entities (i.e. One-To-Many, Many-To-One, or Many-To-Many), child data lists are filtered according to the currently selected record for the parent entity. This is accomplished through dynamic SQL generation.

It is not necessary to display reference entities as children of a parent entity since it is assumed that fields of interest from these reference entities are included in the database view for the corresponding parent entity. For example, notice that the Customer Order view in FIG. 5 includes the ShipperName in the data list but does not include Shipper as a child entity. Shipper has been defined as a reference entity.

Figure 8:
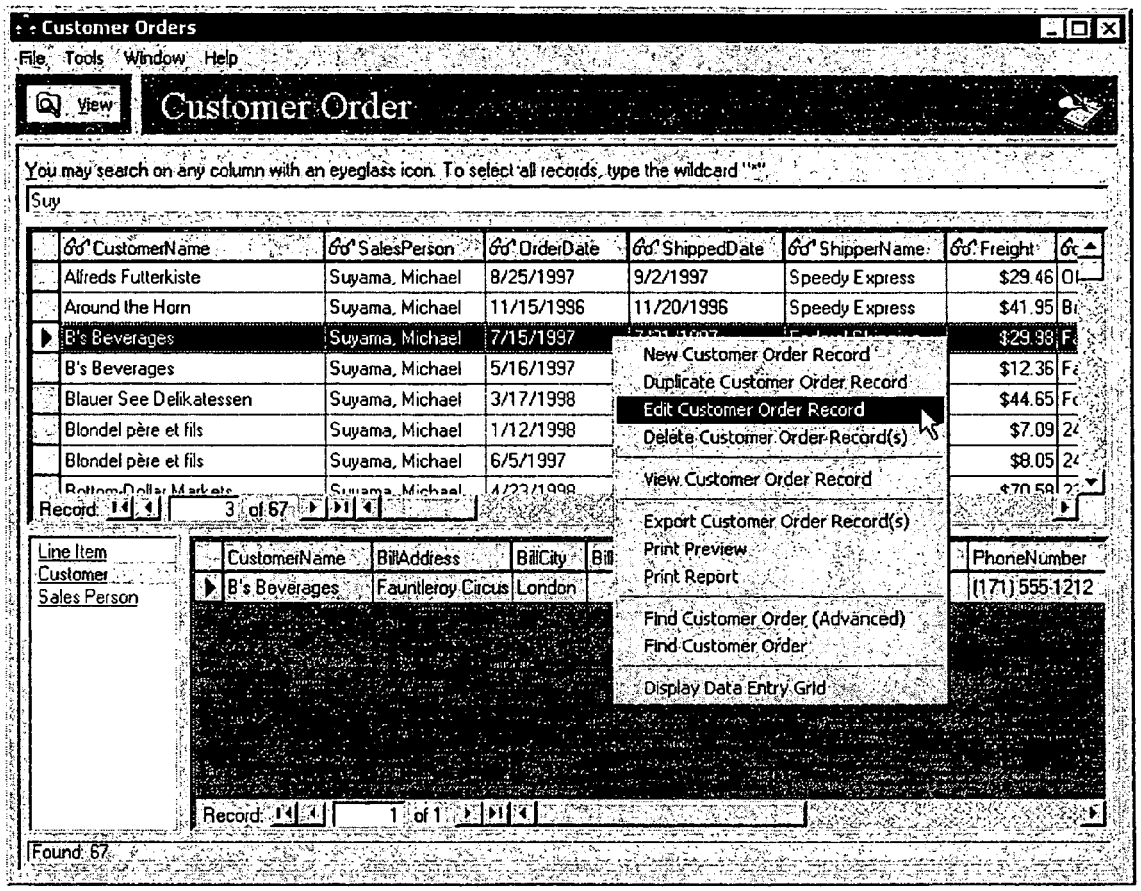
FIG. 8 depicts the Parent context menu.
Figure 9:
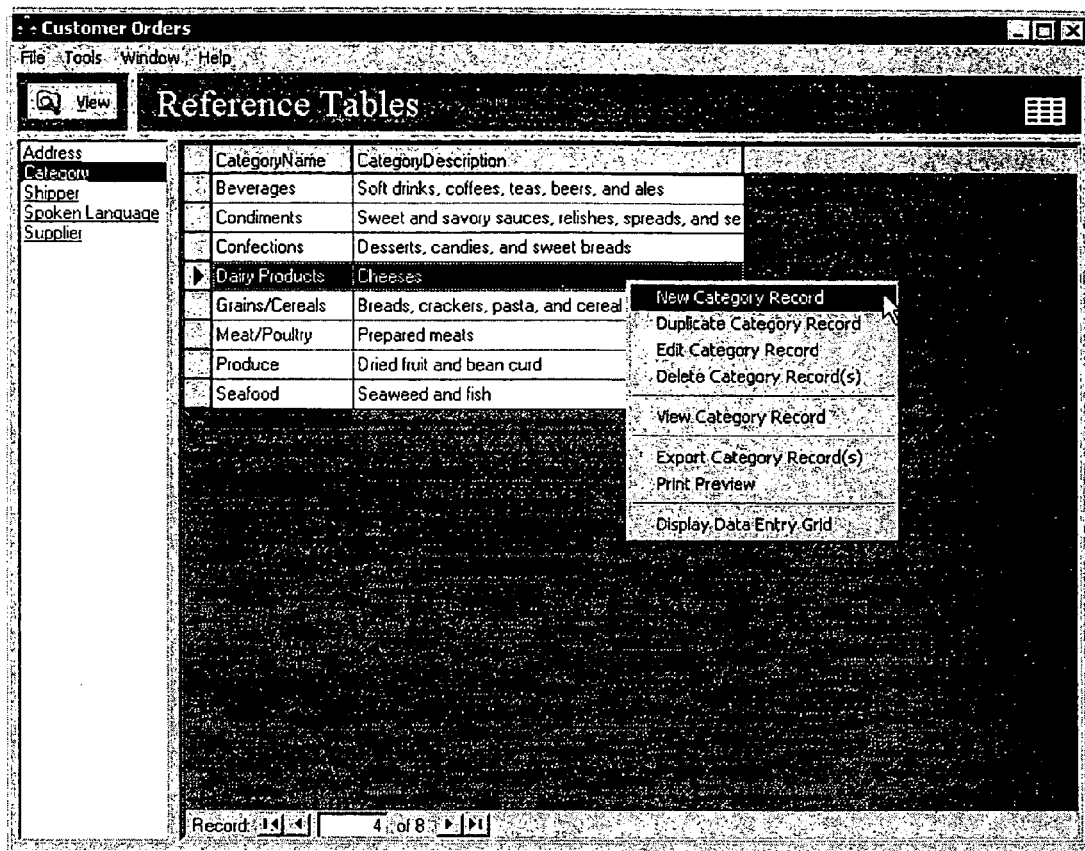
FIG. 9 depicts the Reference context menu.
Figure 10:
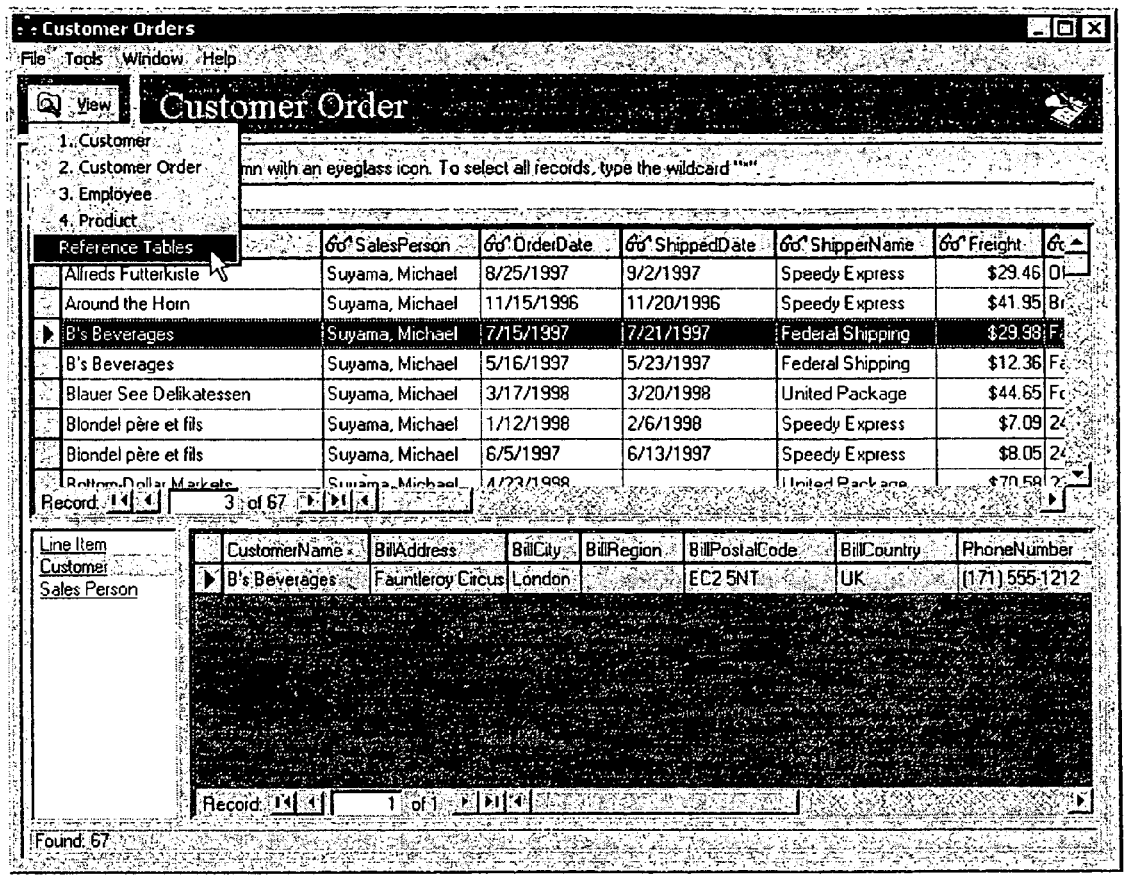
FIG. 10 depicts access to Reference Tables through the View Menu.

Data entry and navigation functionality are accessed through dynamically constructed menus. Menus are generated from data lists by right-mouse clicking on the list or using the CTRL-M key combination on the keyboard. The list of options available on a menu depends upon the context from which the end user accesses the menu within the UI. There are five menu contexts:

1. Parent: FIG. 8 depicts a Parent context menu for the Customer Order parent entity. Several options deal with data entry (e.g. New, Edit, Duplicate, Delete, and View) while others deal with searching functionality (Find and Find (Advanced)). Still others deal with extracting information in the form of an export, print preview of the data list, or a predefined report using a report writer such as Crystal Reports or BusinessObjects®.
2. Reference: The Reference context menu applies to the data list depicted in FIG. 9. This data list is located in the Reference Tables area, which is accessed through the View menu (see FIG. 10). With the exception of the Export and Print Preview options, all options on this menu have to do with data entry.
3. One-To-Many: The One-To-Many context menu applies to child entities only. The context name, One-To-Many, corresponds to the type of relationship that exists between parent and child entities.
4. Many-To-One: The Many-To-One context menu applies to child entities only. The context name, Many-To-One, corresponds to the type of relationship that exists between parent and child entities.
5. Many-To-Many: The Many-To-Many context menu applies to child entities only. The context name, Many-To-Many, corresponds to the type of relationship that exists between parent and child entities.

Figure 11:
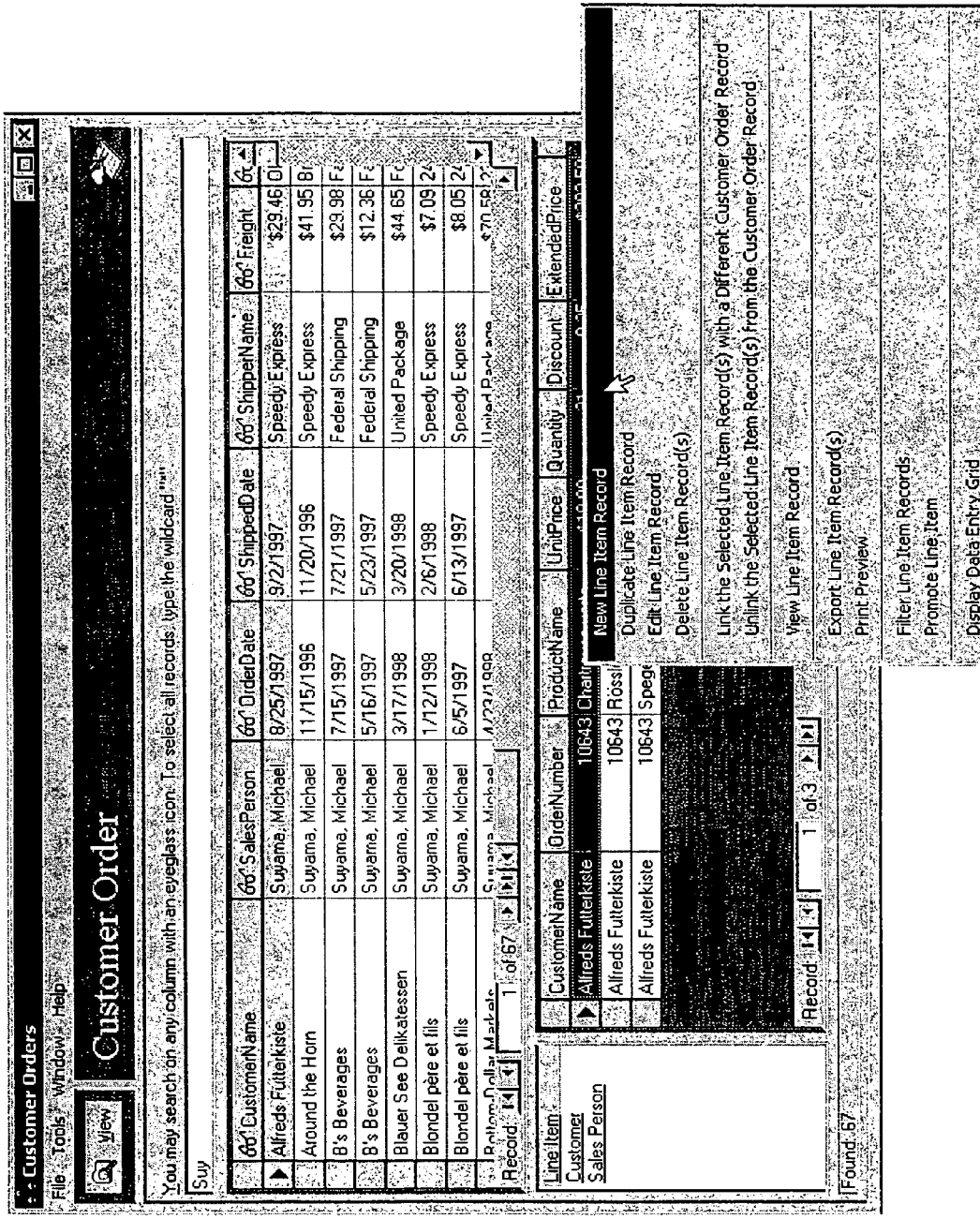
FIG. 11 depicts the One-To-Many context menu.
Figure 12:
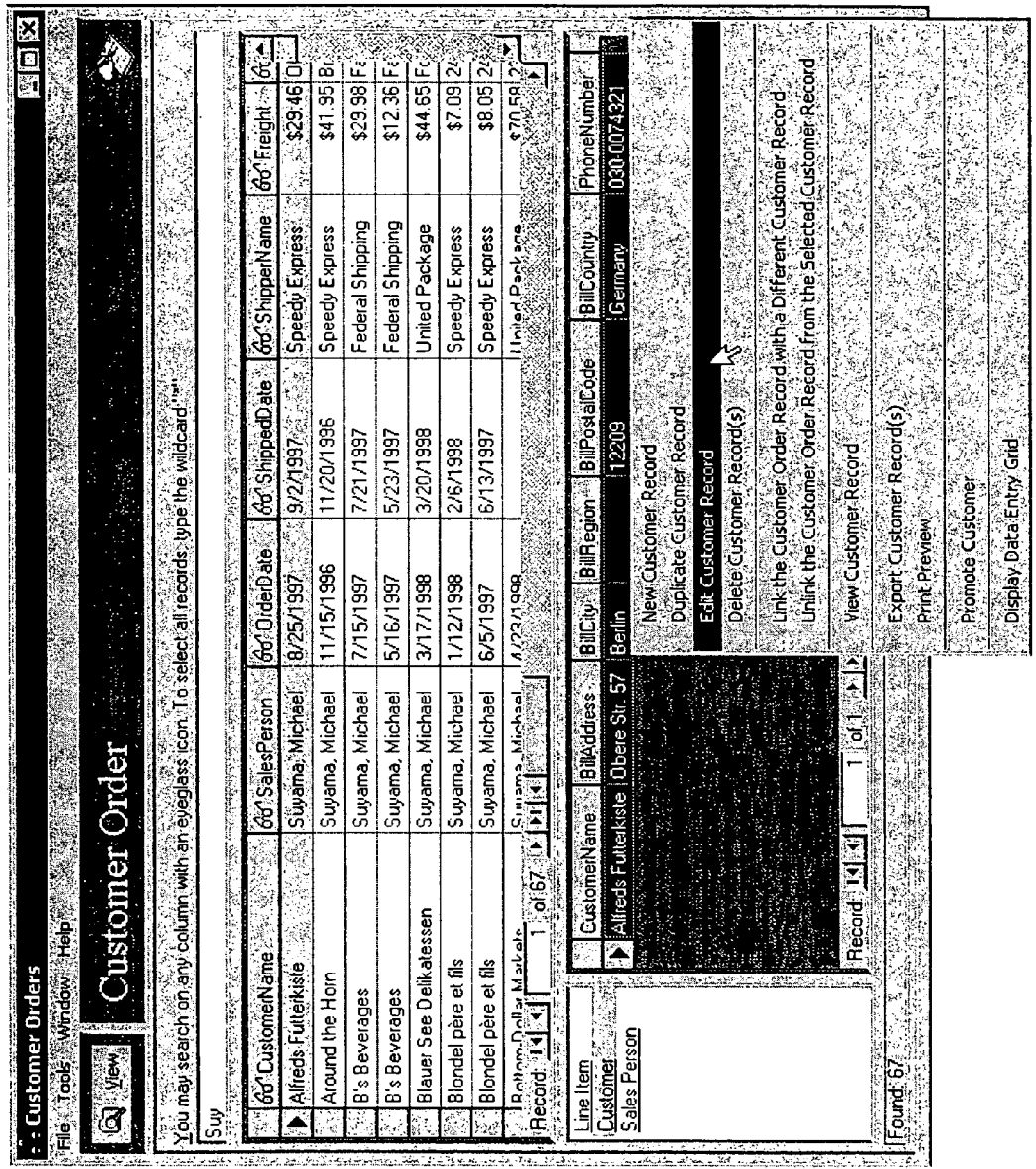
FIG. 12 depicts the Many-To-One context menu.
Figure 13:
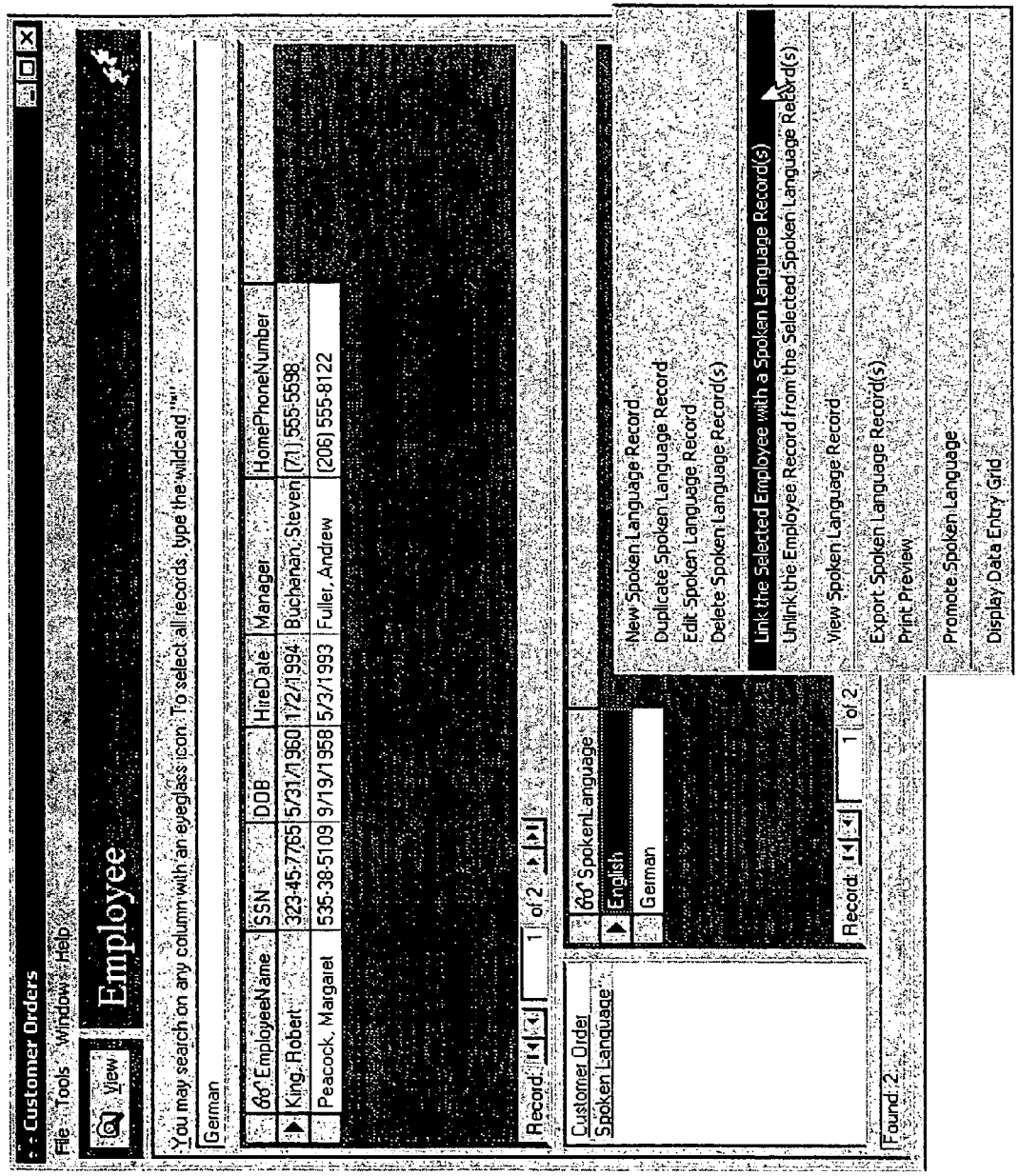
FIG. 13 depicts the Many-To-Many context menu.
Figure 14:
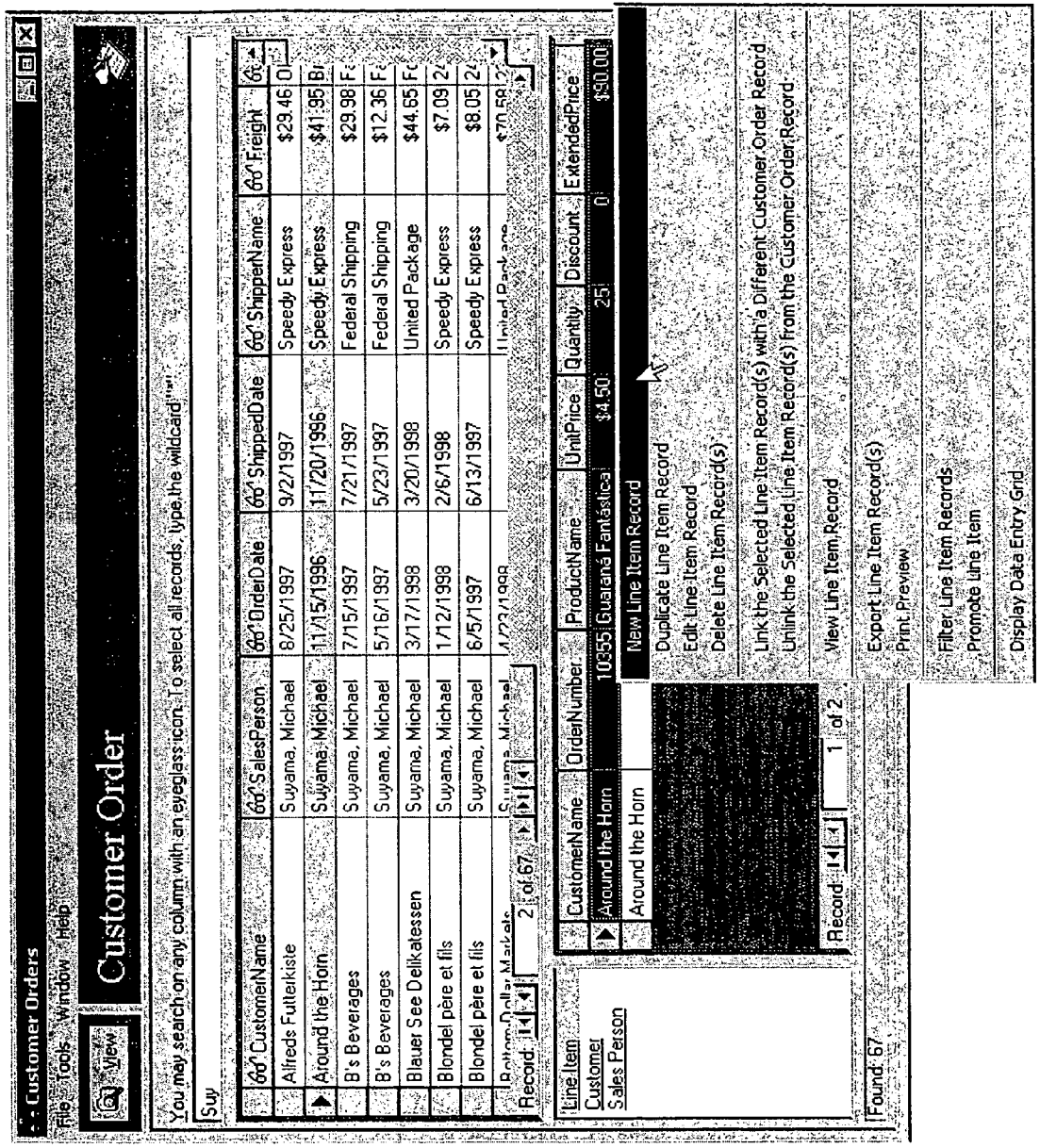
FIG. 14 depicts selection of New Line Item One-To-Many menu option.
Figure 15:
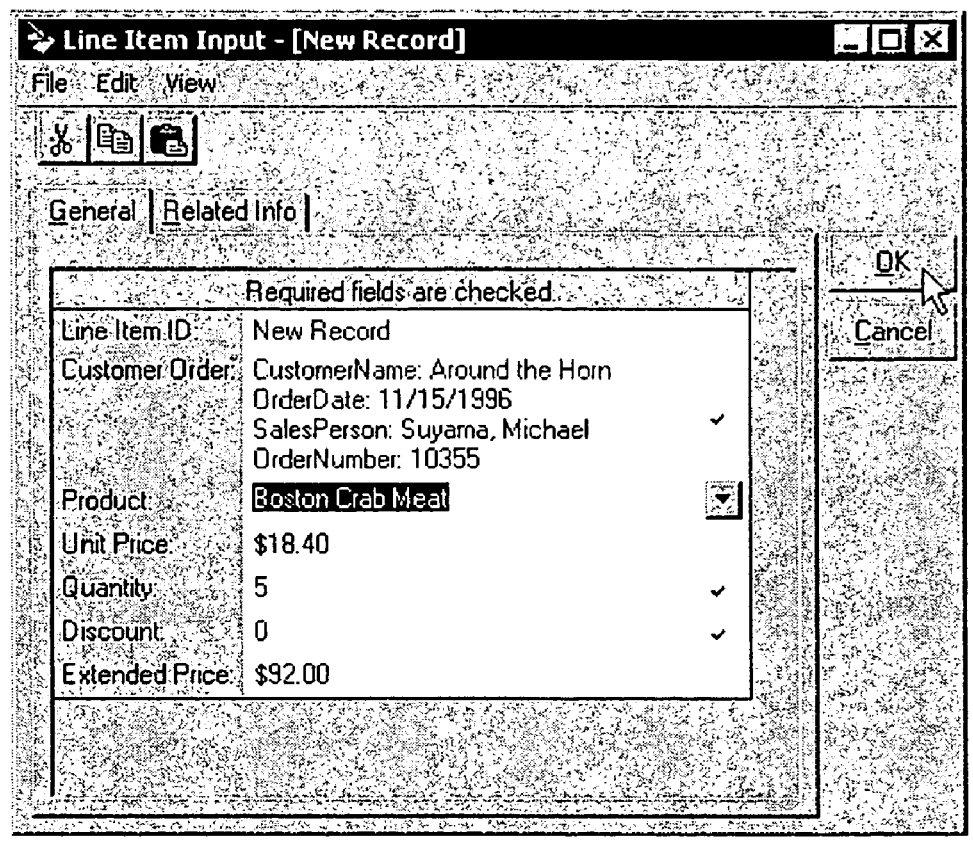
FIG. 15 depicts entering data on the Line Item data entry form.
Figure 16:
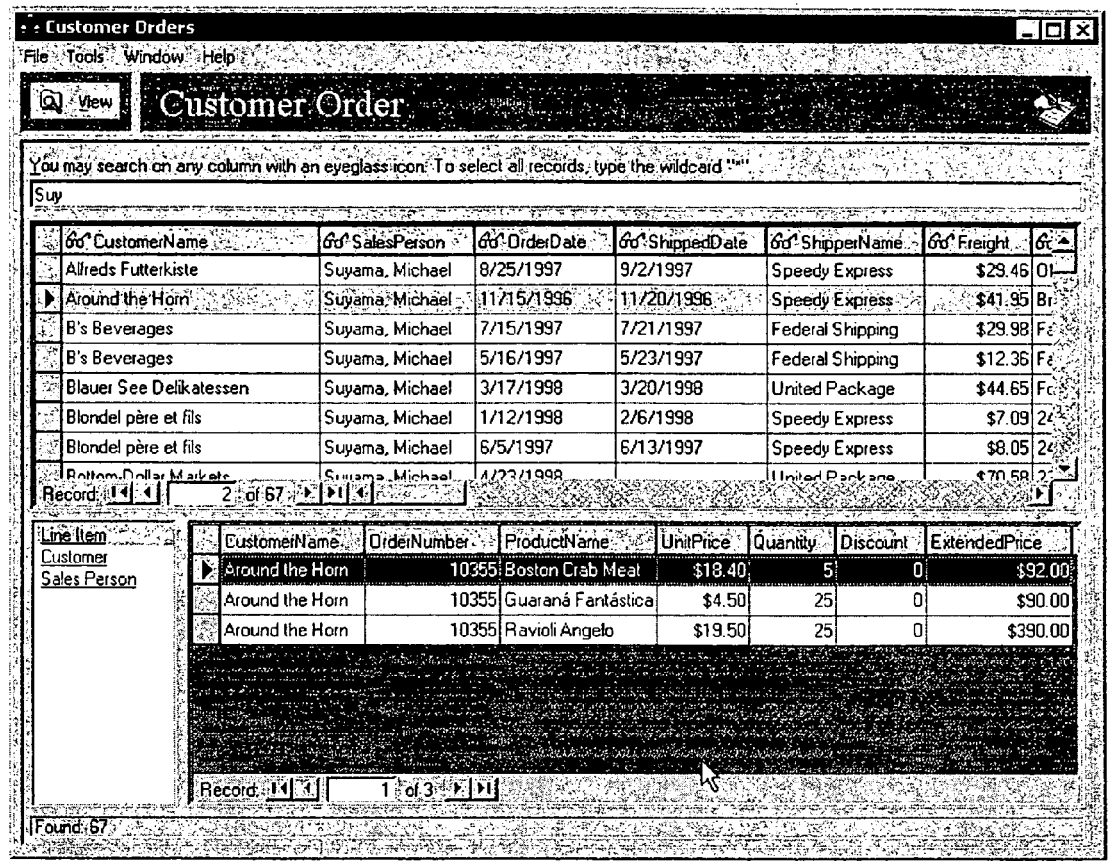
FIG. 16 depicts the newly added Line Item record.

Menu options for the last three menu contexts are depicted in FIGS. 11-13. While the individual menu options are nearly identical for each of these three contexts, the functionality behind the options differs significantly. For example, FIGS. 14-16 illustrate the process of adding a new Line Item to a Customer Order. With Customer Order as the parent entity, the dynamically generated data entry form for the Line Item entity is able to automatically populate the Customer Order field, which maps to the CUSTOMER_ORDER_ID foreign key in the LINE_ITEM table. This is possible because the primary key value, from the selected Customer Order record in the parent data list, is known.

Figure 17:
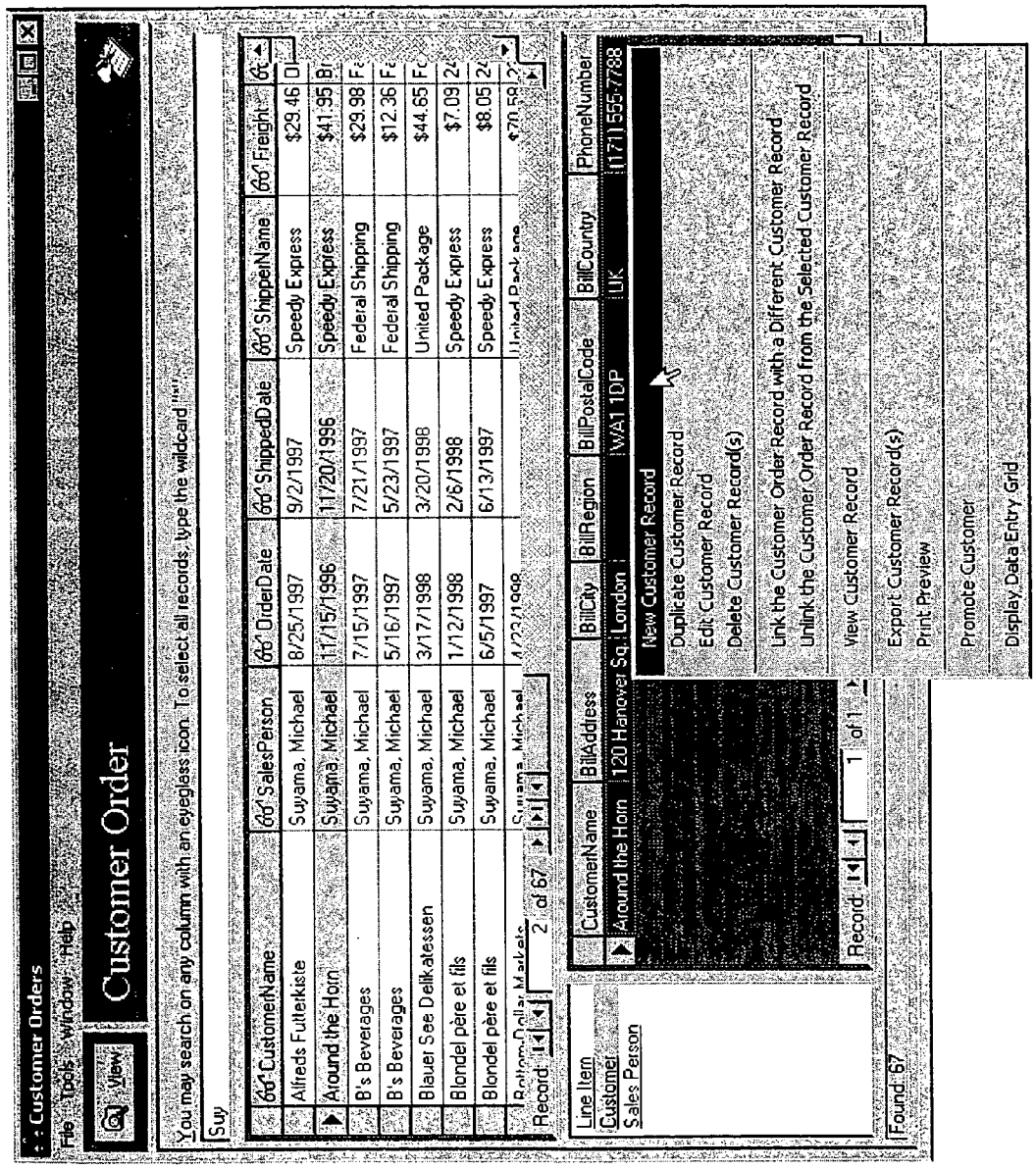
FIG. 17 depicts selection of the New Customer Many-To-One menu option.
Figure 18:
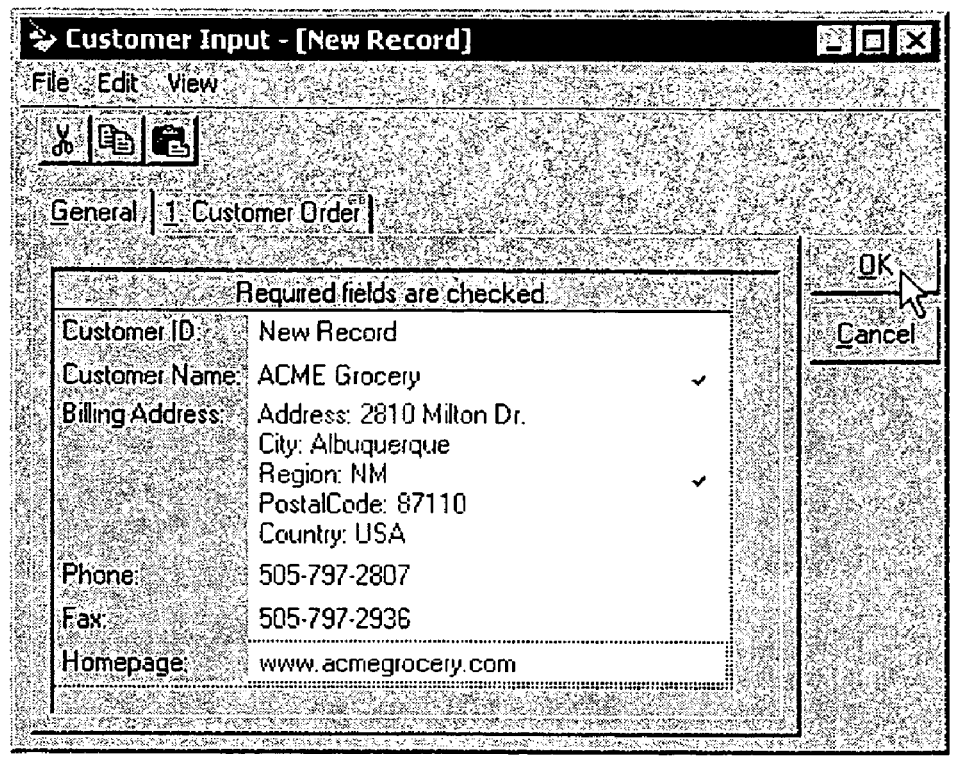
FIG. 18 depicts entering data on the Customer data entry form.
Figure 19:
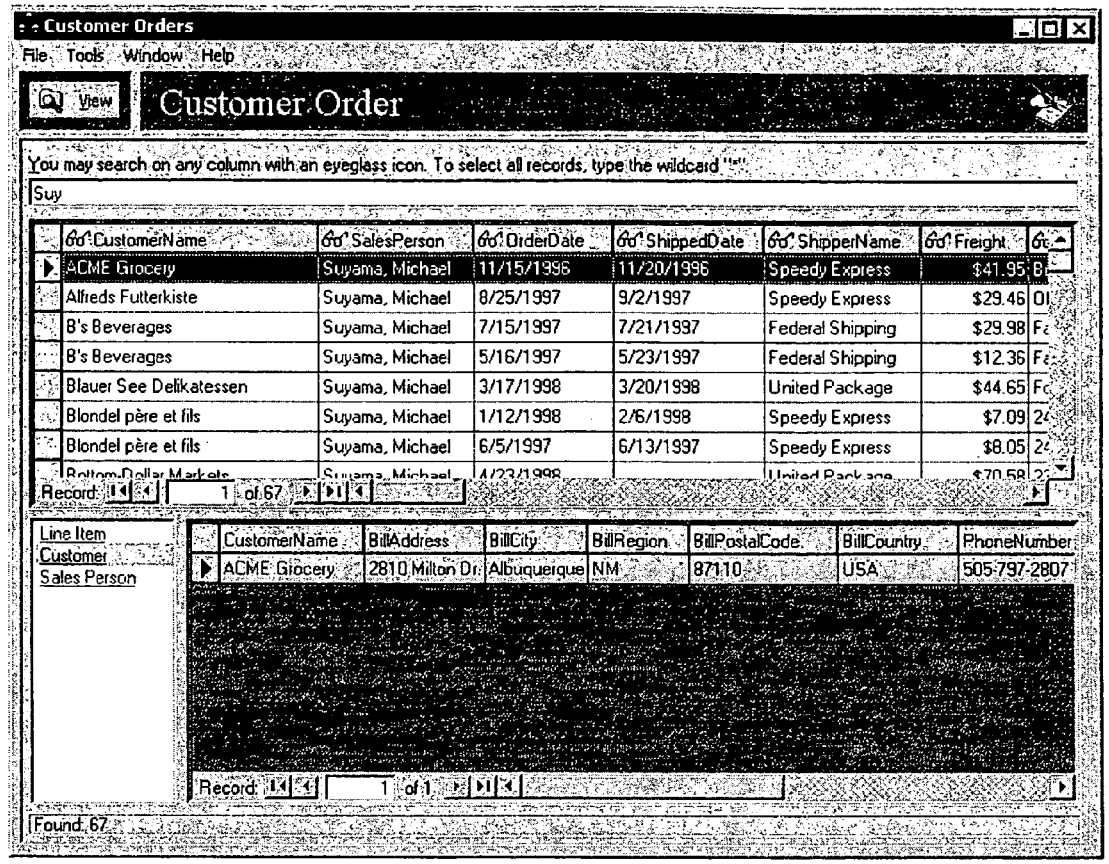
FIG. 19 depicts the newly added Customer record.

On the other hand, when the child entity is Customer, as illustrated in FIGS. 17-19, the context of adding a new Customer record is quite different. In this case, the relationship between parent and child entities is Many-To-One. Adding a new Customer has the impact of inserting a new record into the CUSTOMER table and modifying the CUSTOMER_ID foreign key value in the CUSTOMER_ORDER table to the value of the newly generated primary key value of the new Customer record.

Figure 20:
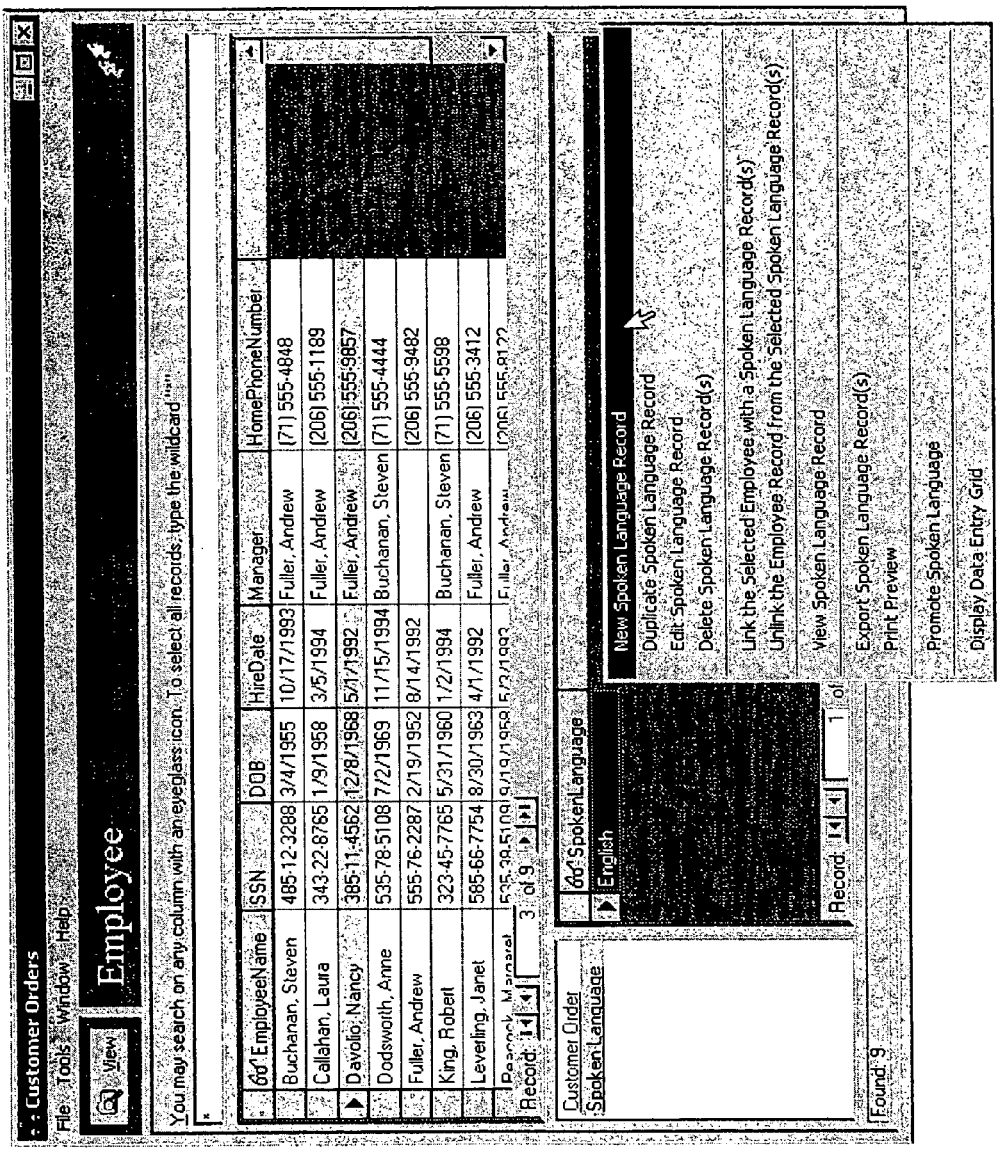
FIG. 20 depicts selection of the New Spoken Language Many-To-Many menu option.
Figure 21:
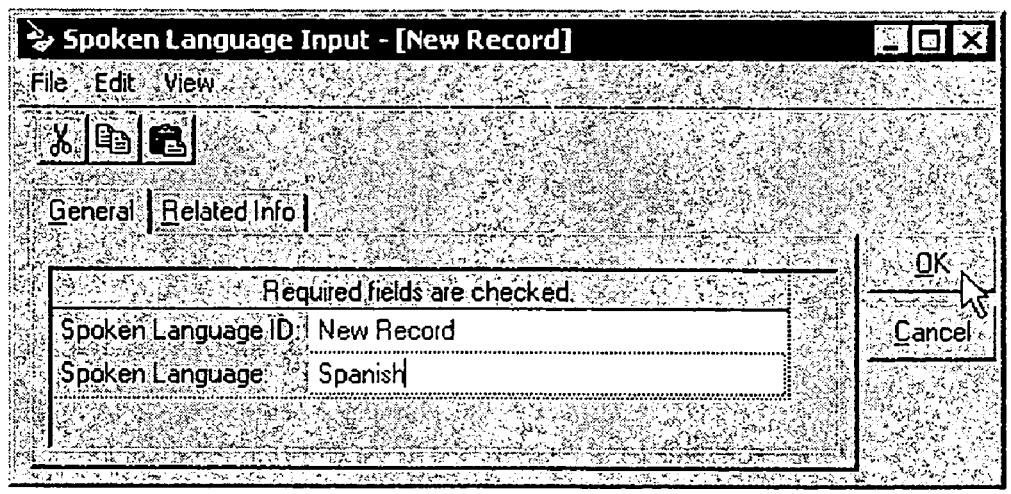
FIG. 21 depicts entering data on the Spoken Language data entry form.
Figure 22:
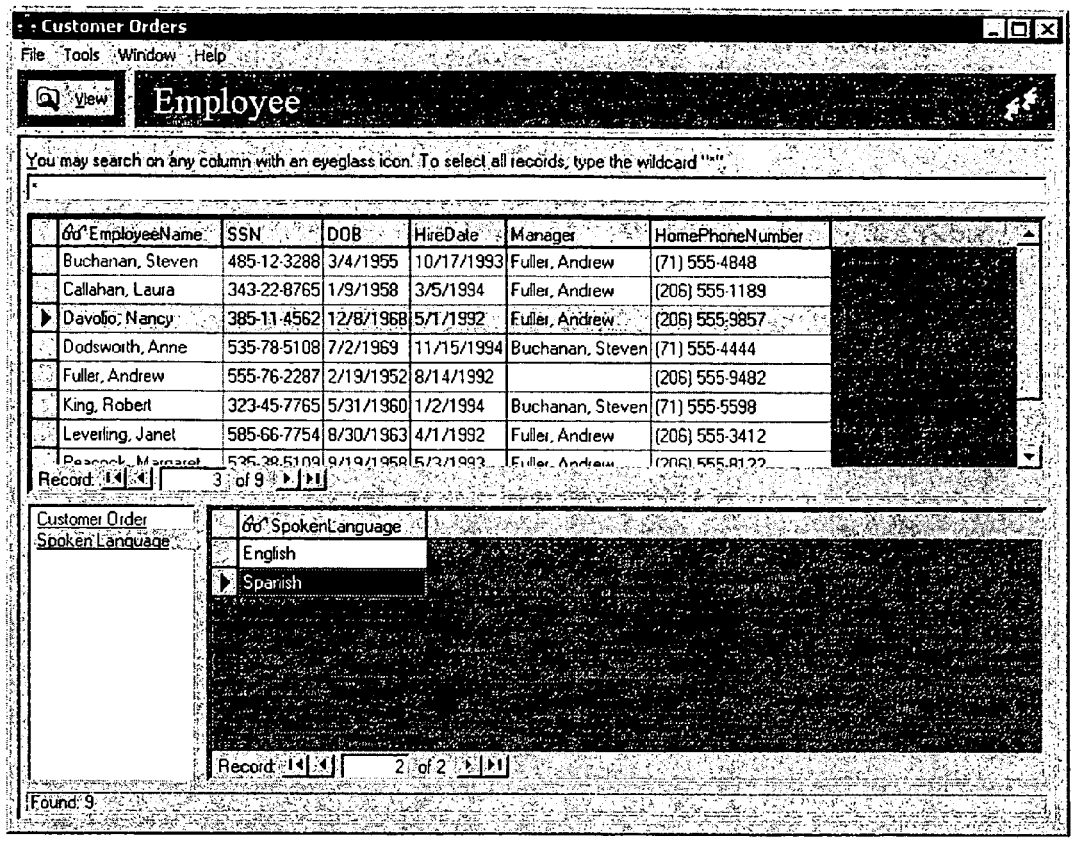
FIG. 22 depicts the newly added Spoken Language record.

When the relationship between parent and child entities is Many-To-Many, the context of the New menu option takes on yet another meaning. In FIGS. 20-22, the parent entity is Employee and the child is Spoken Language. Adding a New Spoken Language has the effect of inserting a new record into the SPOKEN_LANGUAGE table and inserting a new record into the EMPLOYEE_SPOKEN_LANGUAGE table. These two operations must execute in the proper order so that, after adding the new Spoken Language record, the newly generated primary key value is used to populate the foreign key field, SPOKEN_LANGUAGE_ID, when inserting a new record into the EMPLOYEE_SPOKEN_LANGUAGE intersection table. It should be noted that the Many-To-Many relationship type applies to a special case of intersection tables, which consist of, aside from the primary key, two, and only two, foreign key fields. This special case is quite common in practice. The Many-To-Many relationship type offers convenient functionality to end users. This functionality will be discussed in more detail later.

Figure 23:
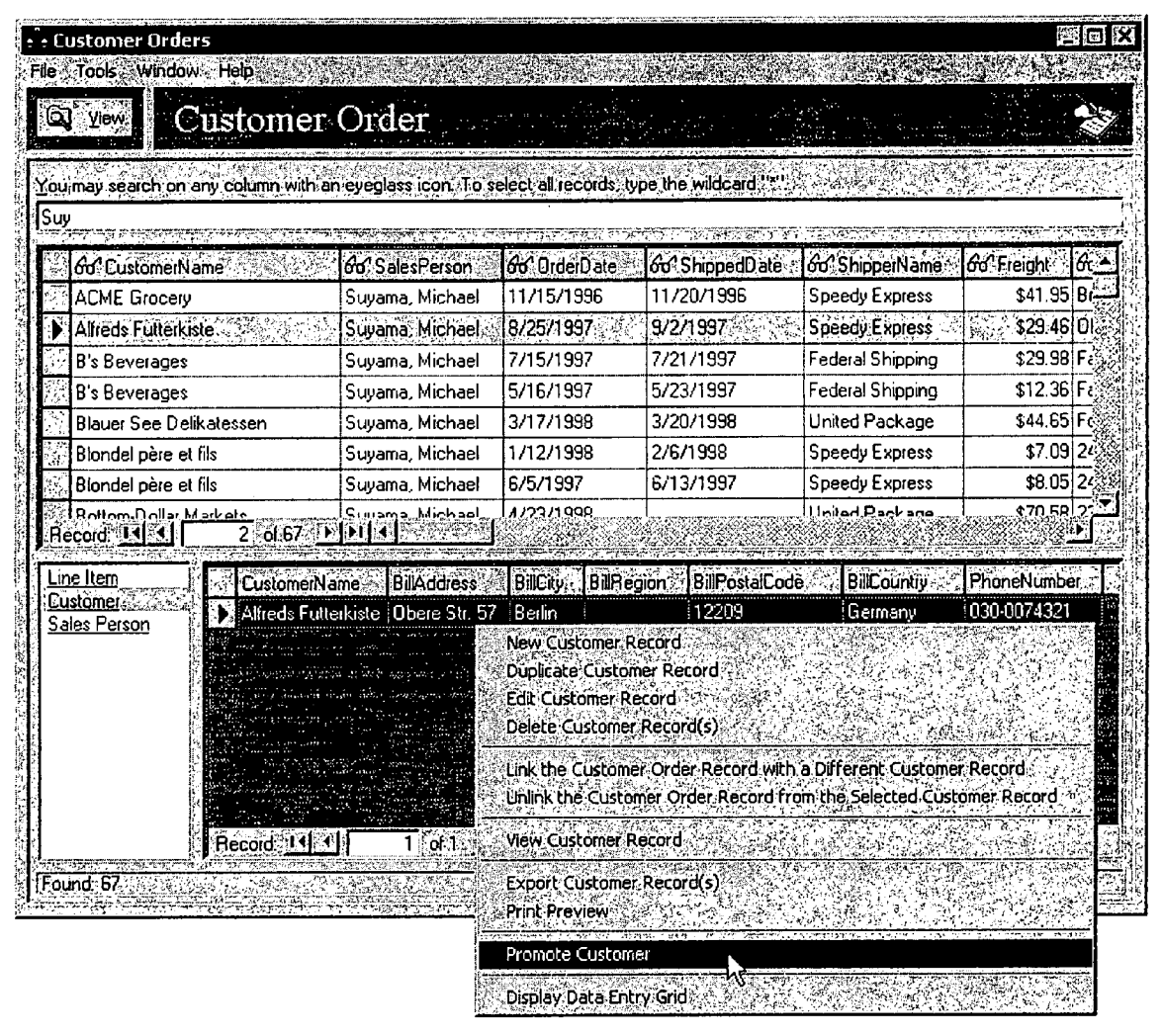
Figure 24:
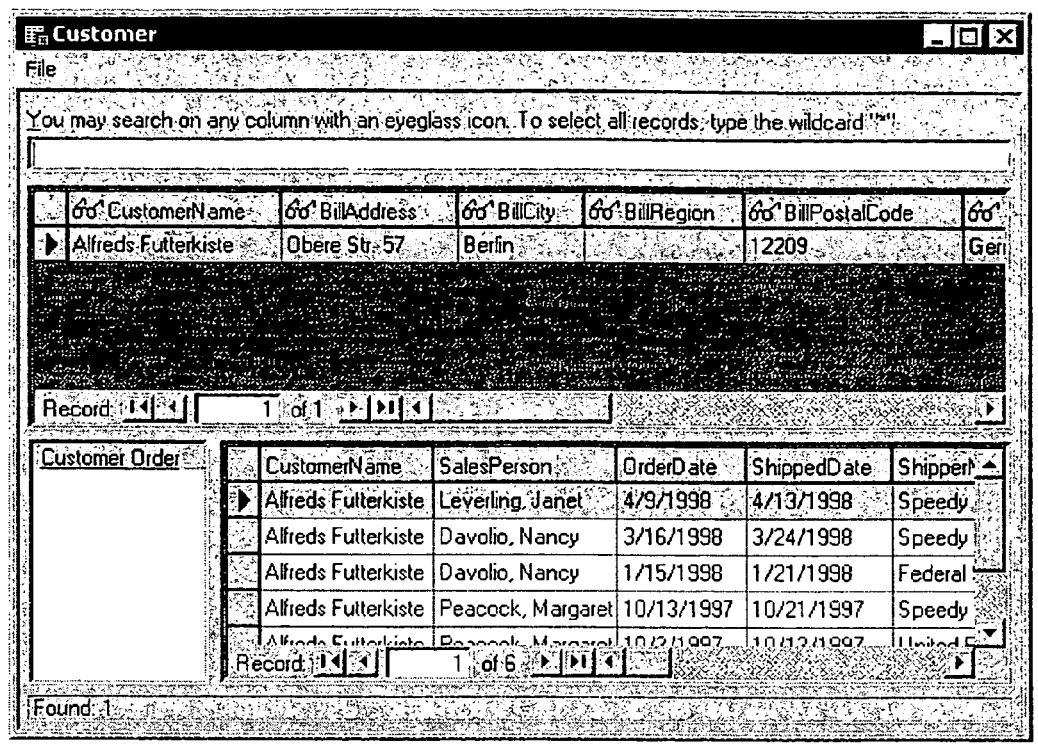
FIG. 24 depicts the newly promoted Customer entity.

Menus for child entities contain a particularly powerful navigation menu option referred to as "promotion". Promoting a child entity generates a new screen in which the child entity becomes the parent. Within this screen, the context of all searching is with respect to the newly promoted parent entity. FIG. 23 and FIG. 24 illustrate the promotion of the Customer entity. This functionality allows end users to drill through their database easily changing entity focus as the need arises.

Security is implemented at the menu option level. Upon the initial population of the configuration repository, permissions are granted to the Administrators user group for the most commonly used menu options. The system provides one built-in user, Admin, who belongs to the lone built-in group, Administrators. The system administrator manages security through the Utility Tool interface. All security information is stored as metadata in the configuration repository.

Two security models exist. One model provides for the integration of security in the UI with the underlying database by passing user login information from the UI to the database for verification. The other model uses a common database login for all users of the UI software. Under either case, permissions must be granted to the user's group before they can use menu options.

Configuration of permissions will be demonstrated in the UTILITY TOOL OPERATION section.

Two types of searching are provided to filter data with respect to the current parent entity: (1) quick-text searching and (2) advanced searching.

Figure 25:
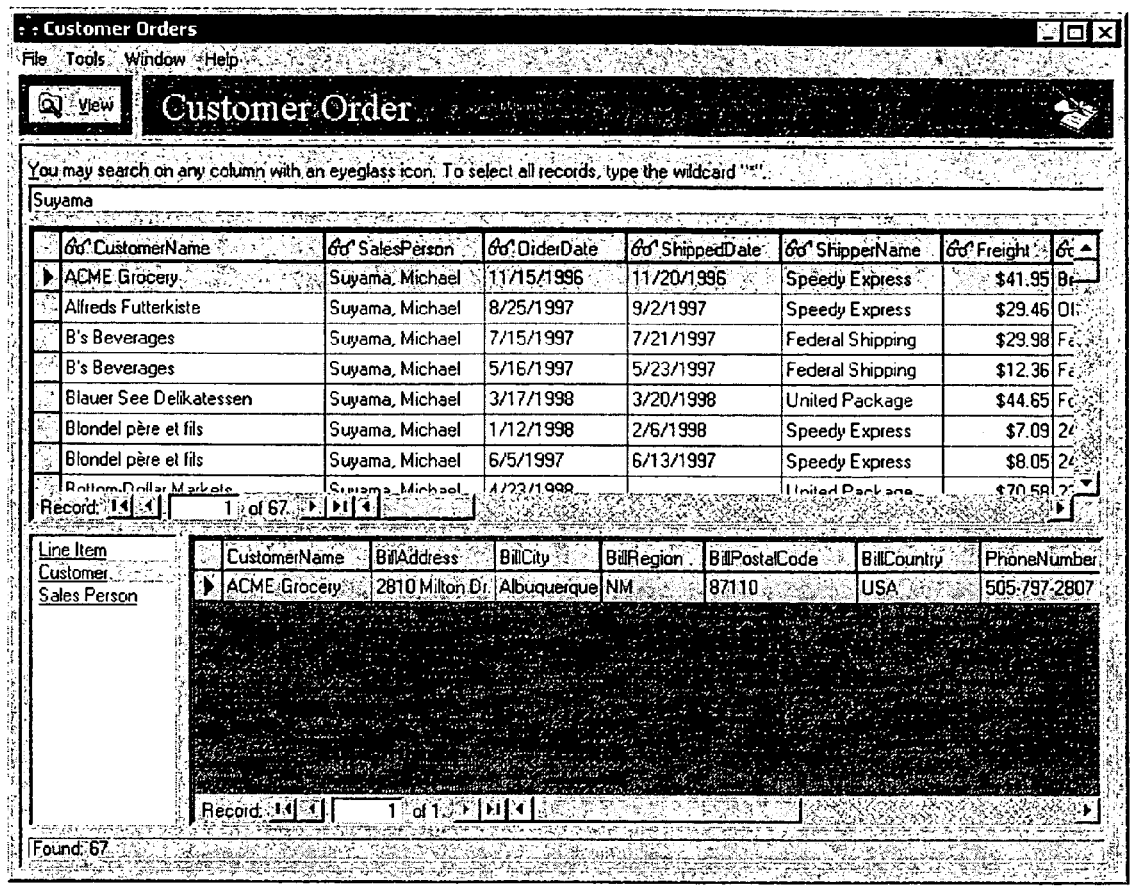
FIG. 25 depicts the results of a Quick-Text search on "Suyama".

The quick-text search is designed to provide a simple method by which the parent entity may be searched to retrieve a set of records that meet a particular criterion. The criterion is entered into an edit box as depicted in FIG. 25. After entering the criterion and pressing the Enter (or Return) key on the keyboard, the parent entity is searched for instances where values in one or more searchable columns match the criterion. By default, all columns in the parent entity are searchable. A record matches if the value in at least one of the columns begins with the same character string as the criterion.

Figure 26:
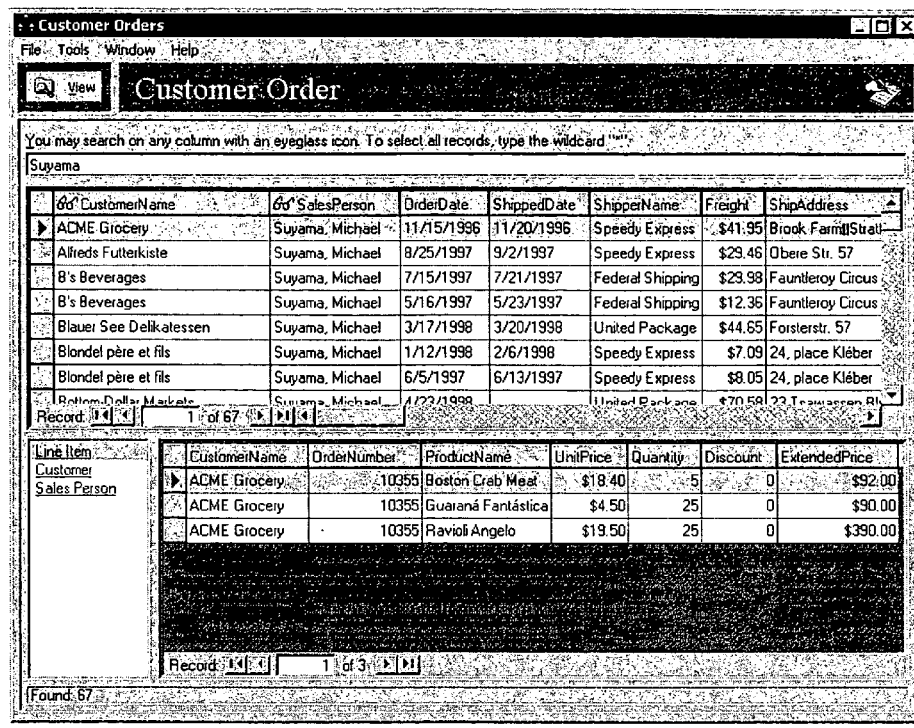
FIG. 26 depicts the results of Quick-Text search with two search columns defined for Customer Order.

The collection of searchable columns is configurable such that one or more columns may be specified to limit the scope of the search to only these selected columns. Such is the case in FIG. 26 where only the CustomerName and EmployeeName columns are searchable as denoted by the use of the eyeglass icon next to each column header. The type of search performed against each column may be customized as well using one of the following search types in Table 7:

TABLE 7

| Search Type | Description |
| --- | --- |
| BEGINS | Equivalent to the following SQL syntax: "EmployeeName LIKE 'Suy%'" Where "%" is a wildcard symbol signifying 0 or more characters. |
| EQUALS | Equivalent to the following SQL syntax: "EmployeeName = 'Suyama, Michael'". |

TABLE 7-continued

| Search Type | Description |
|---|---|
| INCLUDES | Equivalent to the following SQL syntax:<br>"EmployeeName LIKE '%Suy%'"<br>Where "%" is a wildcard symbol signifying 0 or more characters. |
| NAME_SEARCH | Specially designed to allow flexible searching against names. Text is parsed into separate components. For example, the search text "Michael Suy" is broken into two distinct components, "Michael" and "Suy". The EmployeeName column is then searched using the INCLUDES method for each component. Only those records for which INCLUDES evaluates to true for each component are returned. Thus, the SQL syntax for the current example would be: "(EmployeeName LIKE '%Michael%') AND (EmployeeName LIKE '%Suy%')". |

Figure 27:
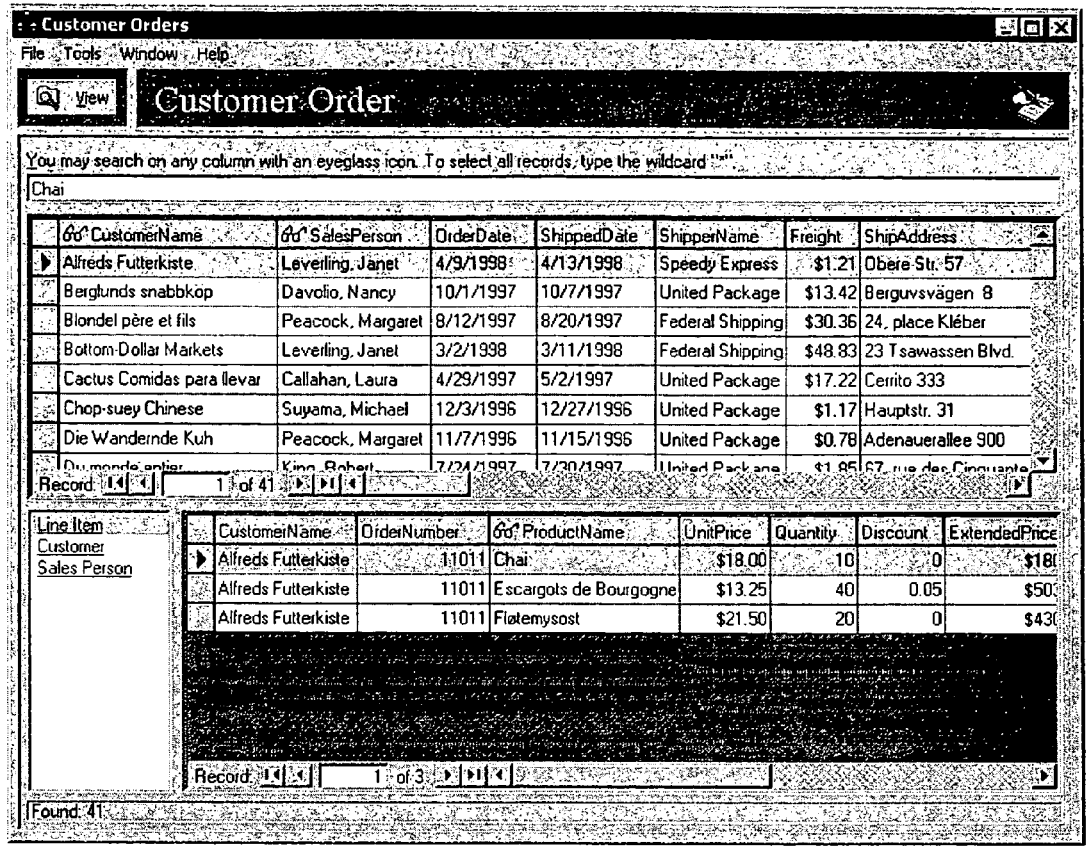
FIG. 27 depicts the results of a Quick-Text search against the Line Item child entity.

In addition, child entities may also be searched with respect to the parent entity. For example, FIG. 27 illustrates a configuration in which the CustomerName and SalesPerson columns from the Customer Order entity are searched using the NAME_SEARCH search type and the ProductName column from the Line Item child entity is also searched using the INCLUDES search type. If a Product Name is entered as the criterion, all Customer Orders on which a Line Item for the specified Product exists will be returned.

While the quick-text search is extremely flexible, in some cases it may be preferable to have access to more directed searching functionality. In the previous example, suppose a CustomerName includes the 'Chai' search criterion. Customer Orders where the CustomerName includes the character string 'Chai' will also be returned. This affect may be undesirable. To overcome this problem, advanced searching provides end users with targeted, precise searching functionality.

Figure 28:
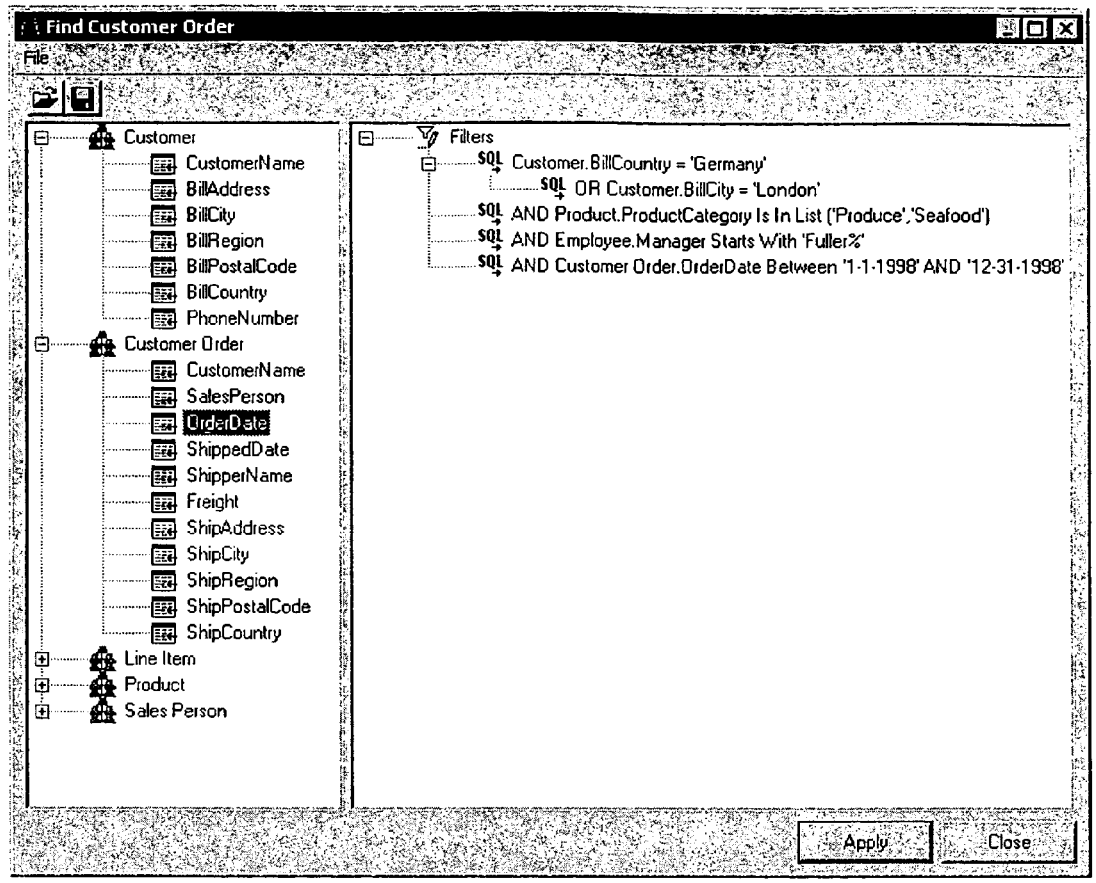
FIG. 28 depicts an Advanced Search screen for the Customer Order entity.

Advanced searching, depicted in FIG. 28, provides users with an opportunity to search against all entities defined on the search path of a parent entity, with respect, of course, to the parent entity. On the left side of the screen, a list is traversed to select columns on which filters may be defined. The right side of the screen displays a list filters that have been defined. Ultimately, these filters will be translated into SQL. Note that indentation is used to logically group filters thus implementing order of precedence into the aggregate filter expression. By default, filters are conjoined using the logical AND operator, but this default behavior may be overridden to use the OR operator as shown in the example. Once the filter has been completed, it is "applied" to generate a set of matching records for the parent entity.

Figure 29:
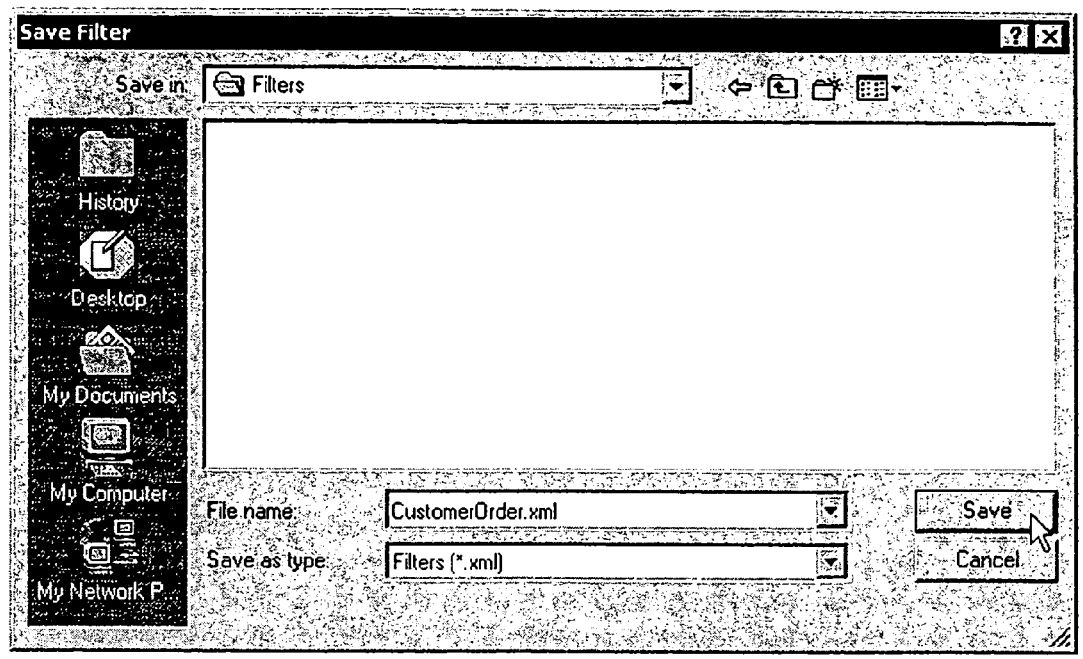
FIG. 29 depicts saving an Advanced Search into an XML file.

A final note on advanced searching: Filters may be saved for later reuse using Extensible Markup Language (XML) as illustrated in FIG. 29.

Figure 30:
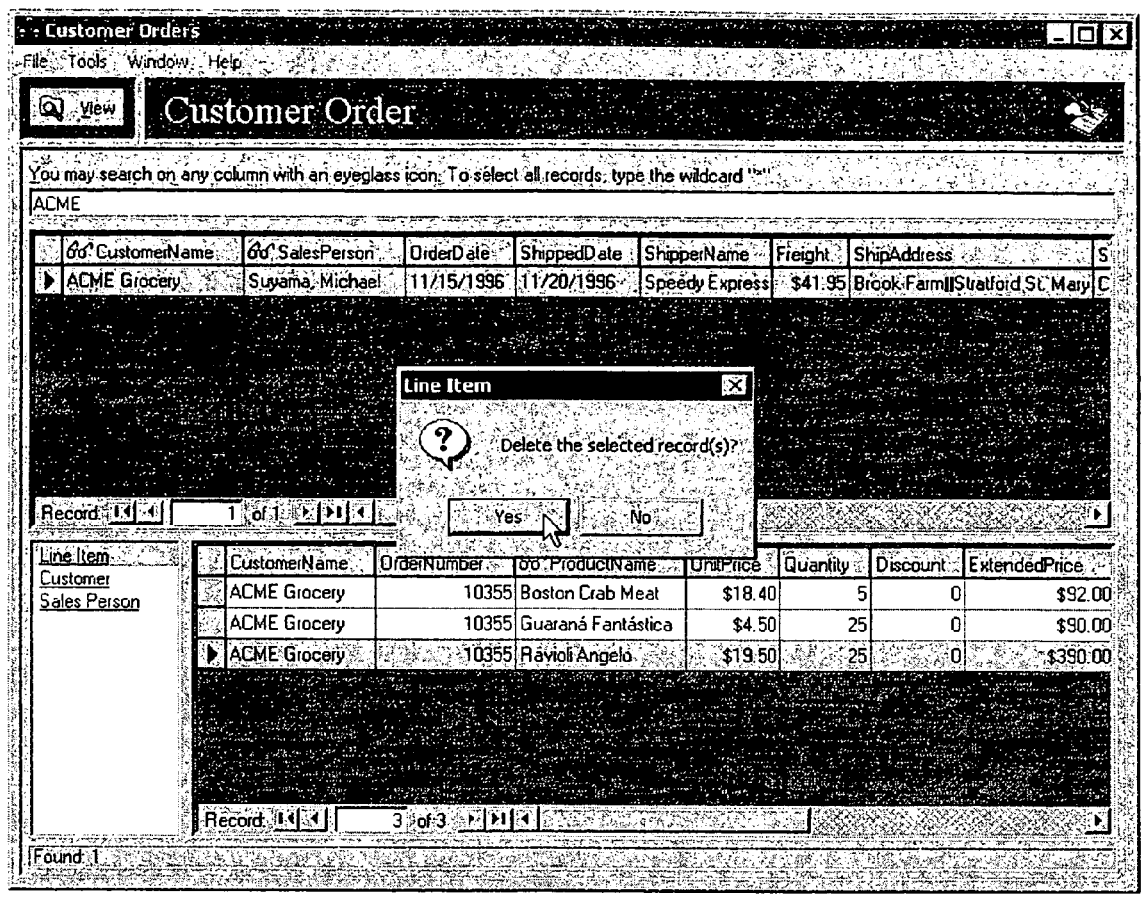
FIG. 30 depicts deletion of a Line Item record.

With regard to menus and data entry functionality, not all data entry-related menu options require the use of data entry forms. The Delete menu option, for instance, simply constructs and executes a DELETE SQL statement for selected records as shown in FIG. 30. The Link and Unlink menu options are a bit more complex, but ultimately generate and execute INSERT, DELETE, and UPDATE SQL statements depending on the menu context of the entity in question.

Regardless of the menu context, the New, Duplicate, Edit, and View menu options all require the dynamic generation of data entry forms. As mentioned earlier, data entry forms are constructed from the metadata relating to the collection of entity fields for the relevant entity.

Figure 31:
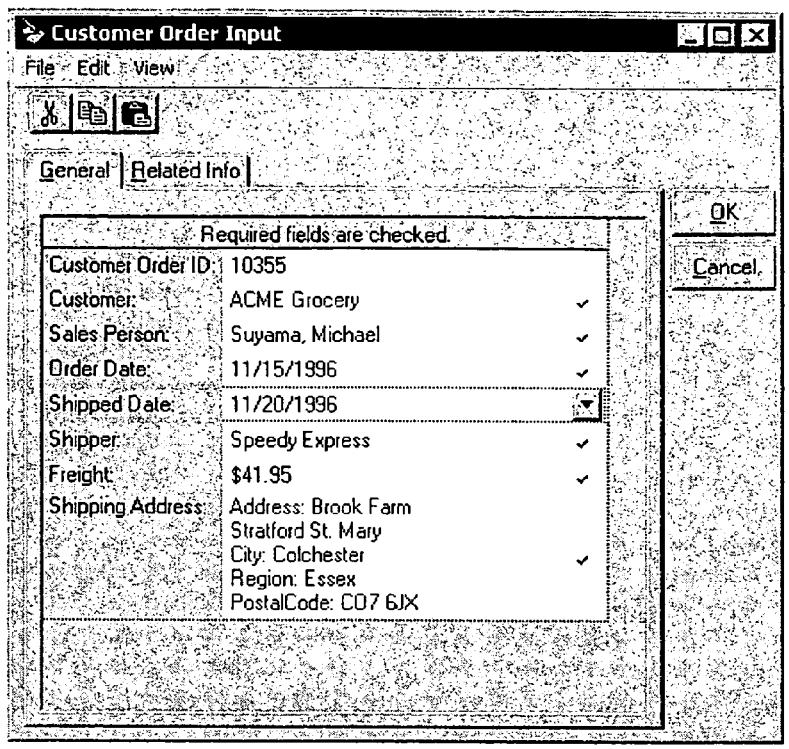
FIG. 31 depicts the Customer Order data entry form.

In FIG. 31, the Edit menu option was selected for a particular Customer Order. Data entry controls are graphically constructed in a list-like fashion using the metadata defined for each entity field. The ordering of the fields with respect to one another is determined by the Field Order entity field attribute. The type of data entry control assigned to each field depends upon several factors including the datatype of the field and whether or not the field is a primary or foreign key. For example, the SHIPPER_ID foreign key is represented by a dropdown list (referred to as a ComboBoxControl within the context of the present invention).

The decision-making process for the assignment of data entry controls will be discussed in depth in the METADATA GENERATION section below.

Note that red checkmarks are used to denote required fields. Required is a Boolean attribute of entity fields. Other features such as entity and entity field "scripting", entity "business rules", and entity "triggers" are available to promote data integrity and extend the basic functionality provided by dynamically generated data entry forms. These features will be discussed under the USER INTERFACE GENERATION section.

After editing a record, the user can cancel the changes by clicking the Cancel button or choose to save the changes to the underlying table by clicking the OK button. In the event the user elects to save the changes, the system first verifies that all required fields have been populated. It then applies any business rules that have been defined to validate user input. If any required data is missing or any business rules fail, the user is prompted to remedy the problem. Otherwise, dynamic SQL is generated to update the underlying database table.

NOTE: Of all the functionality provided by the present invention, the cost savings made possible through the dynamic generation of data entry forms cannot be overstated. Using conventional user interface development methods, each data entry form must be painstakingly programmed to provide similar functionality.

What happens if the underlying physical table is modified to add or remove a field? The metadata relating to an entity's collection of fields is simply modified within the Utility Tool to reflect the change. The data entry form will automatically adjust to changes in metadata without the necessity of writing any computer code.

Metadata Generation

The Utility Tool is responsible for analyzing the database schema and generating the metadata stored in the configuration repository. While custom computer code may be written to analyze database schemas for various popular relational database systems, such as Microsoft SQL Server and Oracle, several commercial middleware products are available to abstract differences between database systems into a common programming interface. In this way, foreign keys, for instance, are detected using identical, or very similar, code from within the Utility Tool regardless of database system. The present invention uses Microsoft's Data Access Components (MDAC) to provide this layer of abstraction.

The database schema provides sufficient information to populate the metadata relating to entities, entity fields, entity relationships, and entity search paths. Other default settings, such as entity and entity relationship permissions for the Administrators group, are configured to ease and speed the development process. However, these default metadata configuration settings do not make direct use of the database schema.

Entities

One entity is created for every table in the database. While the schema provides the primary key of each table, each table's corresponding view must be determined through a simple naming convention for the view whereby a prefix or suffix is appended to the table name to derive the name of the view. Using a suffix of "_V" would therefore yield a view name of CUSTOMER_ORDER_V for the CUSTOMER_ORDER table.

Reference entities cannot be detected from the schema. This attribute must be defined by a system administrator based on their overall understanding behind the business purpose of the relational database. Consequently, the Utility Tool prompts the system administrator with a list of tables from which reference tables may be defined. This will be illustrated in the UTILITY TOOL OPERATION section.

Entity Fields

The primary purpose of analyzing database schema information relating to table fields is to determine and assign an appropriate data entry control to each field. By default, one entity field is created for each field in the underlying table. A summary of the available data entry controls is presented in the USER INTERFACE GENERATION section.

Figure 32:
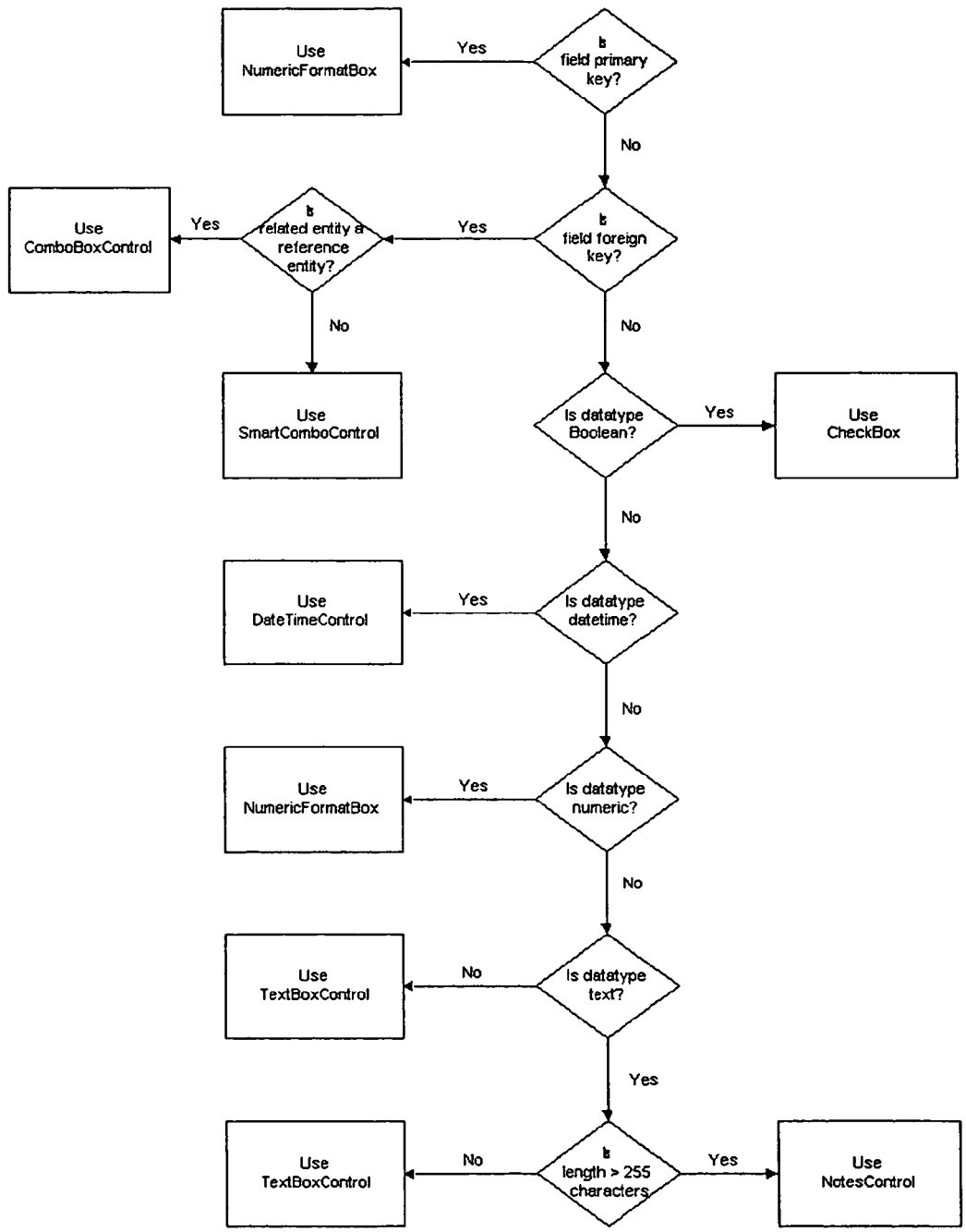
FIG. 32 depicts a flowchart of decision points used in assigned data entry controls to entity fields.

The strategy used to determine the data entry control for each field is illustrated via the flowchart in FIG. 32. It should be noted that all default attributes discussed below can be modified within the Utility Tool at any time. The Utility Tool uses the following strategy during the initial population of the configuration repository and on demand by the system administrator as modifications are made to the database structure over time:

If the field is a primary key, a NumericFormatBox is assigned. Since primary key values are system generated, the NumericFormatBox will be placed in read-only mode, meaning end users cannot make changes to the value.

Figure 33:
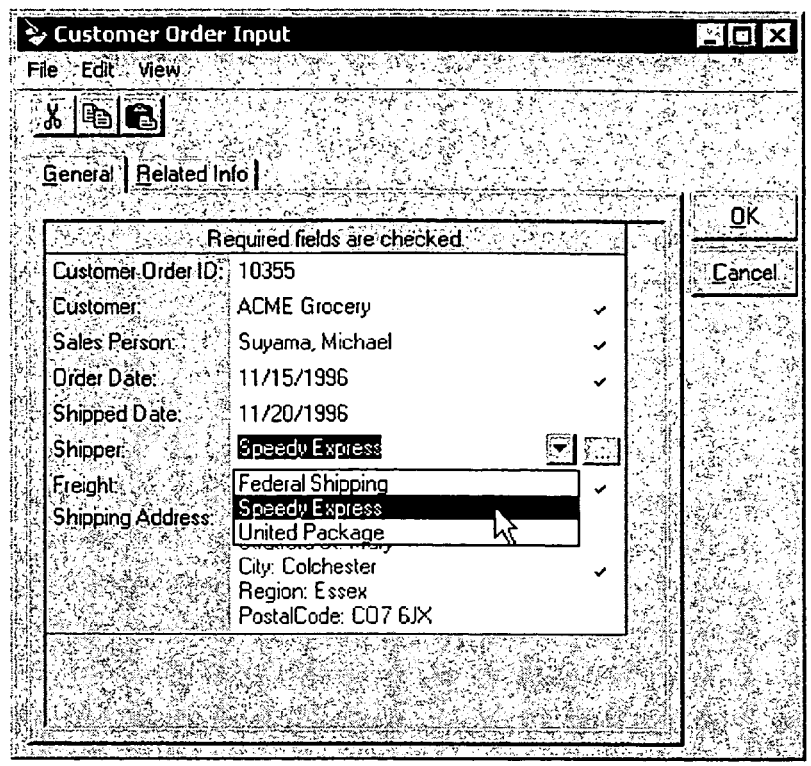
FIG. 33 depicts a ComboBoxControl data entry control.

If the field is a foreign key, then one of two data entry controls will be assigned depending on whether the related table is a reference entity. If the related entity is a reference entity, a ComboBoxControl is assigned. The graphical representation of a ComboBoxControl is a simple dropdown list, an example of which is depicted in FIG. 33. Shipper is a reference entity. The ComboBoxControl presents a list of Shippers to the end user but actually stores the SHIPPER_ID primary key value in the CUSTOMER_ORDER table.

If the related entity is not a reference entity, a SmartComboControl is assigned. The purpose of the SmartComboControl is identical to that of the ComboBoxControl: that is, to populate a foreign key field in the underlying table. However, its functionality is a bit more complex. Unlike the ComboBoxControl, the SmartComboControl makes two significant assumptions: (1) The number of potential records in the related table could become very large. It is, therefore, inadvisable to load a large number records into a dropdown list. (2) Several fields may be necessary to uniquely differentiate each record in the related table.

Figure 34:
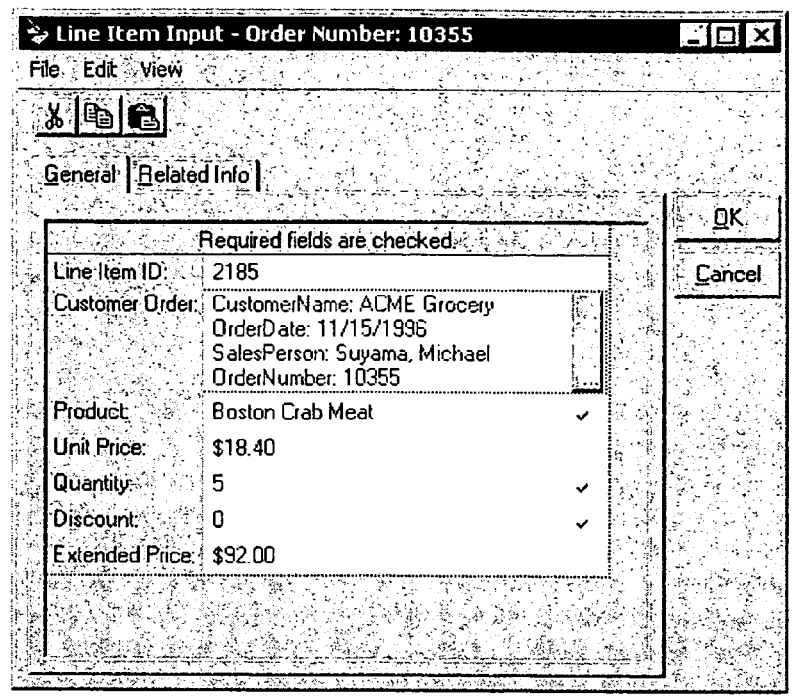
FIG. 34 depicts a SmartComboControl data entry control.

For example, the CUSTOMER_ORDER_ID foreign key in the LINE_ITEM table requires the display of several fields from the related CUSTOMER_ORDER table to provide the end user with sufficient information to distinguish one Customer Order from another. In this case, it might be wise to display the CustomerName, OrderDate, and SalesPerson and, perhaps, the Customer Order ID, assuming it is used as the order number in addition to serving as the primary key (see FIG. 34). By contrast, the SHIPPER_ID foreign key in the CUSTOMER_ORDER table can be quite reasonably represented by a dropdown list, displaying only a single column that derives from the SHIPPER_NAME field in the SHIPPER table.

Keep in mind, these default settings can be easily overridden in the event that the Utility Tool's assumptions produce an undesirable result, such as assigning a SmartComboControl when a ComboBoxControl would suffice.

As with all other data entry control types, attributes are used to control the run-time behavior of each control type. With respect to the ComboBoxControl and SmartComboControl control types, two important attributes are worthy of mention here: Expression and Expression Type. These two attributes are used to determine how data is displayed to the end user and, in the case of the ComboBoxControl, the source of data for the dropdown list.

The Expression Type attribute must be one of three values: EXPRESSION, SQL, or STORED_PROCEDURE. The specific meaning of each Expression Type differs slightly for each control type as shown in Table 8 and Table 9:

TABLE 8

| ComboBoxControl | |
| --- | --- |
| Expression Type | Description |
| EXPRESSION | A list of two fields from the related entity's corresponding view that are used to populate the dropdown list. For the SUPPLIER_ID foreign key in the CUSTOMER_ORDER table, a valid Expression attribute might be: SHIPPER_ID, ShipperName At run-time, this would be translated to the following complete SQL statement: SELECT SHIPPER_ID, ShipperName FROM SHIPPER_V The SQL statement above would then be executed to generate a list of Shippers for the dropdown list. |
| SQL (Default) | This is the default Expression Type selected by the Utility Tool for the ComboBoxControl control type. The SQL statement is executed at run-time to generate the dropdown list. By default, the Utility Tool uses the underlying view for the related entity to construct the SQL statement as in the following example: SELECT SHIPPER_ID, ShipperName FROM SHIPPER_V ORDER BY ShipperName The columns defined in the SELECT clause are derived by selecting the first two columns returned by the underlying view. It is assumed the system administrator follows a simple convention in the creation of views for all reference entities: The first column should be the primary key field of the related entity and the second should be a descriptive column that will represent the list of values in the dropdown list. Parameters may be passed to the SQL statement from the data entry form by using curly brackets, { }, as delimiters as in the following example for the MANAGER_ID foreign key in the EMPLOYEE table (which is designed to prevent an Employee from managing herself): SELECT EMPLOYEE_ID, EmployeeName FROM EMPLOYEE_V |

TABLE 8-continued

ComboBoxControl

| Expression Type | Description |
| --- | --- |
|  | WHERE EMPLOYEE_ID <> {EMPLOYEE_ID} ORDER BY EmployeeName |
| STORED_PROCEDURE | Some databases, such as Microsoft SQL Server and Oracle, support the use of stored procedures. The stored procedure should return a list of records, as was the case with the SQL Expression Type. The list should include the primary key in the first column and descriptive text in the second column. One or more parameters may be passed to the stored procedure as in the following example: stpGetManagerList {EMPLOYEE_ID} |

TABLE 9

SmartComboControl:

| Expression Type | Description |
| --- | --- |
| EXPRESSION (Default) | This is the default Expression Type selected by the Utility Tool for the SmartComboControl control type. The default Expression attribute is set to the name of the primary key field of the related entity. The Expression attribute is evaluated against the view associated with the related entity as in the following example for the CUSTOMER_ORDER_ID foreign key in the LINE_ITEM table: SELECT CUSTOMER_ORDER_ID, CustomerName, SalesPerson, OrderDate, CUSTOMER_ORDER_ID As OrderNumber FROM CUSTOMER_ORDER_V WHERE CUSTOMER_ORDER_ID = {CUSTOMER_ORDER _ID} Two points are worth noting in this example: First, the list of columns from the database view have been expanded from the default setting, which included only the primary key, CUSTOMER_ORDER_ID, to the following list: CUSTOMER_ORDER_ID, CustomerName, SalesPerson, OrderDate, CUSTOMER_ORDER_ID As OrderNumber Second, a WHERE clause has been inserted which limits the return list to a single record using a parameter as denoted by the curly brackets. The functionality of the SmartComboControl provides for the display of a multiple fields from a single record. |
| SQL | An SQL statement may also be used provided it returns only a single record with at least one column, the primary key. |
| STORED_PROCEDURE | A stored procedure may also be used provided it returns only a single record with at least one column, the primary key. |

If the field is not a primary or foreign key, then the datatype is used to determine the data entry control type. The remaining decision points in the flowchart (FIG. 32) taken in conjunction with the Data Entry Control subsection of the USER INTERFACE GENERATION section are self-explanatory.

The Required entity field attribute is determined by checking the "nullable" property of table fields in the database schema. A field that is nullable can accept the NULL value. A field that does not accept NULL values is assumed to be required. The data entry controls for required entity fields are denoted with a red checkmark on data entry forms.

The order of entity fields on data entry forms is determined by the "ordinal position" property of table fields in the database schema. Ordinal position simply refers to the physical order of fields within the table. Creating table definitions whereby fields are added in the order in which they should appear on the data entry form will result in properly ordered data entry controls.

The Visible attribute determines whether entity fields are visible on the data entry form. By default, all entity fields are visible.

Entity Relationships

It was noted in the CONFIGURATION REPOSITORY section that two entity relationships are created for every foreign key found in the schema, one from the perspective of the foreign key table and one from the perspective of the related table. An example was presented for the PRODUCT_ID foreign key in the LINE_ITEM table. The entity relationship generated from the perspective of the Line Item entity is used to define the parent-child relationship between Line Item and Product in the UI, a Many-To-One relationship. Conversely, the entity relationship generated from the perspective of the Product entity is used to define the parent-child relationship, a One-To-Many relationship, between Product, as the parent entity, and Line Item, as the child entity.

Once the Utility Tool has interrogated the schema to determine all foreign keys for every table in the database, all parent-child relationships for all entities have been defined in terms of the metadata.

Entity Search Paths

The Utility Tool sets the default search path for each entity during the initial population of the configuration repository. The system administrator can modify this search path at any time. The default search path for an entity is simply the set of all direct relationships with other entities regardless of relationship type. For the Customer Order entity, this would include the following relationships. Please note that reference entities, such as Address and Shipper, are not included in this list of relationships as shown in Table 10:

TABLE 10

| Relationship |
| --- |
| CUSTOMER.CUSTOMER_ID=CUSTOMER_ORDER. CUSTOMER _ID |
| EMPLOYEE.EMPLOYEE_ID=CUSTOMER_ORDER. SALES_PERSON _ID |
| CUSTOMER_ORDER.CUSTOMER_ORDER_ID=LINE_ITEM. CUSTOMER_ORDER _ID |

User Interface Generation

Key components of the UI, as outlined in the USER INTERFACE ARCHITECTURE section, will now be discussed with respect to the method by which they are dynamically generated from metadata at run-time. Several attributes of entities and entity relationships will be presented during this discussion. Attributes are used to customize and modify the behavior of the UI without the necessity of writing computer code. Other attributes exist for entities and entity relationships. Many of these will be discussed in the APPLICATION EXTENSIBILITY, UTILITY TOOL OPERATION and the USER INTERFACE OPERATION sections.

View Menu

The Show On View Menu entity attribute determines whether an entity appears on the View Menu. The order of entities with respect to one another is determined by the Relative Order entity attribute. The Reference Tables menu option appears if at least one reference entity exists. An entity may be hidden entirely from end users by setting its Visible attribute to FALSE.

Parent Entities

An entity may become a parent by: (1) selecting the entity from the View Menu or (2) promoting a child entity. The list of child entities with respect to the parent entity is derived from the set of entity relationships defined in the metadata for the parent. Excluded from this list are entity relationships where: (1) the Visible entity relationship attribute is set to FALSE or (2) the related entity is a reference entity.

Figure 35:
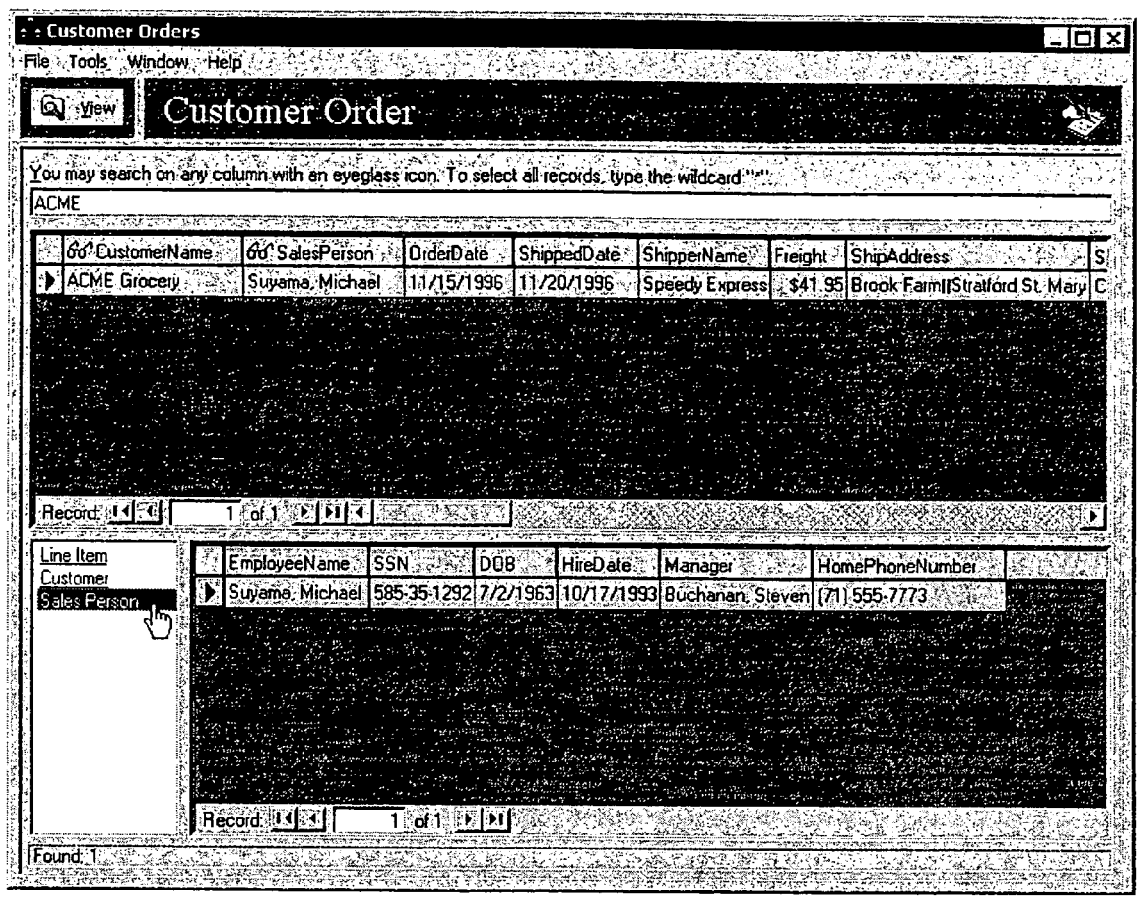
FIG. 35 illustrates a customized caption for the Employee child entity.

The name of a child entity, defined by the Caption entity relationship attribute, is initially set to the name of the related entity. Entity names are defined by the Caption entity attribute. The Caption entity relationship attribute may be customized, as is the case for the child entity, Sales Person, in FIG. 35. The related entity is Employee. However, since the role Employee plays relative to a Customer Order is to act as a Sales Person, the Caption attribute has been changed accordingly.

As illustrated in the USER INTERFACE ARCHITECTURE section, two methods are provided to search for instances (i.e. records) of the parent entity. The implementation of each method follows:

1. Quick-Text Search: The example of a quick-text search presented in the USER INTERFACE ARCHITECTURE section provided for a flexible search against both parent and child entities. The collection of searchable columns is defined by the metadata associated with entities and entity relationships.

For the parent entity, the existence of one or more "entity search columns" in the metadata limits the scope of the search to include only those predefined columns. If no entity search columns are defined for the parent, all columns are searchable using the BEGINS search type.

On the other hand, child entities are only searchable if one or more "entity relationship search columns" is defined in the metadata. In addition, in order to be searchable, a child entity must be on the search path of the parent entity. In the example presented in FIG. 27, the ProductName column for the Line Item entity is the only search column defined for any of the child entities. Thus, Line Item is the only searchable child entity.

The strategy employed by the quick-text search is to first generate SQL against the parent entity and then join it to SQL generated against searchable child entities using the UNION SQL keyword. Search columns defined for both parent and child entities are used to build WHERE clauses for each individual SQL statement. Consider the following SQL generated for the example in FIG. 27:

SELECT CUSTOMER_ORDER_V.*
    FROM CUSTOMER_ORDER_V
    WHERE ((CUSTOMER_ORDER_V.CustomerName Like '%chai%') OR
    (CUSTOMER_ORDER_V.SalesPerson Like '%chai%'))
    UNION
    SELECT CUSTOMER_ORDER_V.*
    FROM CUSTOMER_ORDER_V,CUSTOMER_ORDER,LINE_ITEM,LINE_ITEM_V
    WHERE (CUSTOMER_ORDER_V.CUSTOMER_ORDER_ID=CUSTOMER_ORDER.CUSTOMER_ORDER_ID
    AND CUSTOMER_ORDER.CUSTOMER_ORDER_ID=LINE_ITEM.CUSTOMER_ORDER_ID
    AND LINE_ITEM_V.LINE_ITEM_ID=LINE_ITEM.LINE_ITEM_ID) AND (LINE_ITEM_V.ProductName Like '%chai%')
    ORDER BY CUSTOMER_ORDER_V.CustomerName ASC, CUSTOMER_ORDER_V.OrderDate DESC The first portion of the SQL statement, before the UNION keyword, is straightforward. The entity search columns are used to build the WHERE clause.

The second portion of the SQL statement, which follows the UNION keyword, is a bit more complex. Notice that the SELECT clause must match that of the first portion of the SQL statement:

SELECT CUSTOMER_ORDER_V.*

However, since we need to search against the columns of the view associated with the child entity, we must join the parent entity view, CUSTOMER_ORDER_V, with the child entity view, LINE_ITEM_V. These joins make up the first portion of the WHERE clause. To generate these joins, we must first join the views with their associated tables:

CUSTOMER_ORDER_V.CUSTOMER_ORDER_ID=CUSTOMER_ORDER.CUSTOMER_ORDER_ID LINE_ITEM_V.LINE_ITEM_ID=LINE_ITEM.LINE_ITEM_ID

The tables themselves are then linked using entity relationship metadata, which defines the physical relationship between the Customer Order and Line Item entities:

CUSTOMER_ORDER.CUSTOMER_ORDER_ID=LINE_ITEM.CUSTOMER_ORDER_ID

The remainder of the WHERE clause is generated using the entity relationship search column metadata associated with the Line Item entity:

LINE_ITEM_V.ProductName Like '%chai%'

Finally, the ORDER BY clause is generated by interpreting the metadata stored for "entity sort columns". Entity sort columns are a collection of columns from the associated entity view where a default sort order has been defined (i.e. ascending or descending):

ORDER BY CUSTOMER_ORDER_V.CustomerName ASC, CUSTOMER_ORDER_V.OrderDate DESC

Figure 36:
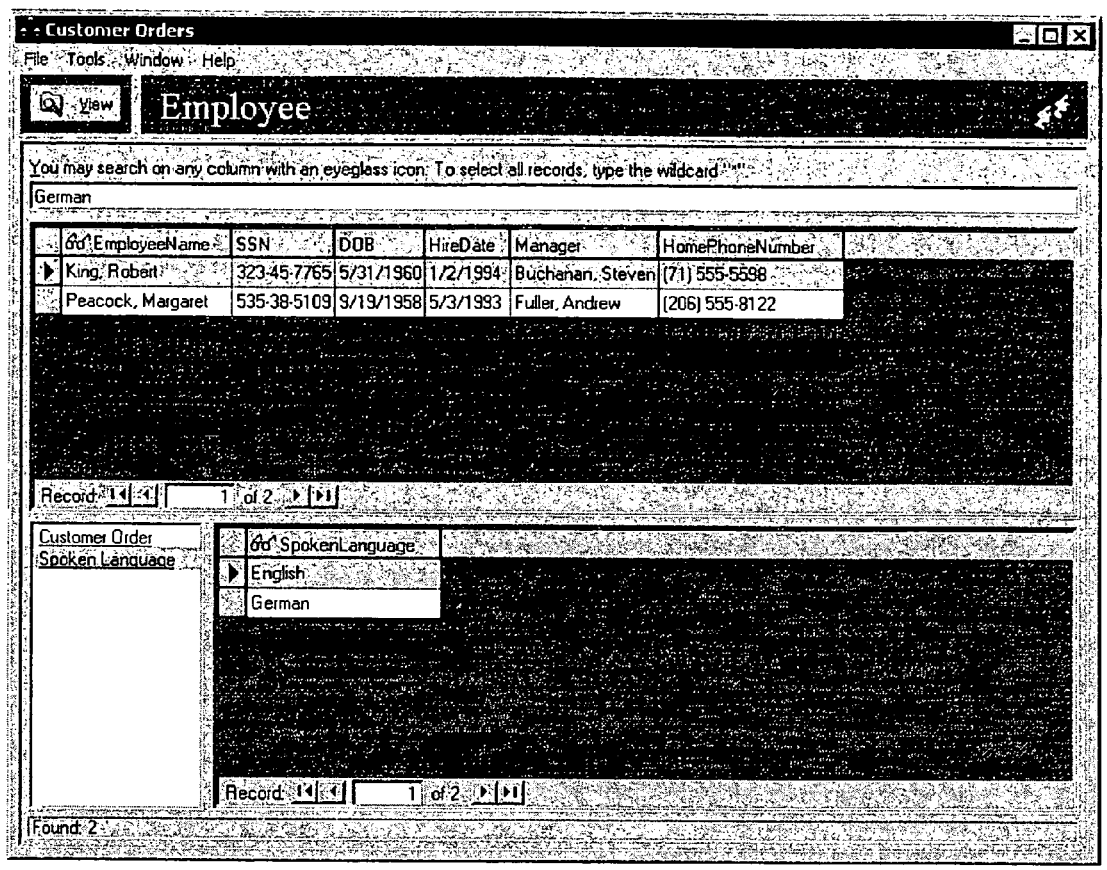
FIG. 36 depicts a Quick-Text search for a Many-To-Many relationship.

The preceding strategy works fine for parent and child entities that are directly linked, as is the case for One-To-Many and Many-To-One relationships. The strategy for Many-To-Many relationships must consider the fact that a level of indirection exists between parent and child entities, as is the case for the example in FIG. 36, which illustrates a search for Employees who speak German. The SQL statement for this search follows:

SELECT EMPLOYEE_V.*
    FROM EMPLOYEE_V
    WHERE (EMPLOYEE_V.EmployeeName Like '%German%')
    UNION

```
SELECT EMPLOYEE_V.*
FROM EMPLOYEE_V, EMPLOYEE,EMPLOY-
   EE_SPOKEN_LANGUAGE, SPOKEN_LAN-
   GUAGE SPOKEN_LANGUAGE_1, SPOKEN_
   LANGUAGE_V
WHERE
   (EMPLOYEE_V.EMPLOYEE_ID=EMPLOYEE.
   EMPLOYEE_ID
   AND
      EMPLOYEE.EMPLOYEE_ID=EMPLOYEE_
      SPOKEN_LANGUAGE.EMPLOYEE_ID
   AND    SPOKEN_LANGUAGE_1.SPOKEN_
      LANGUAGE_ID=EMPLOYEE_SPOKEN_
      LANGUAGE.SPOKEN_LANGUAGE_ID
   AND    SPOKEN_LANGUAGE_V.SPOKEN_
      LANGUAGE_ID=SPOKEN_LANGUAGE_
      1.SPOKEN_LANGUAGE_ID)
   AND (SPOKEN_LANGUAGE_V.SpokenLanguage
      Like '%German%')
ORDER BY EMPLOYEE_V.EmployeeName ASC
```

The first portion of the SQL statement, before the UNION keyword, follows the same format presented in the previous example. The second portion of the SQL statement makes use of additional metadata defined for Many-To-Many entity relationships in order to insert the EMPLOYEE_SPOKEN_LANGUAGE intersection table into the tables joins. The relationship between the Employee and Employee Spoken Language entities, stored as metadata, is defined in such a way that the UI software knows to "map" the Employee Spoken Language entity to the Spoken Language entity. Mapping entities in this manner notifies the UI to insert one additional relationship into the table joins, in this case, the relationship between the Employee Spoken Language and Spoken Language entities.

Figure 37:
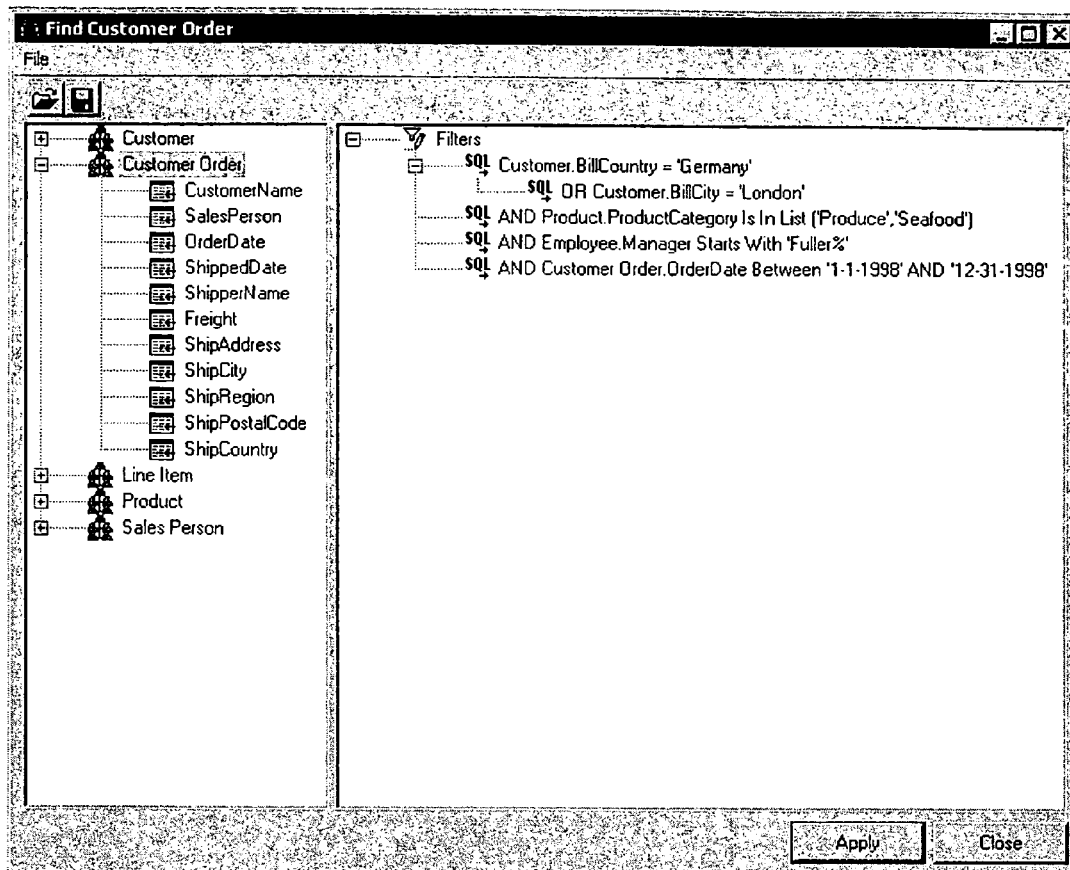
FIG. 37 depicts a list of searchable entities on the Advanced Search screen.

2. Advanced Searching: Advanced searching is accessed through the "Find @E (Advanced)" menu option (where @E is a placeholder for the name of the entity as in "Find Customer Order (Advanced)") for the parent entity menu context. The list of searchable entities on the left side of the screen is generated by interpreting the search path defined for the parent entity in the following way:

Each table join is parsed to determine the "table aliases" on each side of the join. The table alias is the same name as the physical table for entities that have not been aliased. Otherwise, it is the name of the physical table with an appended number to indicate the instance of the alias. This insures all table aliases are unique. For example, aliasing the Customer entity to distinguish between international and domestic Customers would generate the table alias CUSTOMER_1 for the new International Customer entity. The table alias is then used to index into the entity metadata to determine the entity names to use in the generation of the list of searchable entities on the left side of the screen. In this way, indirectly related entities will be included in the list of searchable entities as in the example in FIG. 37, which has been derived from the following search path in Table 11 for the Customer Order entity:

TABLE 11

Search Path Table Joins

CUSTOMER.CUSTOMER_ID=CUSTOMER_ORDER.CUSTOMER_ID
CUSTOMER_ORDER.CUSTOMER_ORDER_ID=LINE_ITEM.CUSTOMER_ORDER_ID
CUSTOMER_ORDER.SALES_PERSON_ID=EMPLOYEE.EMPLOYEE_ID
PRODUCT.PRODUCT_ID=LINE_ITEM.PRODUCT_ID

Once the list of searchable entities has been generated, the user may begin creating filters for columns within searchable entities. In the example, a list of filters is presented on the right side of the screen.

Several points are worth noting with regard to this list of filters. First, there are five individual filters defined each of which is conjoined to its predecessor by use of a logical AND or OR operator. Each filter references a column from an entity using the following format: Entity.Column. Thus, Customer Order.OrderDate refers to the OrderDate column from the Customer Order entity.

Indentation indicates order of precedence to insure parentheses are inserted into the translated SQL according to the wishes of the end user. Notice the affect of indentation on the translated SQL for the set of filters defined in the example:

```
(
((CUSTOMER_V.BillCountry='Germany') OR (CUSTOMER_V.BillCity='London'))
AND (PRODUCT_V.ProductCategory IN ('Produce', 'Seafood'))
AND (EMPLOYEE_V.Manager LIKE 'Fuller%')
AND    (CUSTOMER_ORDER_V.OrderDate
   BETWEEN '1-1-1998' AND '12-31-1998'))
)
```

The translated SQL should ultimately produce a list of Customer Orders where the bill was sent to either the city of London or the country of Germany for all orders entered during 1998 where the sales person was managed by someone with a last name of Fuller and where one or more products on the order belong to the Produce or Seafood product categories.

Figure 38:
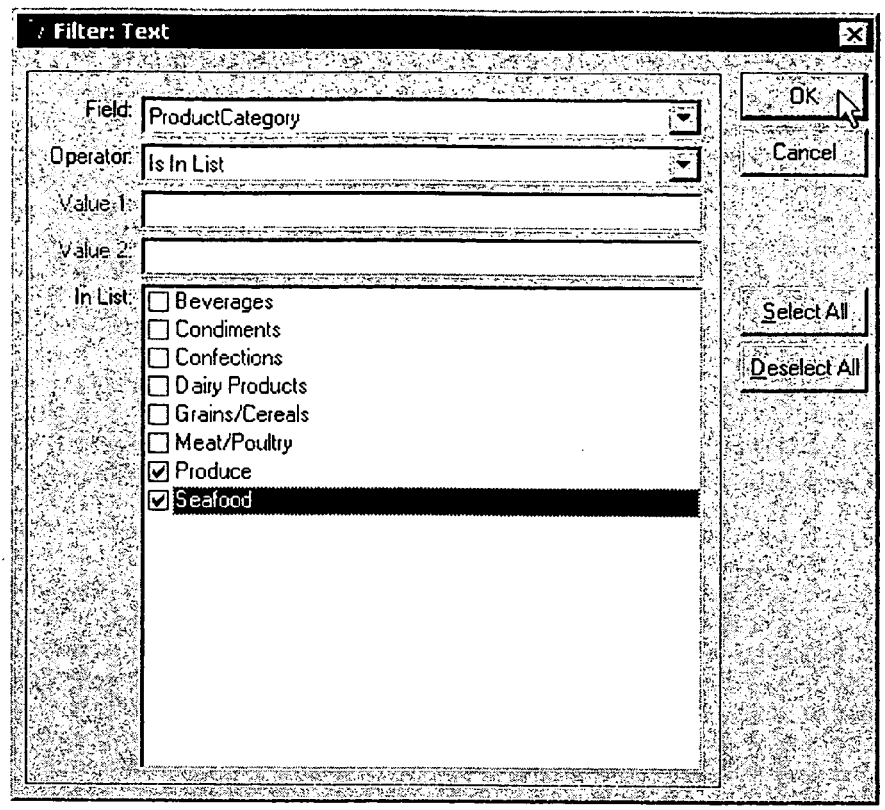
FIG. 38 depicts the Filter definition screen.

Before looking at the strategy used to generate the complete SQL statement, please refer to FIG. 38, which illustrates the method by which end users define filters. A Filter screen is presented for the column on which the user has decided to filter. Here, the Product-Catgory from the Customer Order entity has been selected. The caption of this screen indicates the type of filter appropriate for the selected column. In this case, the type of filter for the ProductCatgory column is Text. Number and Date filters are also available. The list of Operators available depends on the filter type. Most operators, such as the "Contains" Text operator, accept a single operand that is entered into the Value 1 field. Other operators, such as "Between", require two operands, which are entered into the Value 1 and Value 2 fields. Still other operators, such as Is In List, require the selection of one or more discreet values from the underlying view. The ProductCatgory makes use of the Is In List operator.

The strategy used to build the entire SQL statement follows:

1. Add the view and table associated with the parent entity to the FROM clause. Add the join between the table and view to the WHERE clause.
2. For each entity that is not the focus of the search (i.e. is not the parent entity), but has been referenced in one or more filters, add the entity's associated table and view to both the FROM and WHERE clauses as in the previous step.

If an entity has been aliased, then the table and table alias are used in the FROM clause and the table alias is used in the WHERE clause. For example, to join the International Customer entity (described earlier) with the Customer Order entity, the FROM and WHERE clauses would be as follows:
    FROM: CUSTOMER CUSTOMER_1, CUSTOMER_ORDER
    WHERE: CUSTOMER_1.CUSTOMER_ID= CUSTOMER_ORDER.CUSTOMER_ID
3. For each entity that is not the focus of the search but has been referenced in one or more filters, join the entity's associated table with the table associated with the parent entity. For the Product entity, this would produce the following table joins with respect to the Customer Order parent entity:
    CUSTOMER_ORDER.CUSTOMER_ORDER_ID=LINE_ITEM.CUSTOMER_ORDER_ID
    PRODUCT.PRODUCT_ID=LINE_ITEM.PRODUCT_ID
    This list may produce redundancy where the same table joins are generated for more than one entity with respect to the Customer Order parent entity.
4. Remove redundancy from the previous step and append the resulting list of joins to the WHERE clause.
5. Append the translated SQL for the list of filters to the WHERE clause.
6. Define the SELECT clause by selecting the primary key column from the view associated with the parent entity:
    SELECT CUSTOMER_ORDER_V.CUSTOMER_ORDER_ID
7. Nest the entire SQL statement (generated by appending the SELECT, FROM, and WHERE clauses) inside of an outer SQL statement which follows the following format relative to the example:
    SELECT CUSTOMER_ORDER_V.*
    FROM CUSTOMER_ORDER_V
    WHERE CUSTOMER_ORDER_V.CUSTOMER_ORDER_ID IN (SQL statement from first 7 steps)
    ORDER BY CUSTOMER_ORDER_V.CustomerName ASC, CUSTOMER_ORDER_V.OrderDate DESC This general format insures that a list of Customer Orders is returned as the result set regardless of the entities selected in the list of filters. The ORDER BY clause is derived from the entity sort column metadata for the parent entity.
8. The final SQL generated by the advanced search is as follows:
SELECT CUSTOMER_ORDER_V.*
FROM CUSTOMER_ORDER_V
WHERE CUSTOMER_ORDER_V.CUSTOMER_ORDER_ID IN
(
SELECT CUSTOMER_ORDER_V.CUSTOMER_ORDER_ID
FROM CUSTOMER_ORDER_V, CUSTOMER_ORDER, CUSTOMER, CUSTOMER_V, LINE_ITEM, PRODUCT, PRODUCT_V, EMPLOYEE, EMPLOYEE_V
WHERE CUSTOMER_ORDER_V.CUSTOMER_ORDER_ID=CUSTOMER_ORDER.CUSTOMER_ORDER_ID AND CUSTOMER.CUSTOMER_ID=CUSTOMER_ORDER.CUSTOMER_ID
AND CUSTOMER_V.CUSTOMER_ID=CUSTOMER.CUSTOMER_ID
AND CUSTOMER_ORDER.CUSTOMER_ORDER_ID=LINE_ITEM.CUSTOMER_ORDER_ID
AND PRODUCT.PRODUCT_ID=LINE_ITEM.PRODUCT_ID
AND PRODUCT_V.PRODUCT_ID=PRODUCT.PRODUCT_ID
AND EMPLOYEE.EMPLOYEE_ID=CUSTOMER_ORDER.SALES_PERSON_ID
AND EMPLOYEE_V.EMPLOYEE_ID=EMPLOYEE.EMPLOYEE_ID
AND (((CUSTOMER_V.BillCountry='Germany') OR (CUSTOMER_V.BillCity='London'))
AND (PRODUCT_V.ProductCategory IN ('Produce','Seafood'))
AND (EMPLOYEE_V.Manager LIKE 'Fuller%')
AND (CUSTOMER_ORDER_V.OrderDate BETWEEN '1-1-1998' AND '12-31-1998'))
)
ORDER BY CUSTOMER_ORDER_V.CustomerName ASC, CUSTOMER_ORDER_V.OrderDate DESC Child Entities Once a set of parent entity records has been retrieved using one of the search methods described above, data lists may be generated for child entities. Each time the end user selects a child entity a data list is created by applying a filter to the view associated with the child. The filter is based on the currently selected record for the parent entity. The filter strategy depends on the relationship between the parent and child entities:

One-To-Many

The general form for dynamic filtering of data lists for One-To-Many relationships follows:
SELECT C_V.*
FROM C_V, C
WHERE C_V.PK=C.PK AND C.FK={P.PK}
Where:
    C_V=View associated with the child entity
    C=Table associated with the child entity
    P=Table associated with the parent entity
    PK=Primary key
    FK=Foreign key
    {P.PK}=Primary key value for the currently selected parent record
For the Customer Order—Line Item parent-child relationship, the following SQL is generated:
SELECT LINE_ITEM_V.*
FROM LINE_ITEM_V, LINE_ITEM
WHERE LINE_ITEM_V.LINE_ITEM_ID=LINE_ITEM.LINE_ITEM_ID
AND LINE_ITEM.CUSTOMER_ORDER_ID=10507
ORDER BY LINE_ITEM_V.CustomerName ASC, LINE_ITEM_V.OrderNumber ASC Many-To-One The general form for dynamic filtering of data lists for Many-To-One relationships follows:
SELECT C_V.*
FROM C_V, P
WHERE C_V.PK=P.FK AND P.PK={P.PK}

For the Customer Order—Customer parent-child relationship, the following SQL is generated:
SELECT CUSTOMER_V.*
FROM CUSTOMER_V, CUSTOMER_ORDER
WHERE CUSTOMER_V.CUSTOMER_ID=CUSTOMER_ORDER.CUSTOMER_ID
AND CUSTOMER_ORDER.CUSTOMER_ORDER_ID=10507
ORDER BY CUSTOMER_V.CustomerName ASC Many-To-Many The general form for dynamic filtering of data lists for Many-To-Many relationships follows:
SELECT C.PK, M_V.*
FROM M_V, C
WHERE M_V.PK=C.FK1 AND C.FK2={P.PK}
Where:
M_V=The view associated with the "maps-to-entity". In the context of the Many-To-Many relationship between the Employee and Spoken Language entities, the child entity corresponds to the Employee Spoken Language entity and the maps-to-entity is Spoken Language.

For the Employee—Spoken Language parent-child relationship, the following SQL is generated:
SELECT EMPLOYEE_SPOKEN_LANGUAGE.EMPLOYEE_SPOKEN_LANGUAGE_ID, SPOKEN_LANGUAGE_V.*
FROM EMPLOYEE_SPOKEN_LANGUAGE,SPOKEN_LANGUAGE_V
WHERE EMPLOYEE_SPOKEN_LANGUAGE.SPOKEN_LANGUAGE_ID=SPOKEN_LANGUAGE_V.SPOKEN_LANGUAGE_ID
AND EMPLOYEE_SPOKEN_LANGUAGE.EMPLOYEE_ID=7
ORDER BY SPOKEN_LANGUAGE_V.SpokenLanguage ASC For One-To-Many child entities, a special menu option exists to allow filtering of the child data list. This menu option is called "Filter @E Records", where @E is a placeholder for the name of the child entity. Since the purpose of the present invention is to provide a generic interface to any relational database, one never knows how many records might exist for a particular instance of a data list participating in a One-To-Many relationship. The "Filter @E Records" menu option uses the same screen illustrated during the discussion on advanced searching only for a slightly different purpose; that is, to filter a data list.

The "Promote @E" menu option, available for all child menu contexts, provides access to the promotion functionality discussed in the USER INTERFACE ARCHITECTURE.

Menus and Menu Contexts

The use of dynamically generated menus to invoke navigation and data entry functionality was discussed in the USER INTERFACE ARCHITECTURE section. This provides a method by which the UI software can dynamically adapt menu options according to where an entity exists within the UI architecture at any given point in time.

As mentioned under the USER INTERFACE ARCHITECTURE section, permissions are granted at the menu option level. Permissions might be revoked for security reasons. For example, it may be desirable to define a user group that has limited access to data entry features, but is allowed to search and view data. Another reason for revoking permissions is to provide a more intuitive data entry experience for end users. Since the UI architecture is designed to work with any relational database, given the overall business purpose behind the database, end users may not find certain menu options particularly intuitive or useful. To avoid confusion, these menu items can simply be disabled.

Following are a series of tables, grouped by menu context, which summarize the menu options available for each menu context. The "@E" symbol serves as a placeholder for the name of the entity. For child menu contexts, the "@P" symbol serves a placeholder for the name of the parent entity. Several of the menu options listed below in Table 12 through Table 16 will be illustrated under the USER INTERFACE OPERATION section:

TABLE 12

Parent Context

| Menu Option | Description |
|---|---|
| New @E Record | Adds a new record using a data entry form. |
| Duplicate @E Record | Creates a new record by copying forward data from the selected record into a data entry form. |
| Edit @E Record | Loads the selected record into a data entry form for editing. |
| Delete @E Record(s) | Deletes the selected records from the database, subject of course to referential integrity rules. |
| View @E Record | Loads the selected record into a data entry form for viewing. The data entry form is placed in read-only mode. |
| Export @E Record(s) | Exports the entire data list to one of several file formats using an export wizard. |
| Print Preview | Loads the data list into a print preview screen from where it can then be printed. |
| Print Report | Generates a custom report, such as a nicely formatted invoice, by passing the primary key of the selected record to a report writer using COM. For more information, see the APPLICATION EXTENSIBILITY section. |
| Find @E (Advanced) | Loads the advanced searching screen. |
| Find @P | Uses a COM interface to load an external component that will provide a custom search screen. For more information, see the APPLICATION EXTENSIBILITY section. |
| Display Data Entry Grid | Loads the data list into a data entry grid for editing. For more information on data entry grids, see the Data Entry Forms subsection under the USER INTERFACE GENERATION section. |

TABLE 13

Reference Context

| Menu Option | Description |
|---|---|
| New @E Record | Adds a new record using a data entry form. |
| Duplicate @E Record | Creates a new record by copying forward data from the selected record into a data entry form. |
| Edit @E Record | Loads the selected record into a data entry form for editing. |
| Delete @E Record(s) | Deletes the selected records from the database, subject of course to referential integrity rules. |
| View @E Record | Loads the selected record into a data entry form for viewing. The data entry form is placed in read-only mode. |
| Export @E Record(s) | Exports the entire data list to one of several file formats using an export wizard. |
| Print Preview | Loads the data list into a print preview screen from where it can then be printed. |

TABLE 13-continued

Reference Context

| Menu Option | Description |
| --- | --- |
| Display Data Entry Grid | Loads the data list into a data entry grid for editing. For more information on data entry grids, see the Data Entry Forms subsection under the USER INTERFACE GENERATION section. |

TABLE 14

One-To-Many Context

| Menu Option | Description |
| --- | --- |
| New @E Record | Adds a new record using a data entry form. The foreign key field, which relates the entity to its parent, is automatically populated with the primary key value from the currently selected parent record. |
| Duplicate @E Record | Creates a new record by copying forward data from the selected record into a data entry form. |
| Edit @E Record | Loads the selected record into a data entry form for editing. |
| Delete @E Record(s) | Deletes the selected records from the database, subject of course to referential integrity rules. |
| Link Selected @E Record(s) with a Different @P Record | Loads a simple search screen to allow the end user to select a different parent record in which to link the currently selected child. The foreign key field in the child will be updated. |
| Unlink the Selected @E Record(s) from the @P Record | Sets the foreign key field of the child entity to NULL, subject of course to referential integrity rules. |
| View @E Record | Loads the selected record into a data entry form for viewing. The data entry form is placed in read-only mode. |
| Export Record(s) | Exports the entire data list to one of several file formats using an export wizard. |
| Print Preview | Loads the data list into a print preview screen from where it can then be printed. |
| Filter @E Records | Loads the same screen used for advanced searching. However, the filters defined are simply applied to the data list to limit the number of visible records. |
| Promote @E | Promotes the selected child entity, including the data list, into a new screen where the child becomes the parent entity. |
| Display Data Entry Grid | Loads the data list into a data entry grid for editing. For more information on data entry grids, see the Data Entry Forms subsection under the USER INTERFACE GENERATION section. |

TABLE 15

Many-To-One Context

| Menu Option | Description |
| --- | --- |
| New @E Record | Adds a new record using a data entry form. If successfully saved, the new primary key value will be used to update the foreign key field of the currently selected parent record. |
| Duplicate @E Record | Creates a new record by copying forward data from the selected record into a data entry form. If successfully saved, the new primary key value will be used to update the foreign key field of the currently selected parent record. |
| Edit @E Record | Loads the selected record into a data entry form for editing. |
| Delete @E Record(s) | Deletes the selected records from the database, subject of course to referential integrity. The delete will fail unless the database is |

TABLE 15-continued

Many-To-One Context

| Menu Option | Description |
| --- | --- |
| | configured to cascade deletes since deleting the child in this context necessitates deletion of the parent record. |
| Link the @P Record with a Different @E Record | Loads a simple search screen to allow the end user to select a different child record in which to link the currently selected parent record. In this context, the foreign key field of the parent entity will be updated. |
| Unlink the @P Record from the Selected @E Record | Sets the foreign key field of the parent entity to NULL, subject of course to referential integrity rules. |
| View @E Record | Loads the selected record into a data entry form for viewing. The data entry form is placed in read-only mode. |
| Export Record(s) | Exports entire data list to one of several file formats using an export wizard. |
| Print Preview | Loads the data list into a print preview screen from where it can then be printed. |
| Promote @E | Promotes the selected child entity, including the data list, into a new screen where the child becomes the parent entity. |
| Display Data Entry Grid | Loads the data list into a data entry grid for editing. For more information on data entry grids, see the Data Entry Forms subsection under the USER INTERFACE GENERATION section. |

TABLE 16

Many-To-Many

| Menu Option | Description |
| --- | --- |
| New @E Record | Loads a data entry form for the "maps-to-entity". The maps-to-entity is the entity to which the parent is indirectly related (e.g. Employee to Spoken Language). The placeholder, "@E", corresponds to the maps-to-entity. If successfully saved, an additional record will be inserted into the intersection table which links the parent and maps-to-entities (e.g. EMPLOYEE_SPOKEN_LANGUAGE). |
| Duplicate @E Record | Creates a new record by copying forward data for the maps-to-entity from the selected record into a data entry form. If successfully saved, an additional record will be inserted into the intersection table which links the parent and maps-to-entities. |
| Edit @E Record | Loads the selected record for the maps-to-entity into a data entry form for editing. |
| Delete @E Record(s) | Deletes the selected records for the maps-to-entity from the database, subject of course to referential integrity rules. Before deleting the maps-to-entity records, the related records from the intersection table are deleted. |
| Link the Selected @P Record with a @E Record(s) | Loads the simple search screen for the maps-to-entity. For each record selected from the maps-to-entity, a corresponding record is inserted into the intersection table thus linking the parent and maps-to-entities. |
| Unlink the @P Record from the Selected @E Record(s) | Deletes the selected records from the intersection table which links the parent and maps-to-entities. |
| View @E Record | Loads the selected record (for the maps-to-entity) into a data entry form for viewing. The data entry form is placed in read-only mode. |
| Export Record(s) | Exports the entire data list to one of several file formats using an export wizard. |
| Print Preview | Loads the data list into a print preview screen from where it can then be printed. |

TABLE 16-continued

Many-To-Many

| Menu Option | Description |
| --- | --- |
| Promote @E | Promotes the selected child entity, including the data list, into a new screen where the child becomes the parent entity. |
| Display Data Entry Grid | Loads data list into a data entry grid for editing. For more information on data entry grids, see the Data Entry Forms subsection under the USER INTERFACE GENERATION section. |

Data Entry Forms

Data entry forms consist of an ordered collection of data entry controls derived from metadata relating to entity fields. The general strategy is to validate as much data as possible while the end user enters data into each of the data entry controls. For example, the DateTimeControl control type, which presents a graphical image of a calendar to the end user, will not permit an invalid date to be entered. Similarly, the ComboBoxControl, implemented graphically as a drop-down list, will only accept valid foreign key values from the list.

When the user decides to save a record to the database, the Required entity field attribute is used to insure all required data has been entered. Business rules, discussed below, may be defined to provide further data validation.

Entity and entity field scripting, using language such as VBScript and JavaScript, are also available to implement data validation or other desired functionality. Form-level events, such as FormLoad, BeforeSave, and AfterSave, are triggered at run-time. Scripting may be attached to these events to provide custom functionality. Some events provide a mechanism for canceling further processing. For instance, before saving a new Line Item to the database, suppose the system administrator wants to insure there is sufficient inventory on hand to fill the order. The following VBScript might be entered in the BeforeSave event. Notice that if sufficient inventory is not on hand, setting the Cancel argument to TRUE prevents further processing:

```
Public Sub LINE_ITEM_BeforeSave(Cancel)
  Dim SQL
  Dim rs
  Dim Message
  'If entering a new Line Item, check the affect on inventory
    by building an SQL statement
  'using the Quantity and Product fields from the data entry
    form.
  If Application.NewRecord Then
    SQL="SELECT * FROM PRODUCT WHERE
      (UNITS_IN_STOCK —"
    SQL=SQL & Application.Fields("QUANTITY").Value
      & ")<=0"
    SQL=SQL & "AND PRODUCT_ID="& Application-
      .Fields("PRODUCT_ID").Value
    'Create a recordset object using ADO to store the query
      results.
    Set rs=CreateObject("ADODB.Recordset")
    'Get a connection to the database.
    Set rs.Activeconnection=Application.DBConnection
    rs.Open SQL
    'If a record is returned in the result set, it means the
      inventory is too low.
    If Not (rs.BOF And rs.EOF) Then
      Message="There is insufficient inventory on hand."
      Message=Message & "This line item cannot be added
        to the order."
      'Present a message to the user.
      MsgBox Message, vbOkOnly+vbInformation,
        "Insufficient Inventory"
      'Cancel further processing of events.
      Cancel=TRUE
    End If
    rs.Close
    Set rs=Nothing
  End If
End Sub
```

Script may also be attached to entity field events such as OnChange. The OnChange event is triggered when the value in a data entry control changes.

In addition to data validation, the present embodiment provides access to a limited programmable interface, or object model as it is frequently referred to, to perform various tasks such as enabling and disabling, or showing and hiding, data entry controls at run-time. Future embodiments should provide a more robust object model. However, a reasonable balance must be maintained between the use of metadata attributes to modify run-time behavior and the integration of scripting to achieve the same affect. Even though scripting is stored as metadata in the configuration repository, and does not require recompilation and redeployment of the UI software when changes are made, it is nonetheless computer code. Remember, the underlying premise of the present invention is that computer code is extremely expensive to develop and maintain.

Figure 39:
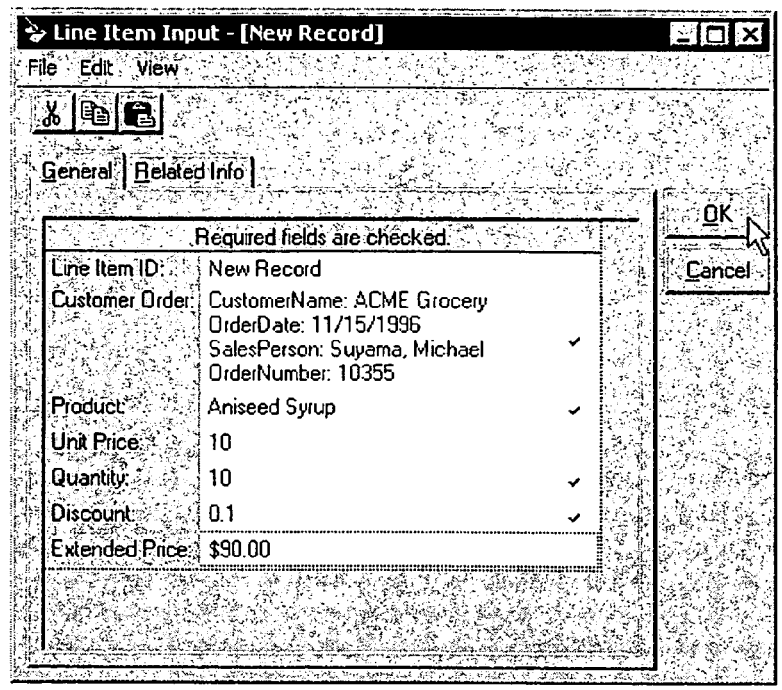
FIG. 39 depicts a new Line Item record for which SQL will be generated.

Once the data entry form has been validated, SQL is generated to update the underlying database table using entity and entity field metadata in conjunction with the values stored in each data entry control. Saving the new Line Item record depicted in FIG. 39 would generate the following SQL statement:

INSERT INTO LINE_ITEM (LINE_ITEM_ID, CUSTOMER_ORDER_ID, PRODUCT_ID, QUANTITY, DISCOUNT, EXTENDED_PRICE) VALUES(2186, 10355, 3, 10, 0.1, 90.00)

Occasionally, it may be preferable to have end users enter data into a grid-like data entry form where multiple records can be edited on a single screen. A special menu option, "Display Data Entry Grid", provides access to this type of functionality. FIG. 40 illustrates such a data entry grid for the Line Item entity. The functionality is nearly identical to that of the normal data entry form with the primary exception being that a record is saved when the focus shifts from one record to another as opposed to clicking a button.

Data Entry Controls

Several data entry controls are available to collect input from end users. Each of these controls is designed to provide an intuitive data entry experience using many of the same graphical constructs to which users have grown accustomed. Where possible, the data entry controls validate input to protect the integrity of the underlying database. An overview of each control type will now be presented to provide the reader with a better understanding of how data is collected from end users. Please note that future embodiments of the present invention should expand upon the following selection of control types to provide a wider variety of preprogrammed controls, thus eliminating the need for custom data entry forms. (Integrating custom data entry forms into the UI is discussed in the APPLICATION EXTENSIBILITY section):

CalculatedControl

The CalculatedControl is a read-only data entry control designed to derive a value from the underlying database and display the value on the data entry form. A CalculatedControl is "bound" if it maps to a field in the physical table associated with the entity and "unbound" if the derived value is not stored in the underlying table. As with the ComboBoxControl and SmartComboControl controls, three Expression Types are available to derive the calculated value: EXPRESSION, SQL, and STORED_PROCEDURE. Regardless of Expression Type, the execution of the corresponding Expression attribute at run-time should return a single value.

Figure 41:
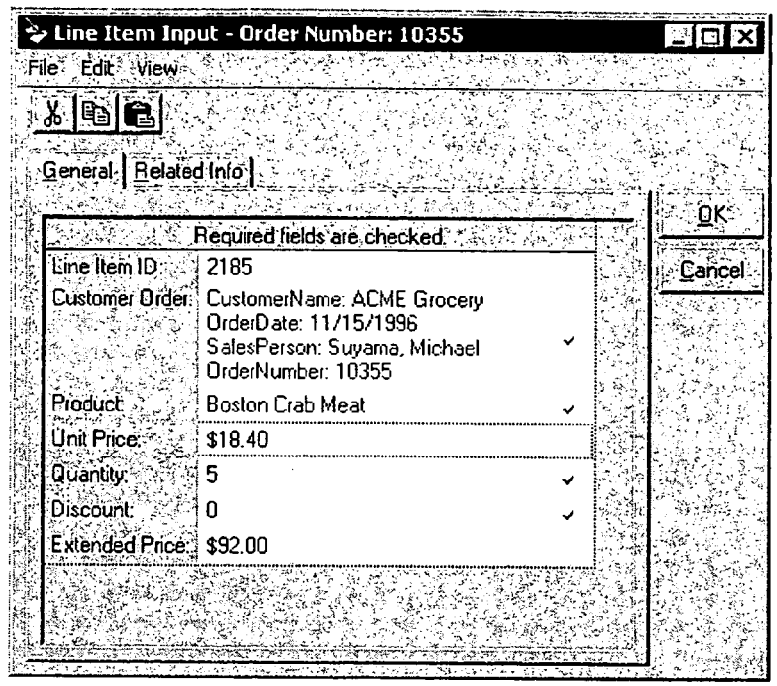
FIG. 41 depicts the Unit Price and Extended Price calculated data entry controls.

Two CalculatedControls are present on the Line Item data entry form in FIG. 41. The Unit Price simply displays the Unit Price for the currently selected Product. Notice that a UNIT_PRICE field does not exist in the LINE_ITEM table. The unbound UNIT_PRICE field has been added to the Line Item entity metadata. The SQL Expression Type has been defined and the following Expression is evaluated at run-time to derive the value displayed in the control:
SELECT UNIT_PRICE FROM PRODUCT WHERE PRODUCT_ID={PRODUCT_ID}

The parameter passed within the curly brackets simply tells the UI software to insert the value of the PRODUCT_ID foreign key field (i.e. the currently selected Product on the Line Item record) into the SQL statement. The value returned from this SQL statement is then inserted into the Unit Price data entry control.

The second CalculatedControl control on the Line Item form is used to calculate the Extended Price. The Extended Price is bound to the EXTENDED_PRICE field in the LINE_ITEM table. Here, the STORED_PROCEDURE Expression Type is used and the following Expression is evaluated at run-time:
stpExtendedPrice {PRODUCT_ID}, {QUANTITY}, {DISCOUNT}

The values from Product, Quantity, and Discount fields on the Line Item are passed from the data entry form to the stored procedure, "stpExtendedPrice". An output parameter is then used by the stored procedure to return a value back to the UI software.

CheckBox

Figure 42:
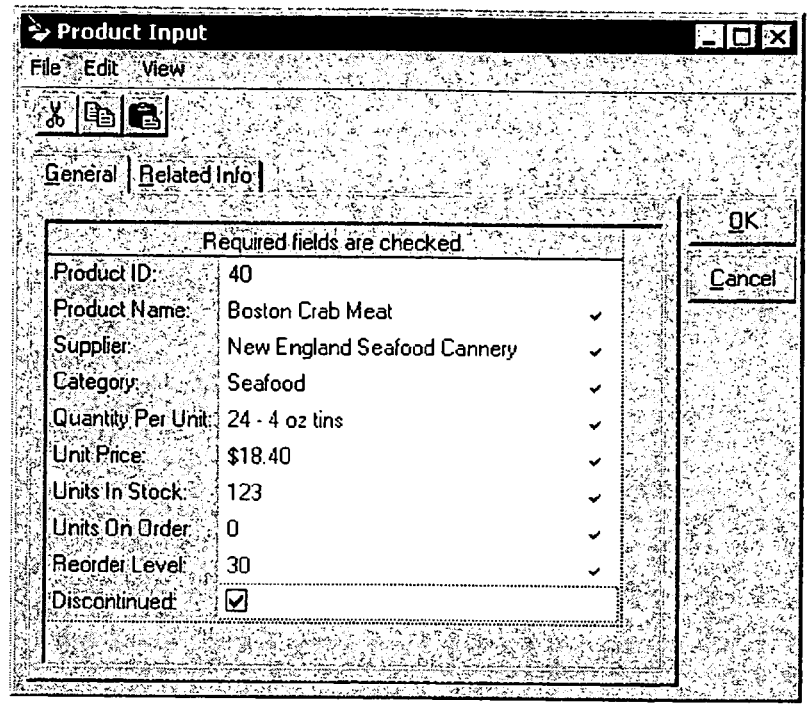
FIG. 42 depicts the CheckBox data entry control.

The CheckBox, depicted in FIG. 42, is designed to represent Boolean fields. A graphical image of check box is presented to the end user. Clicking the box toggles the value from TRUE, when the box is checked, to FALSE, when the box is not checked.

ComboBoxControl

The ComboBoxControl was discussed in the METADATA GENERATION section. A couple additional features add to the control's versatility. These features are implemented through the entity field attributes shown in Table 17:

TABLE 17

Figure 43:
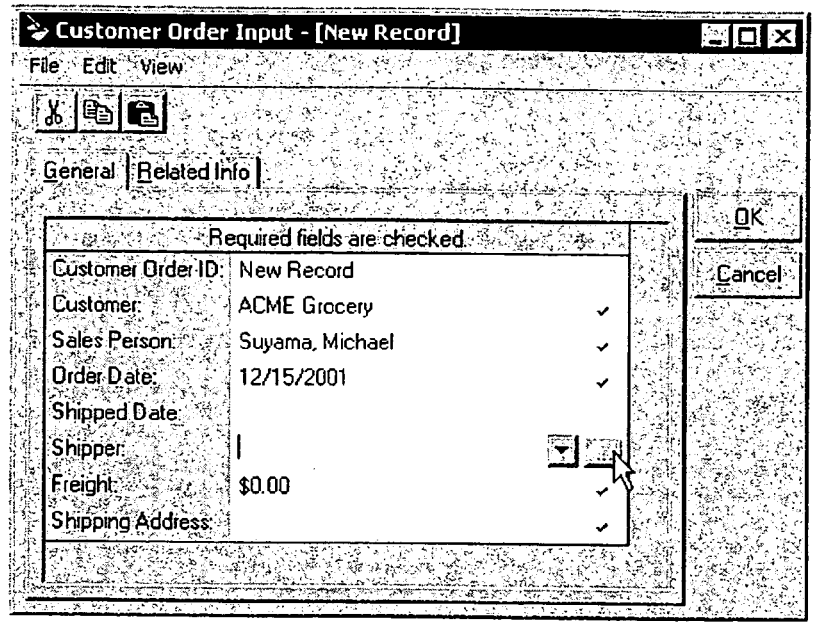
FIG. 43 depicts the process of adding a new Shipper while using a ComboBoxControl.
Figure 44:
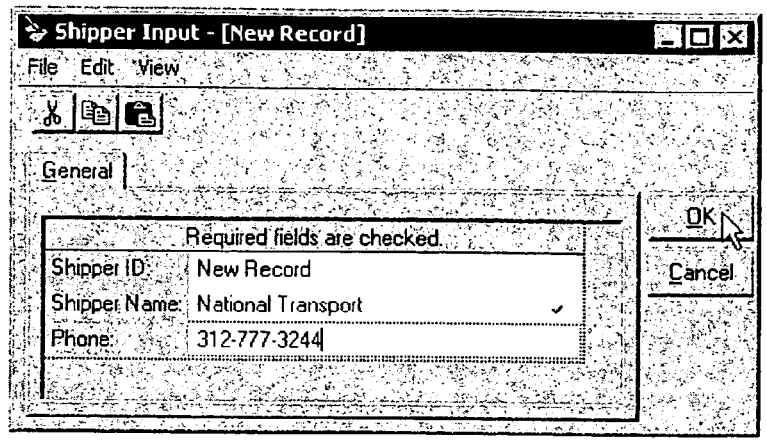
FIG. 44 depicts the Shipper data entry form that was loaded by a ComboBoxControl.
Figure 45:
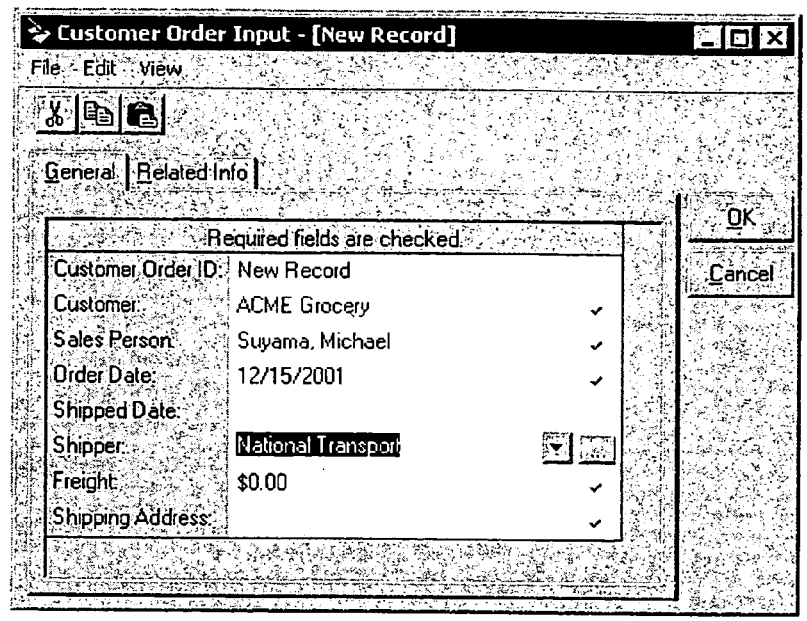
FIG. 45 depicts the newly added Shipper in the ComboBoxControl.

| Attribute | Description |
|---|---|
| Allow Edit | Set the Allow Edit attribute to TRUE to allow entry of new values into the dropdown list by adding a new record to the related entity. FIGS. 43-45 illustrate the process of adding a new Shipper while entering a Customer Order record. |
| Limit To List | By default, this attribute is set to TRUE and the user must select an item from the dropdown list, as should be the case when using the ComboBoxControl to |

TABLE 17-continued

| Attribute | Description |
|---|---|
| | populate a foreign key field. However, by setting this attribute to FALSE, the user can either select a value from the list or type a new value directly into the edit box portion of the control. NOTE: Limit To List should never be set to FALSE for foreign key fields. Consider the following scenario: Suppose it is desirable to present a list of countries in the Country field of the Address entity. Country is not a foreign key field. Converting the Country field from a TextBoxControl to a ComboBoxControl and using the following SQL Expression will generate a list of countries: SELECT DISTINCT COUNTRY FROM ADDRESS ORDER BY COUNTRY |

DateTimeControl

Figure 1:
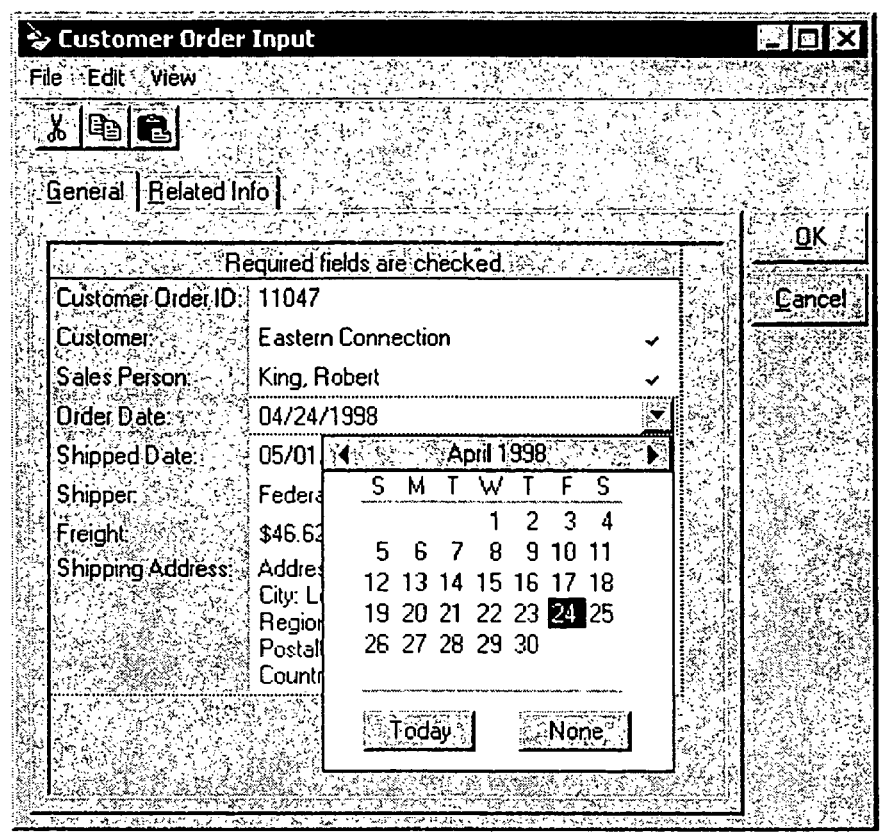
FIG. 1 depicts a data entry control.

The DateTimeControl uses a single attribute to determine whether to accept date or time input from the end user. When the Date Time Control Type attribute is set to DATE_CONTROL, the control will present a calendar to the end user from which a date may be selected (see FIG. 1). Alternatively, the user can simply enter a date into the edit box. However, if the attribute is set to one of four available time formats, such as TIME_CONTROL (01:15 PM), then the user simply enters a time into the edit box. The value entered is validated against the selected format.

FileDialogControl

Figure 46:
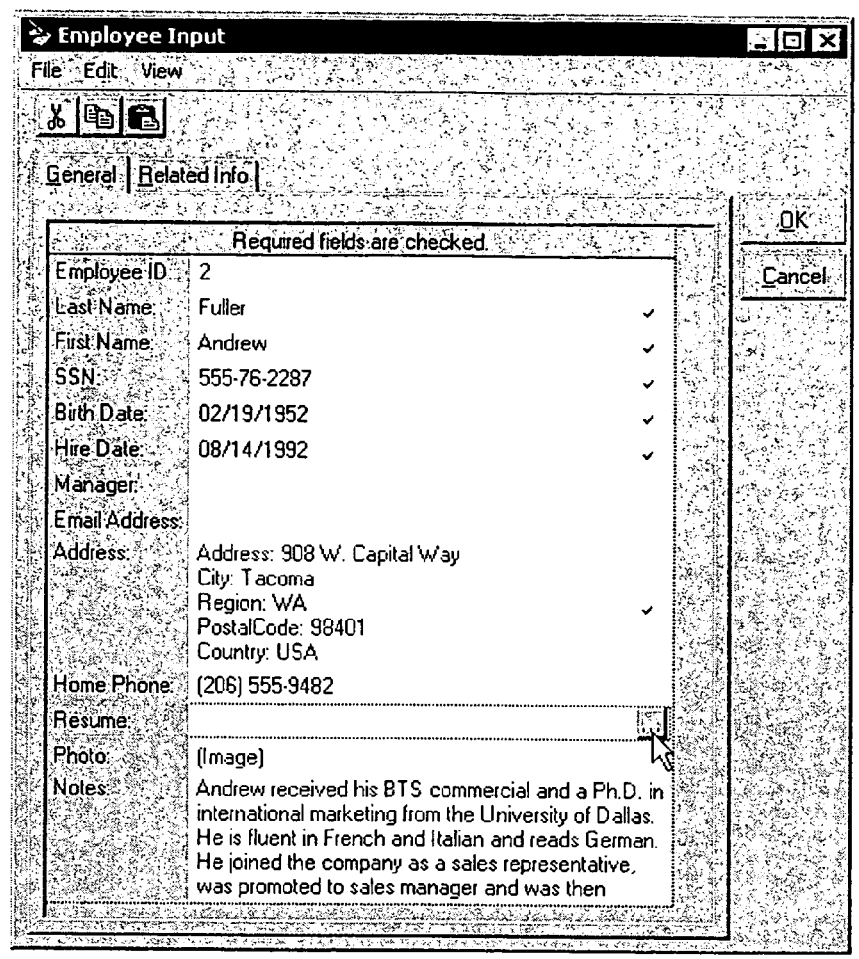
FIG. 46 depicts the process of using the FileDialogControl data entry control.
Figure 47:
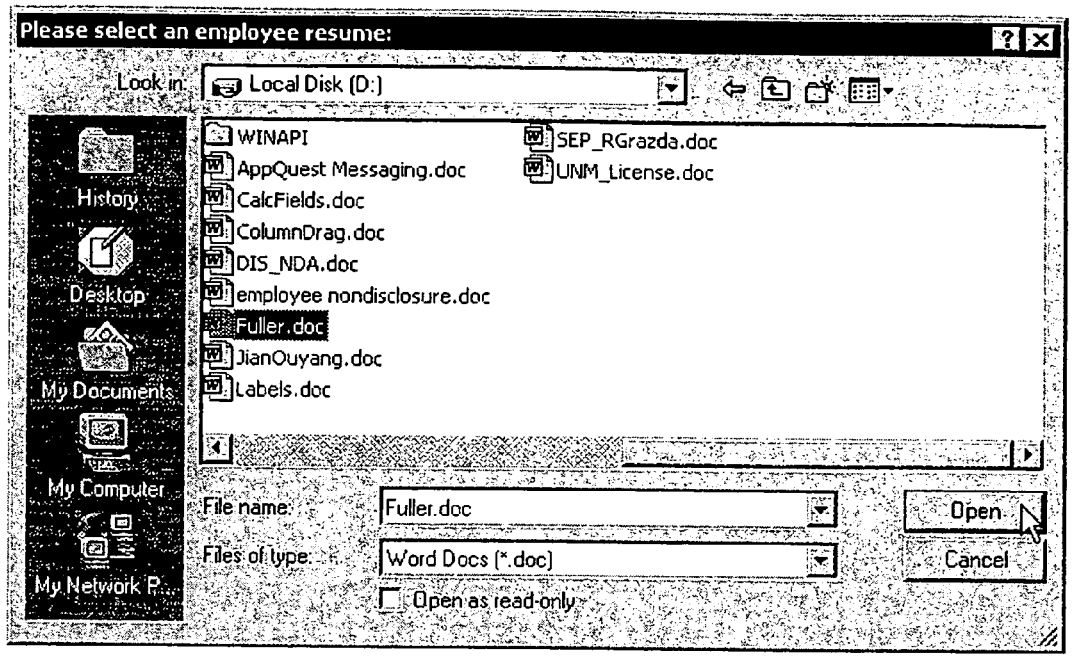
FIG. 47 depicts the process of using the FileDialogControl data entry control.
Figure 48:
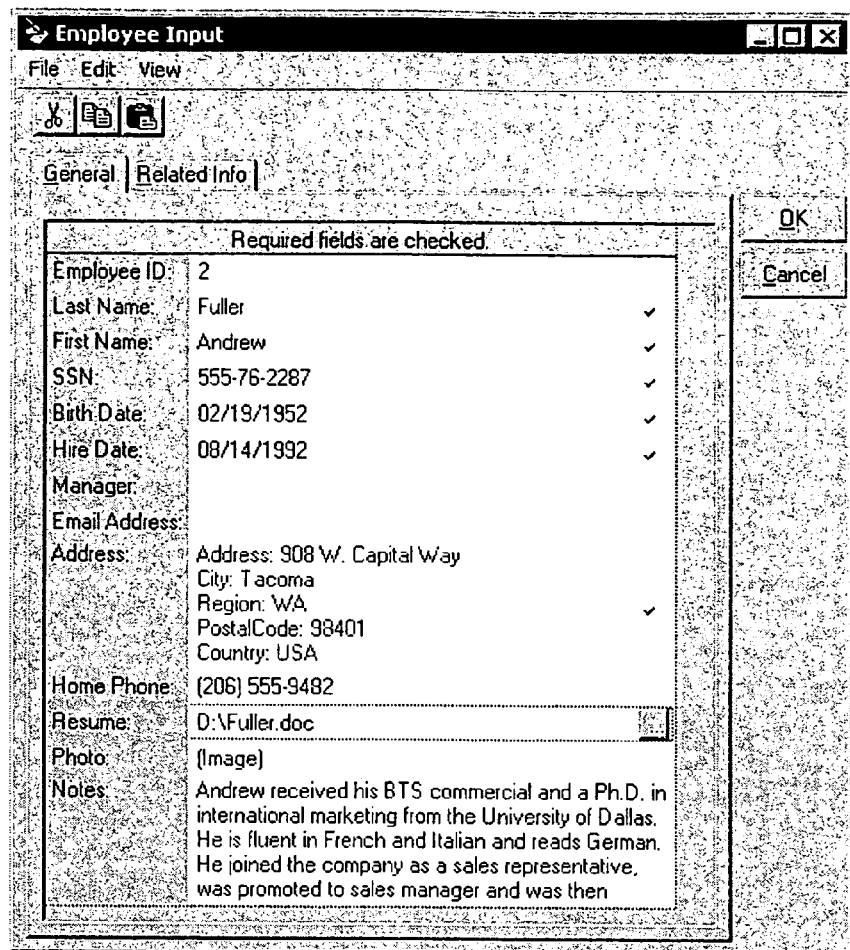
FIG. 48 depicts the process of using the FileDialogControl data entry control.

Frequently, users need to store the path to a document or image file in a database field. The FileDialogControl is designed to allow users to navigate through their directory structures to select a particular file. The entire path is returned to the control. Setting the File Association attribute to TRUE will create a hyper-link between the path displayed in the control and the computer software associated with the file. For example, if the path to a Microsoft Word document is displayed in the control, clicking the hyper-linked path will load the document into an instance of Word. Operation of the FileDialogControl is illustrated in FIG. 46-48.

ImageBLOB

Figure 49:
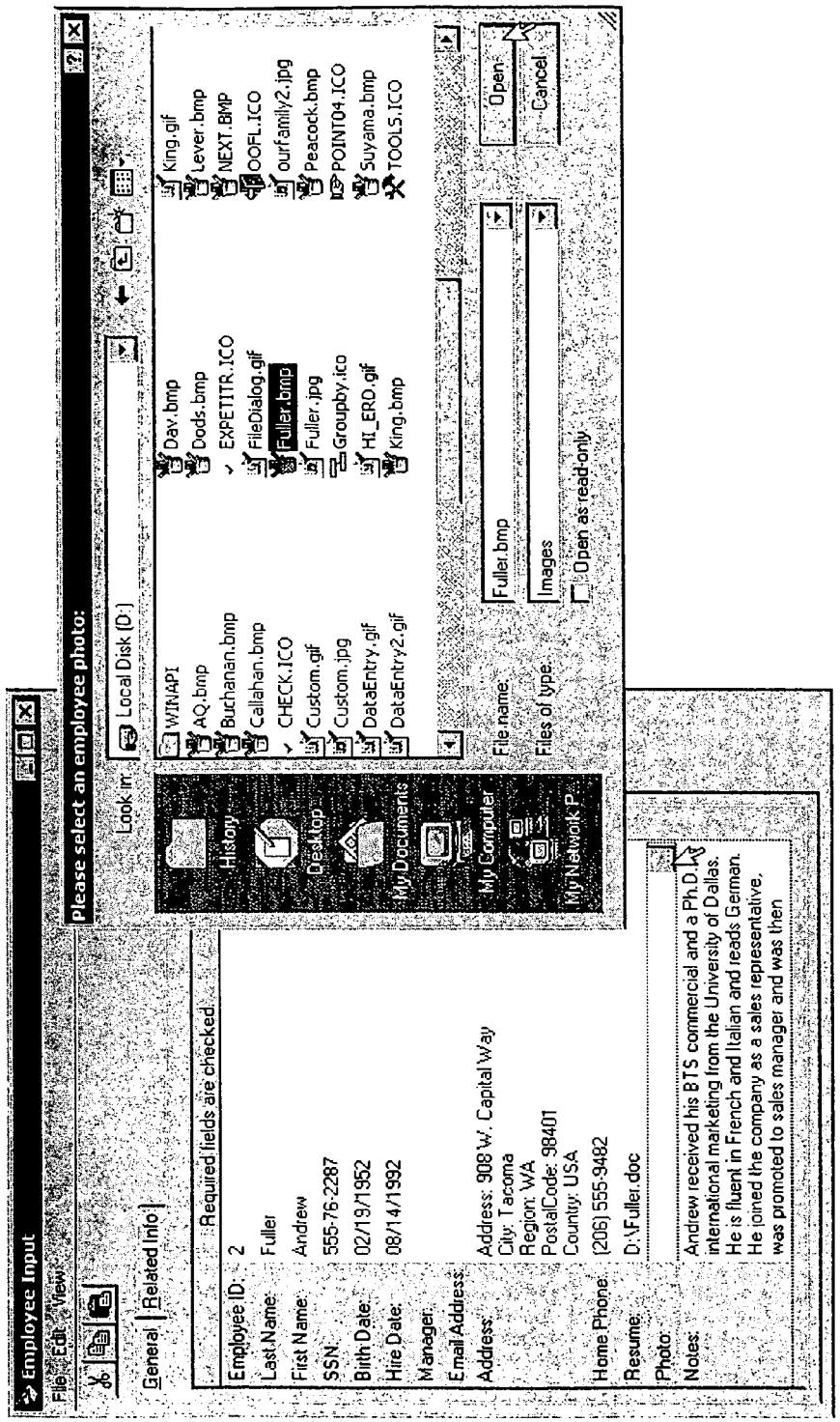
FIG. 49 depicts the process of using the ImageBLOB data entry control.
Figure 50:
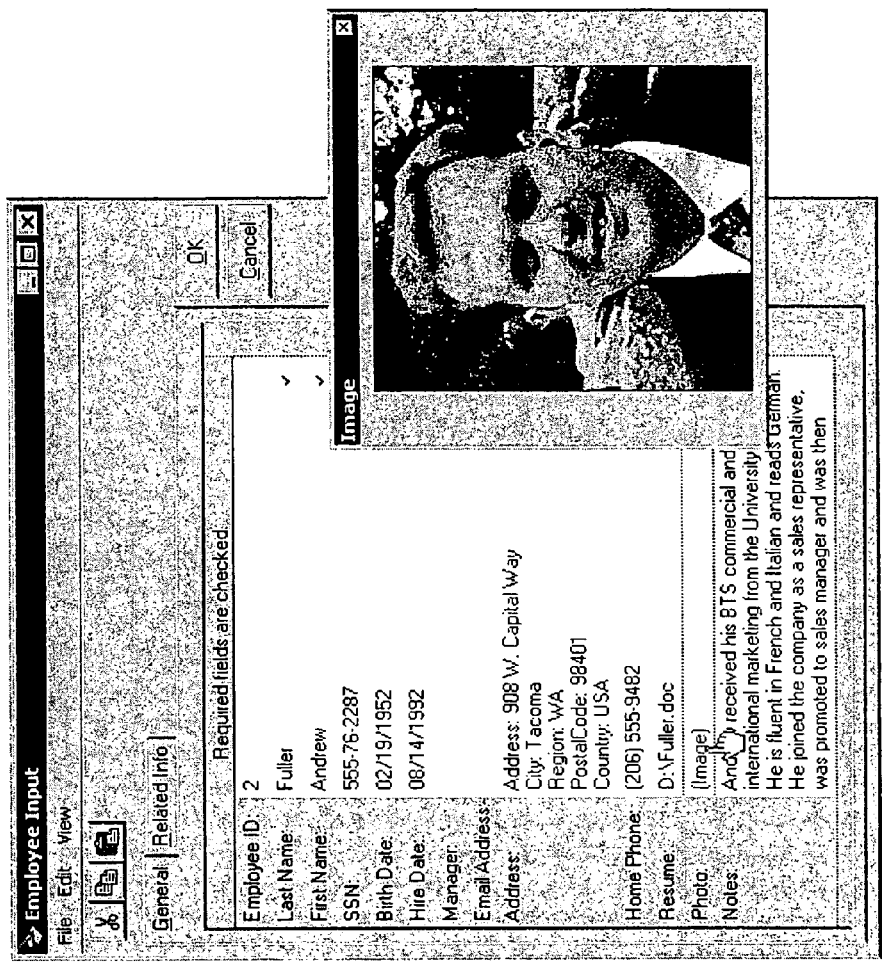
FIG. 50 depicts the process of using the ImageBLOB data entry control including viewing an image.

The ImageBLOB is very similar to the FileDialogControl. Users can select image files from their directory structures. However, instead of storing the path to the image in the database, a binary copy of the image itself is stored. Obviously, this control type is only appropriate for database fields capable of storing binary large objects (BLOB). Once the image has been stored, a hyper-link may be clicked to load the image as illustrated with the Photo field in the Employee entity (see FIGS. 49-50).

MaskEditBox

The MaskEditBox is designed to provide an input mask for text fields that store formatted data such as social security numbers. The Mask Type attribute defines the type of mask to be used. A few predefined masks are available such as PHONE_MASK and SSN_MASK. The GENERAL_MASK Mask Type is used in combination with the Format entity field attribute to define custom input masks using a set of special characters. For example, setting the Format attribute to "A###" generates an input mask that ensures the first character must be alphanumeric and the last three characters must be digits.

Figure 51:
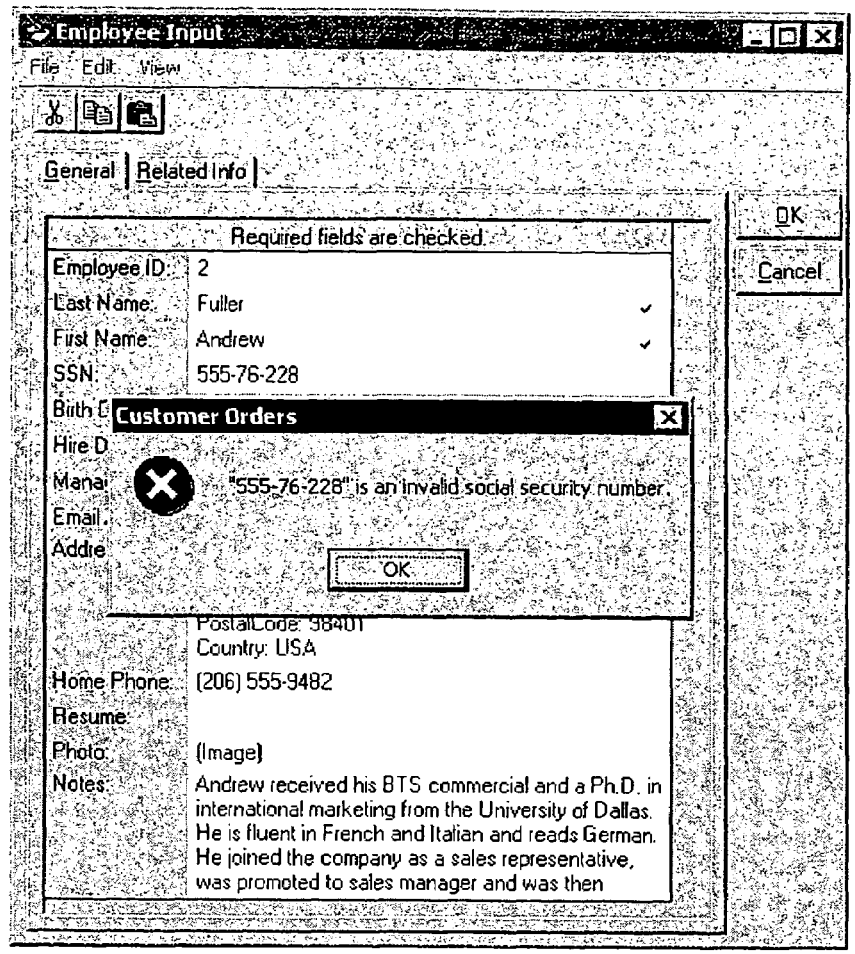
FIG. 51 depicts the MaskEditBox data entry control.

The SSN field in the Employee entity uses the SSN_MASK Mask Type as illustrated in FIG. 51.

NotesControl

Figure 52:
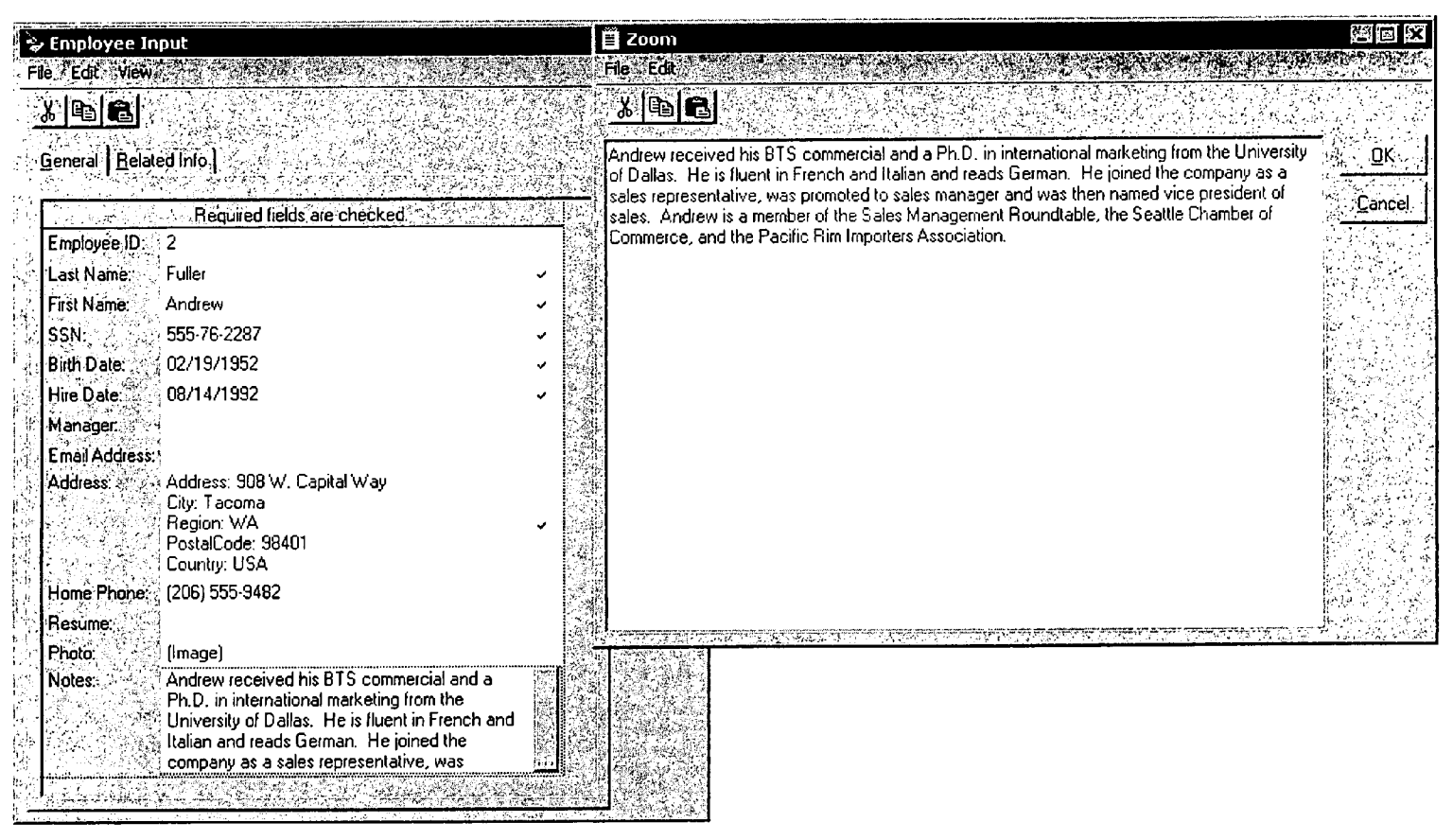

The NotesControl eases the entry of large amounts of text by providing multiple lines in the edit box and exposing a button which, when clicked, loads the text into a larger scrollable edit box in a "zoom" screen (see FIG. 52).

NumericFormatBox

Figure 53:
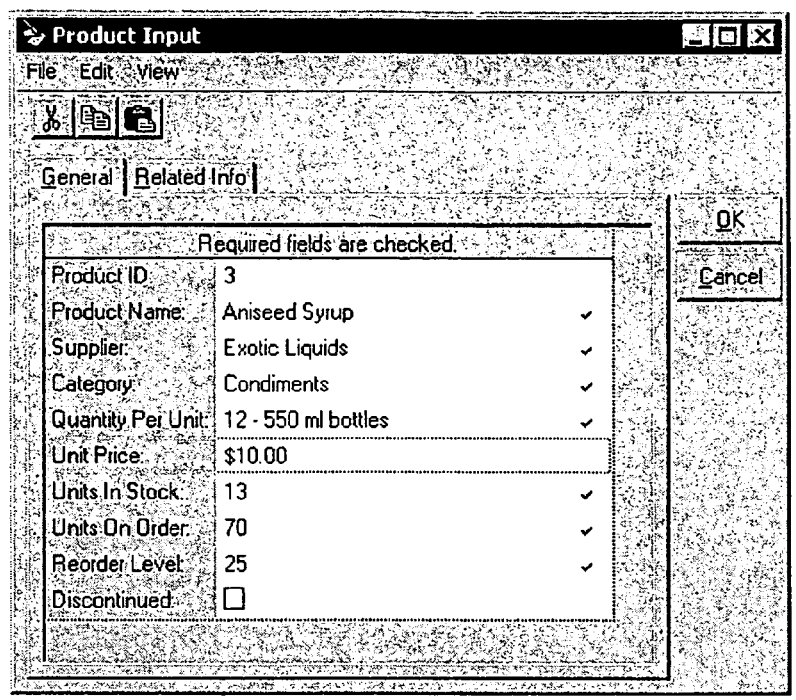
FIG. 53 depicts the NumericFormatBox data entry control.

The NumericFormatBox, illustrated in FIG. 53, is a simple edit box that enforces entry of numeric data. The Format entity field attribute may be used to format the data display, such as presenting monetary data using currency symbols.

SmartComboControl

The SmartComboControl was discussed in some detail under the METADATA GENERATION section. From the end user's perspective, this control type provides two key pieces of functionality summarized in Table 18:

TABLE 18

| Feature | Description |
| --- | --- |
| Hyper-linking | Once the foreign key field has been populated, the edit box is hyper-linked to the record from the related entity. Clicking the hyper-link loads a data entry form for the related entity. |
| Modifying the foreign key value | Clicking the button on the right side of the control loads a simple text search screen for the related entity. Selecting a record from the list modifies the foreign key value in the underlying data entry form. An example will be presented in the USER INTERFACE OPERATION section |

TextBoxControl

The TextBoxControl allows open-ended text data entry, such as with a street address. A few entity field attributes provide additional functionality as summarized in Table 19:

TABLE 19

Figure 54:
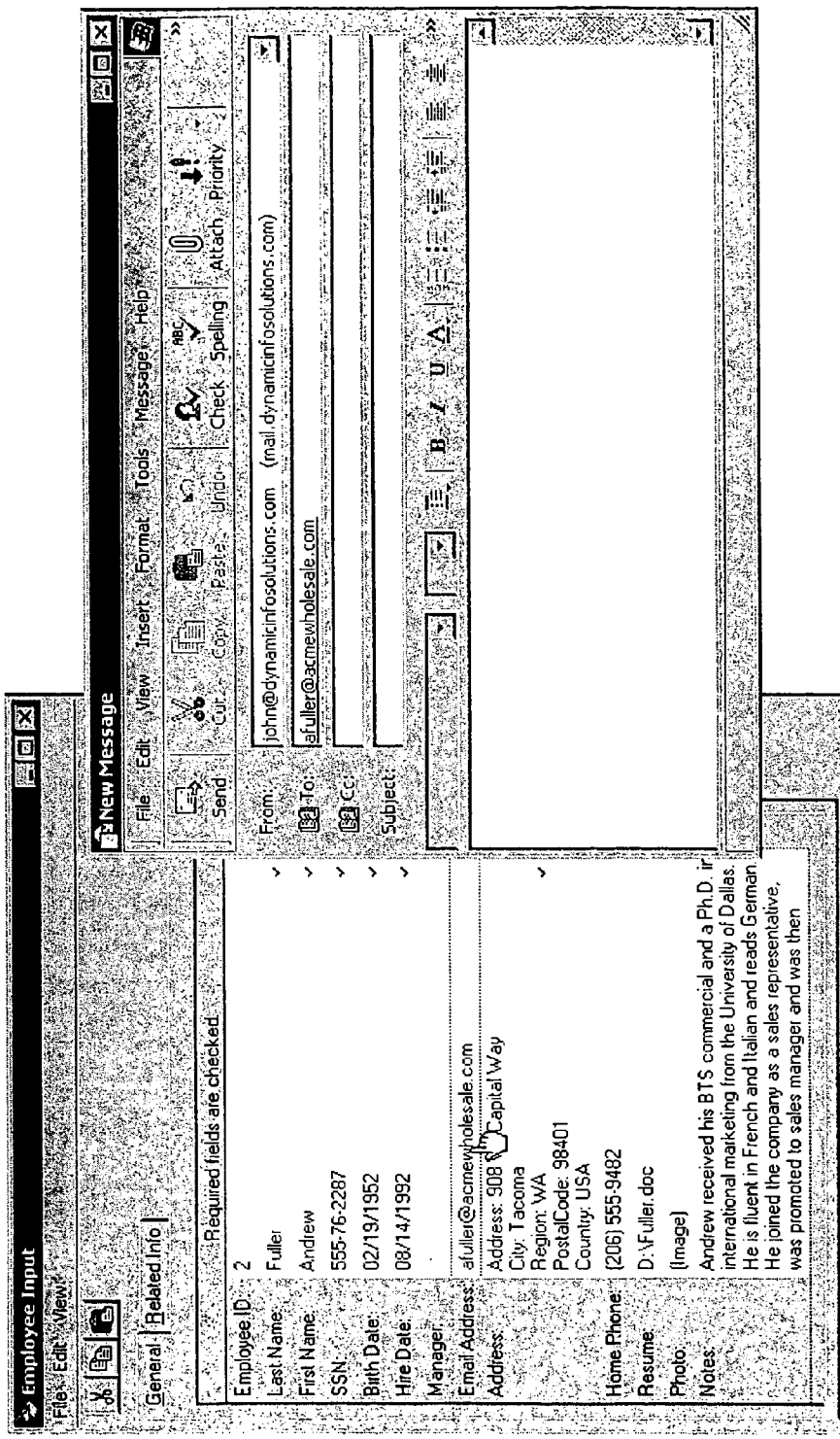
FIG. 54 depicts the TextBoxControl with the Email Address attribute set to TRUE.

| Feature | Description |
| --- | --- |
| Email Address | When set to TRUE, this attribute provides a hyper-link to the user's default email program as illustrated in FIG. 54. |
| Web Address | When set to TRUE, this attribute provides a hyper-link to the user's web browser. |
| Lines | Provides ability to expand the number of lines available in the edit box. |

Auditing

Setting the Audit On entity attribute to TRUE invokes auditing against the current entity. Inserts, updates, and deletes to the underlying table are logged to a system-defined table to document when the action occurred and the user responsible for the change.

Entity Filters

Filters may be defined on the views associated with entities. These filters are part of the metadata relating to entities. Filters are defined at the group level so that different filters may be applied to various groups of users.

For example, suppose sales people were divided into two user groups: International Sales and Domestic Sales. The list of Customers with which each group is permitted to work might be filtered on the BillCountry column in the CUSTOMER_V view as the following SQL snippets demonstrate in Table 20:

TABLE 20

| Group | Filter |
| --- | --- |
| International Sales Group | CUSTOMER_V.BillCountry <> 'United States' |
| Domestic Sales Group | CUSTOMER_V.BillCountry = 'United States' |

Entity Business Rules

Figure 55:
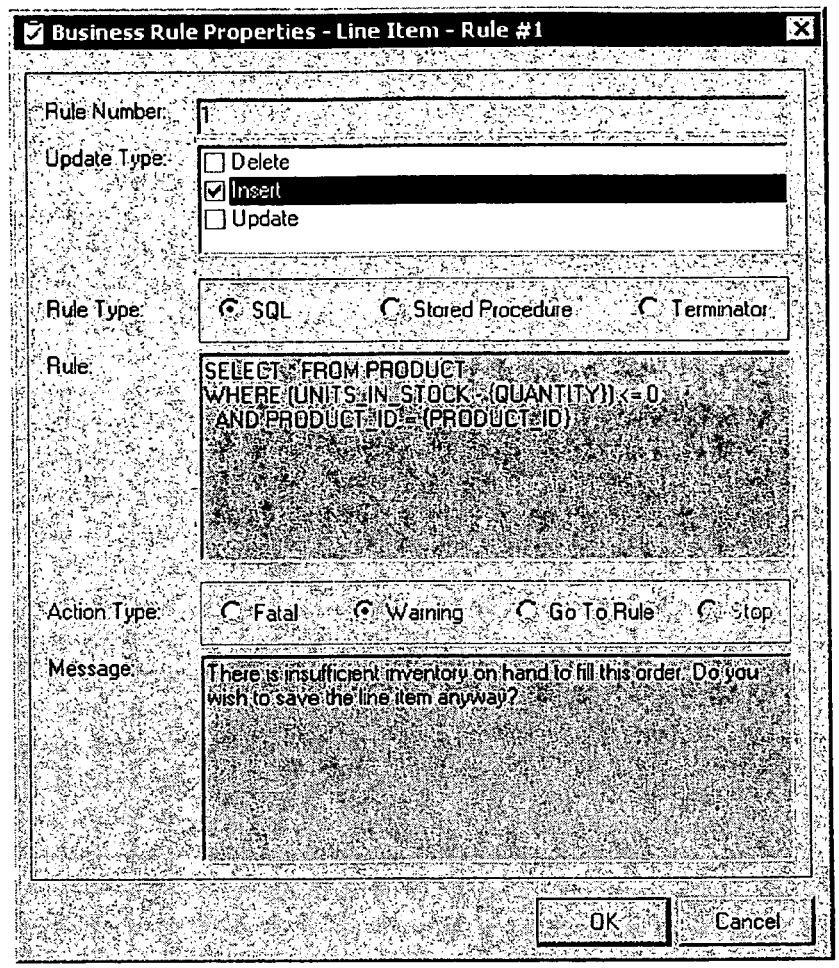
FIG. 55 depicts the Business Rule input screen from the Utility Tool.

Entity business rules are used to provide edit checks prior to inserts, updates, and deletes to an underlying table. More than one rule may be defined for each entity. The rules are defined using either an SQL statement or a stored procedure. The business rule input screen from the Utility Tool is illustrated in FIG. 55. With the "SQL" Rule Type, a rule is violated if one or more records are returned from the SQL statement when the rule is applied. For the "Stored Procedure" Rule Type, a rule is violated if the output parameter of the stored procedure returns a value of 0.

When a business rule is violated, a message is presented to the end user informing them of the violation. Setting the Action Type to "Fatal" means that further processing cannot occur until the violation has been remedied. Setting the Action Type to "Warning" means that the user will have an opportunity to continue processing if they so desire.

The Rule Type "Terminator" is used in conjunction with Action Types "Go To Rule" and "Stop" to organize several rules into a control structure similar the "If. Then. Else . . . " programming construct.

Entity Triggers

Entity triggers are SQL statements or Stored Procedures that are executed in conjunction with insert, update, and delete operations against the underlying database. For inserts and updates, the trigger is executed immediately after the operation. For deletes, the trigger is executed prior to the deletion operation. A single trigger may apply to an insert, update, or delete operation, or any combination thereof. Several triggers may be defined for a single entity. The Trigger Number determines the order of execution of each trigger.

Figure 56:
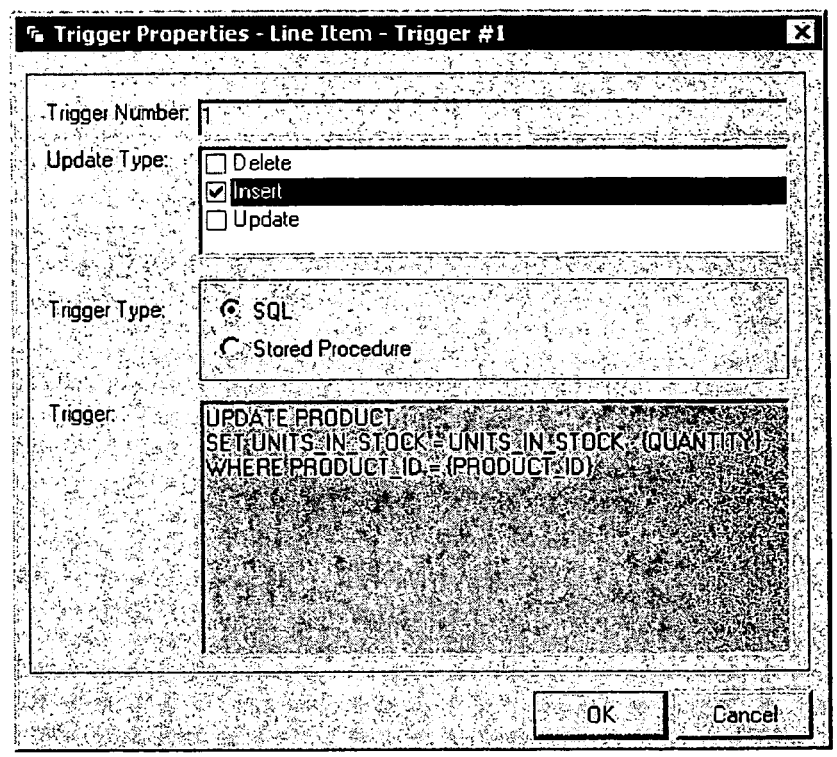
FIG. 56 depicts the Trigger input screen from the Utility Tool.

The trigger input screen from the Utility Tool is illustrated in FIG. 56. This trigger is designed to update inventory after a new Line Item has been saved to the database.

Application Extensibility

The present invention recognizes the occasional need to integrate custom functionality into the UI. Within the context of the present invention, custom functionality can be broadly characterized as any functionality that falls outside of that provided by the run-time UI executable in combination with the metadata. As demonstrated throughout this document, considerable functionality and flexibility are provided through the careful integration of the UI with metadata stored in the configuration repository. Still, there are occasions where it is desirable to integrate external components with the UI.

Over the last several years, various industry-wide specifications have been defined to provide for interaction between different software components. One of the most widely accepted specifications is the Component Object Model (COM). The general idea behind COM is to design various programming interfaces such that Component A can communicate with Component B, and vice versa, without either component understanding the details of the other's internal implementation.

One embodiment of the present invention defines a specification for a COM interface that provides for communication between the UI and external software components. Future embodiments might look toward other promising specifications and protocols, such as the Simple Object Access Protocol (SOAP), to provide inter-component communication.

The present invention offers several opportunities to integrate external components into the UI. Table 21 summarizes four of the most significant areas where external components can be integrated using a predefined COM interface:

TABLE 21

| Area | Description |
| --- | --- |
| Custom Data Entry Form | Setting the Custom Data Entry entity attribute to TRUE will call an external component to load a custom data entry form. In this case, the dynamically generated data entry form provided by the UI is replaced with the custom form. |
| Custom Search Screen | Setting the Custom Filter entity attribute to TRUE will call an external component to load a custom search screen. The custom search screen must return an SQL statement back to the UI. The SQL statement should be structured such that it ultimately returns records from the view associated with the parent entity. This feature is accessible through the "Find @E" menu option for the parent menu context. An example will be illustrated in the UTILITY TOOL OPERATION and USER INTERFACE OPERATION sections. |
| Reports | The parent entity menu context provides for the integration of custom reports into the UI. COM interfaces for popular report writers, such as BusinessObjects ®, Crystal Reports, and Microsoft Access, are used to generate high quality reports within the UI. With reference to the example used throughout this document, a custom invoice might be designed such that, by passing the CUSTOMER_ORDER_ID primary key value to the report, a nicely formatted invoice would be generated. The report could then be linked to the Customer Order entity using the Report Name, Report Path and Report Type entity attributes. |
| Tools Menu | The main menu of the UI contains a Tools menu to which external components may be attached. Examples of tools that one might wish to integrate into the UI are limitless. A common example might be an import tool to allow the import of data into the database. An example will be illusrtated in the UTILITY TOOL OPERATION and USER INTERFACE OPERATION sections. |

Utility Tool Operation

Figure 57:
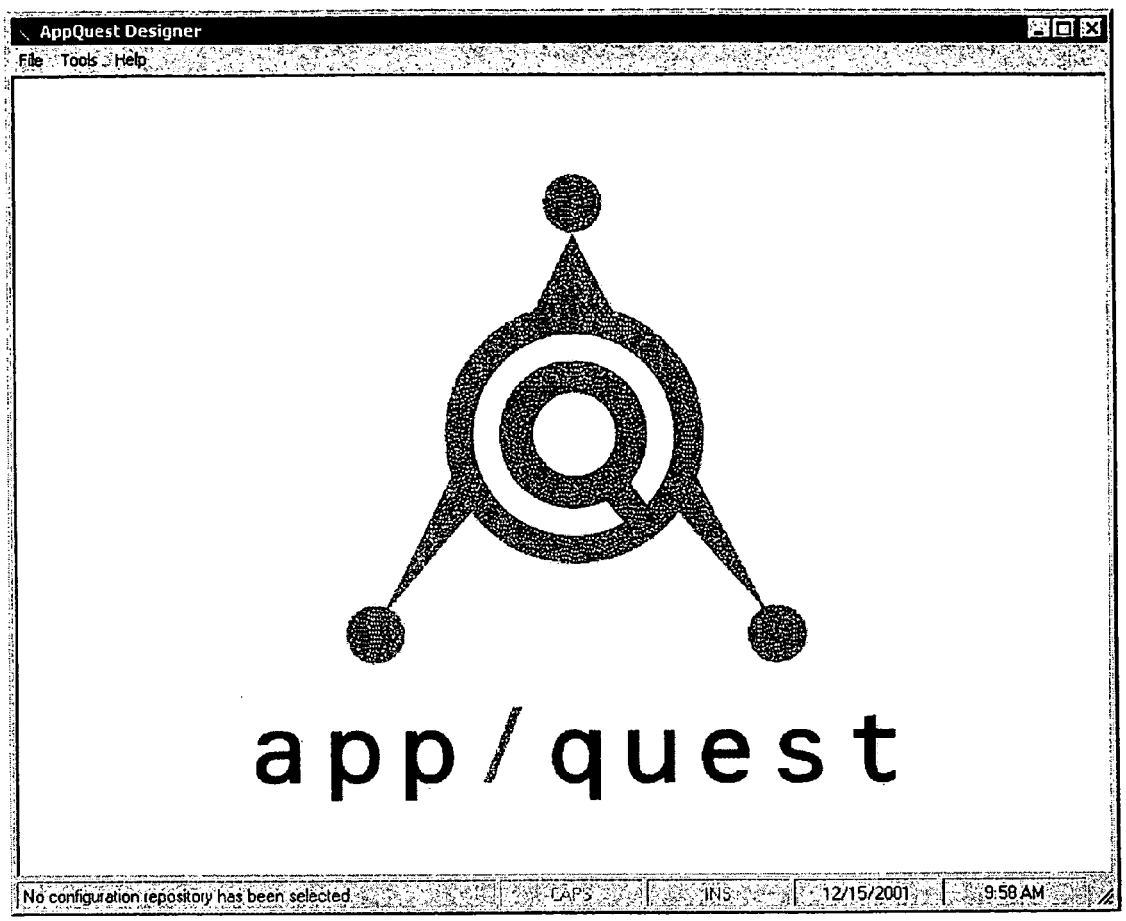
FIG. 57 depicts the Utility Tool interface.
Figure 58:
FIG. 58 illustrates the creation of a new configuration repository.

A brief series of illustrated examples of operation of the Utility Tool will now be presented. In FIG. 57, the Utility Tool interface is shown. In FIG. 58, a new configuration repository is created.

Figure 59:
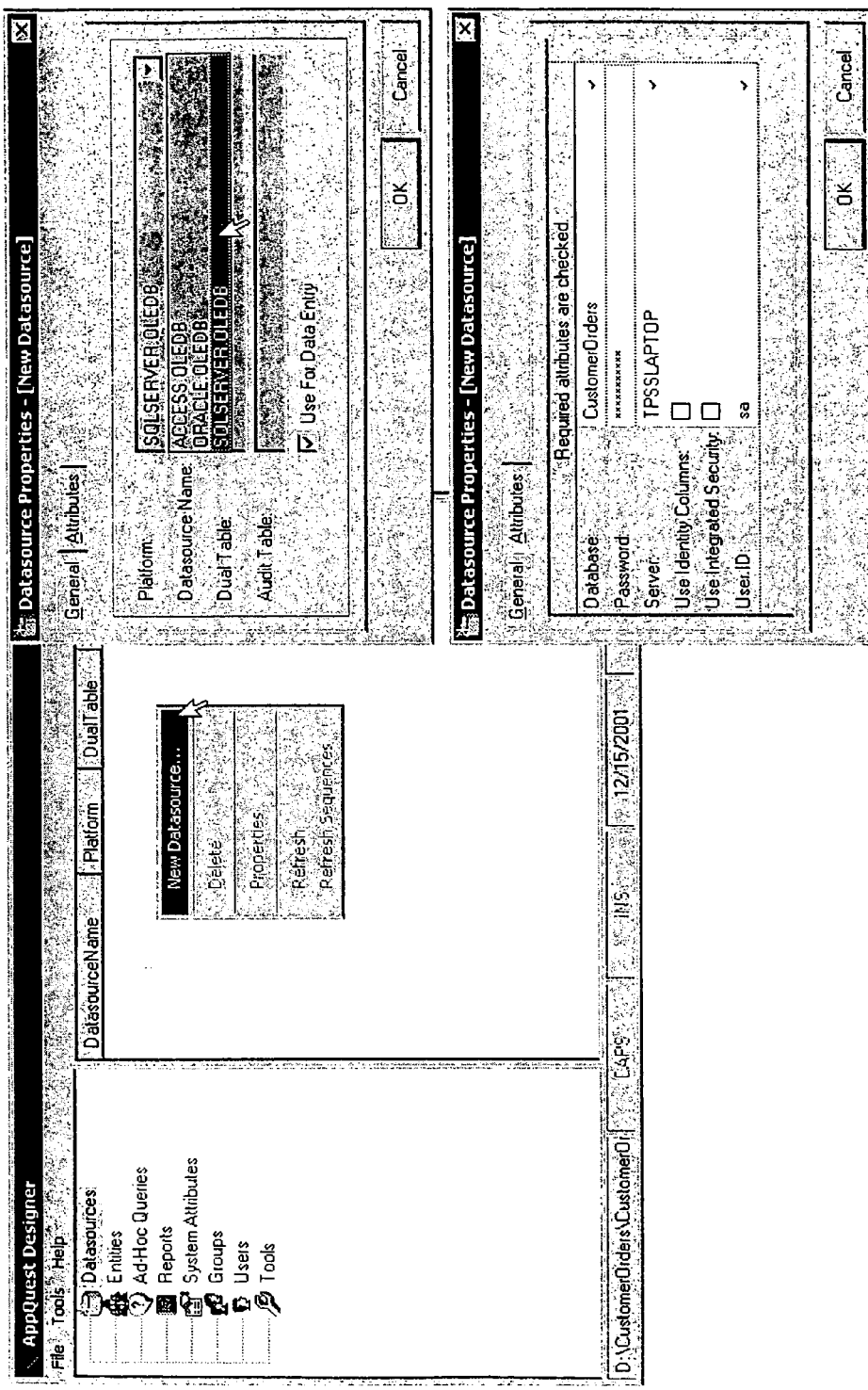
FIG. 59 illustrates definition of a new Datasource.

The screen images presented in FIG. 59 illustrate the process of defining a Datasource. A Datasource simply defines a connection to a relational database; in this case, a Microsoft SQL Server database called CustomerOrders.

Figure 60:
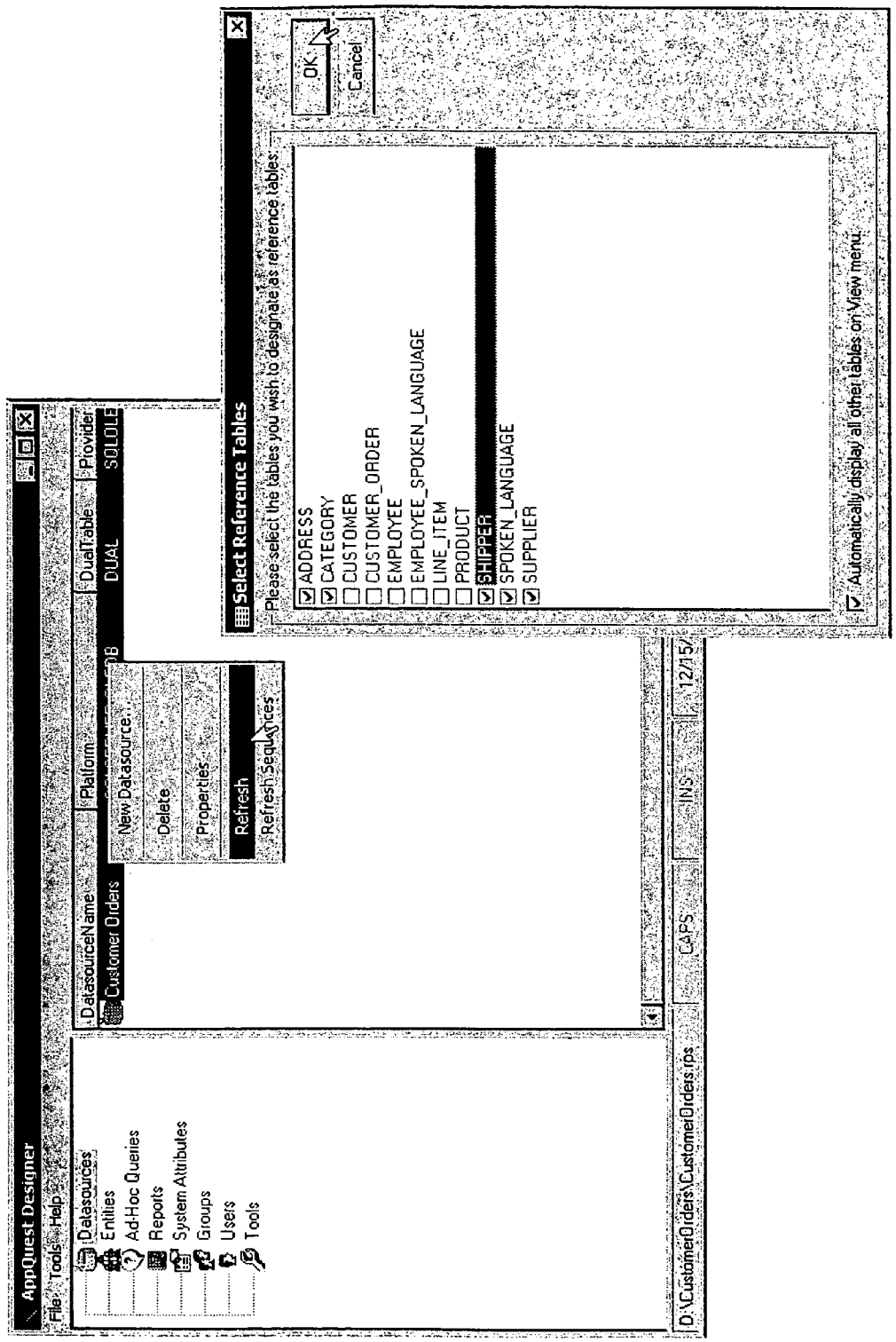
FIG. 60 illustrates the selection of Reference Tables.

The Datasource is Refreshed, in FIG. 60, to initiate the process of populating the configuration repository with metadata. The user is prompted to define the reference tables (entities) from the list of tables found in the database schema.

Figure 61:
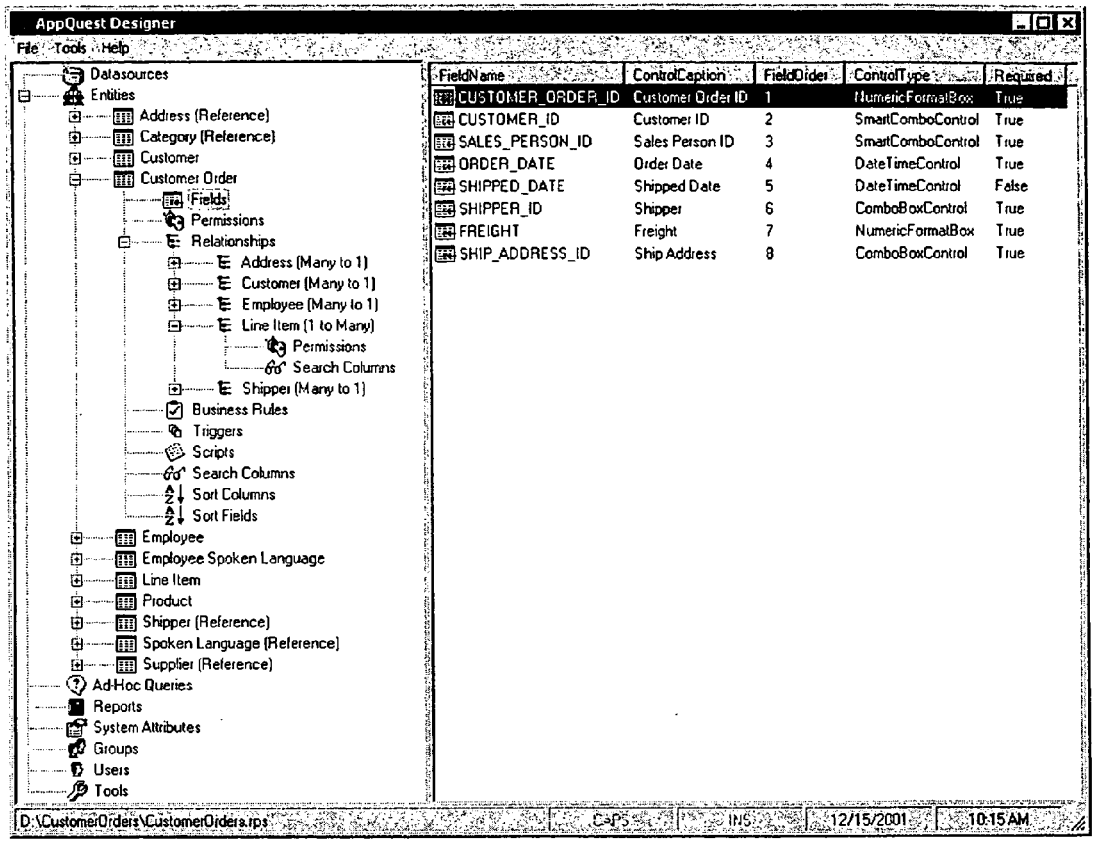
FIG. 61 depicts the fully populated Entities tree.

In FIG. 61, the Refresh process has completed and the Customer Order entity metadata is shown.

Figure 62:
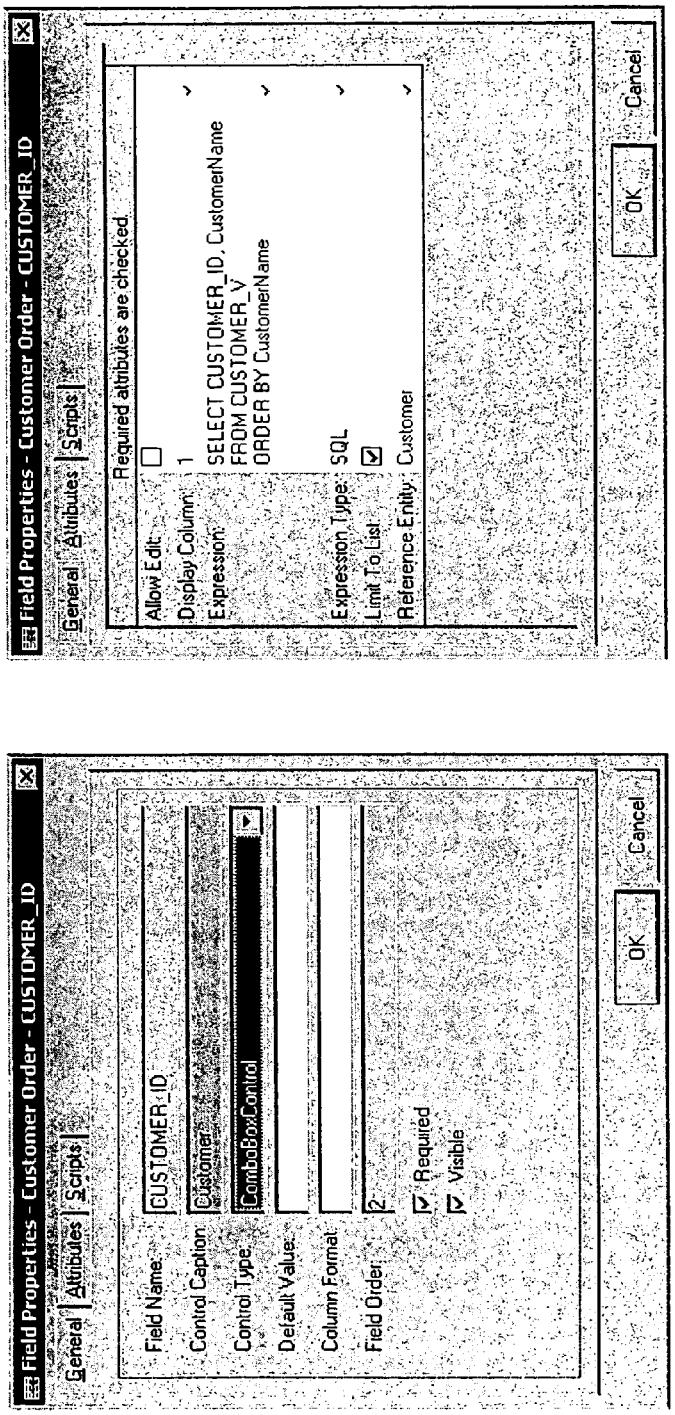
FIG. 62 illustrates modification of the control type for the Customer field in the Customer Order entity.
Figure 63:
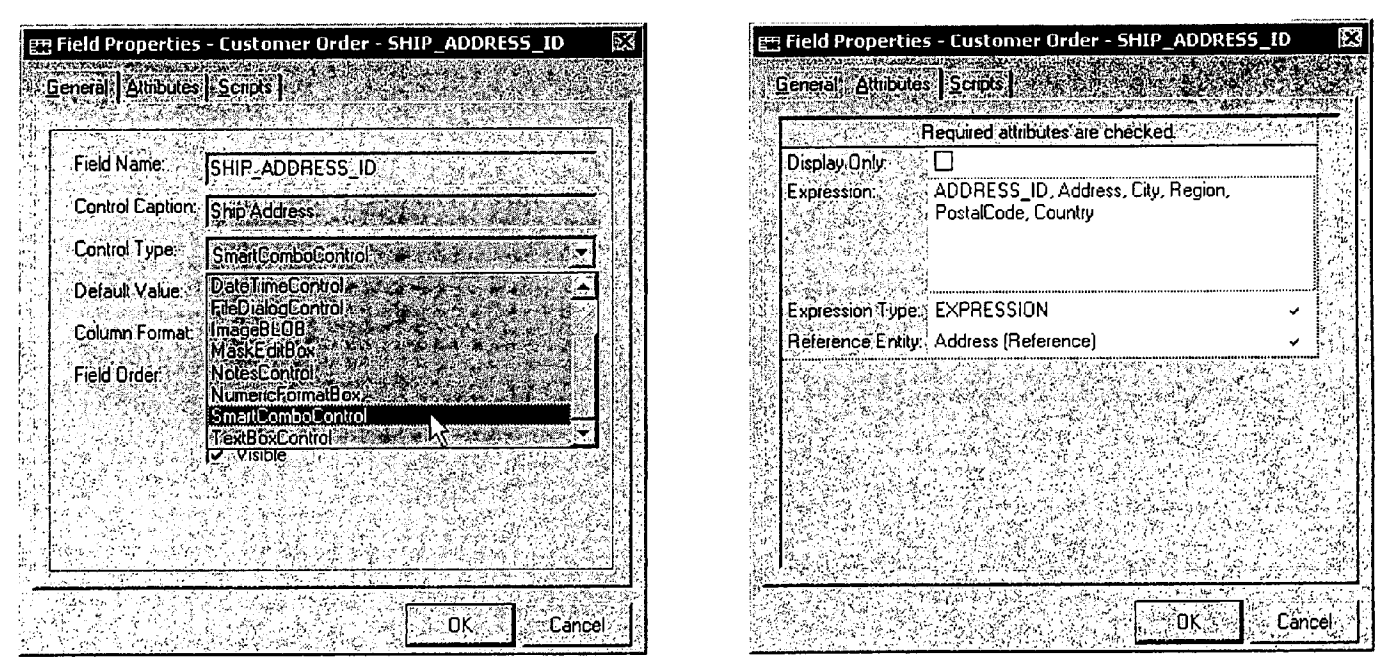

In FIG. 62, the default data entry control assigned to the Customer field in the Customer Order entity is changed from a SmartComboControl to a ComboBoxControl. In FIG. 63, the default control assigned to the Address field, which maps to the ADDRESS_ID foreign key field, is changed from a ComboBoxControl to a SmartComboControl.

Figure 64:
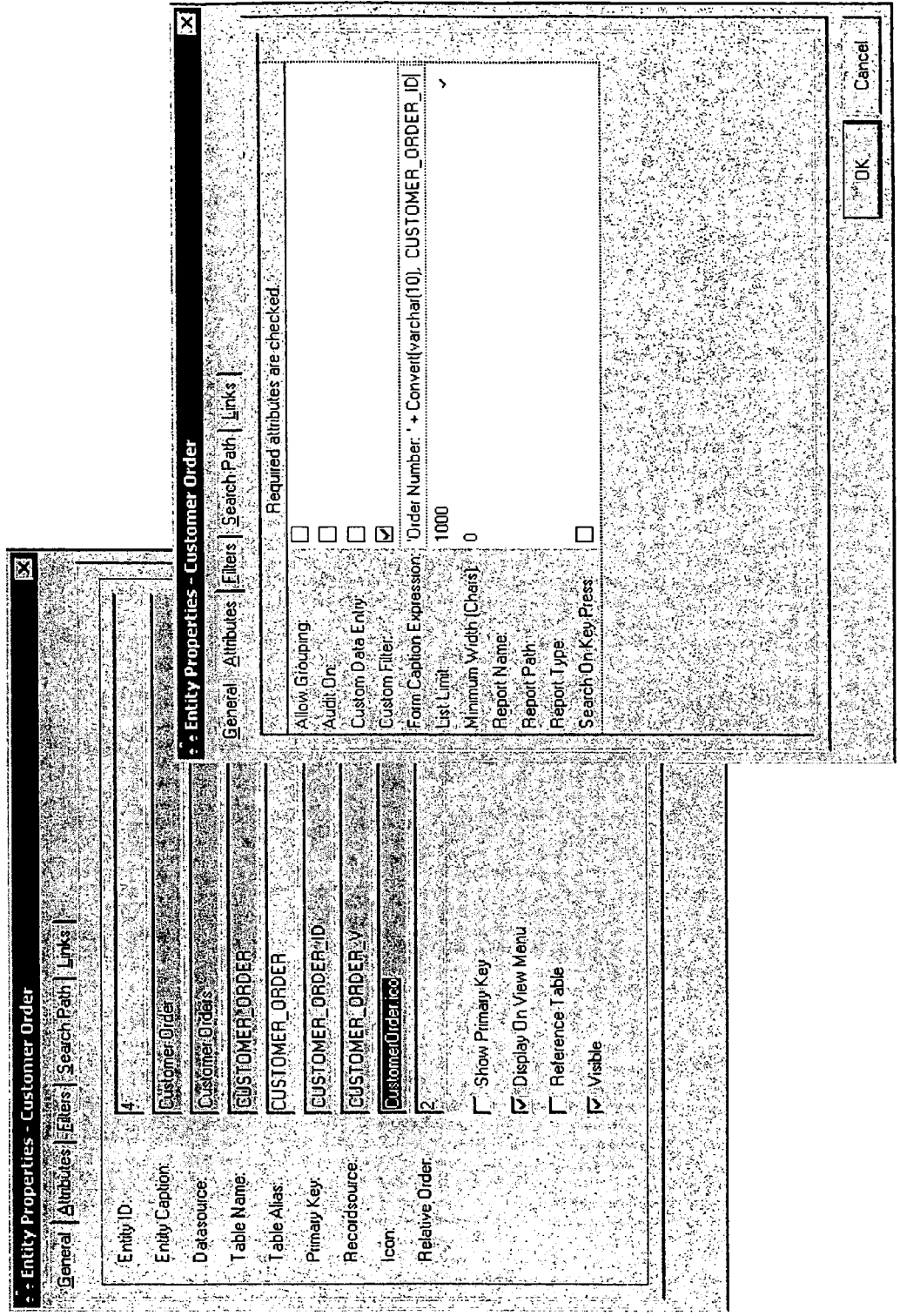
FIG. 64 depicts the definition of entity attributes for the Customer Order entity.

FIG. 64 illustrates the assignment of an icon to the Customer Order entity. When Customer Order is the parent entity on the main screen of the UI, the icon will provide users with a graphical image of the entity. On the Attributes tab, a custom filter is implemented using the COM interface exposed by the UI. Also, a form caption expression is defined to place a meaningful caption on data entry forms.

Figure 65:
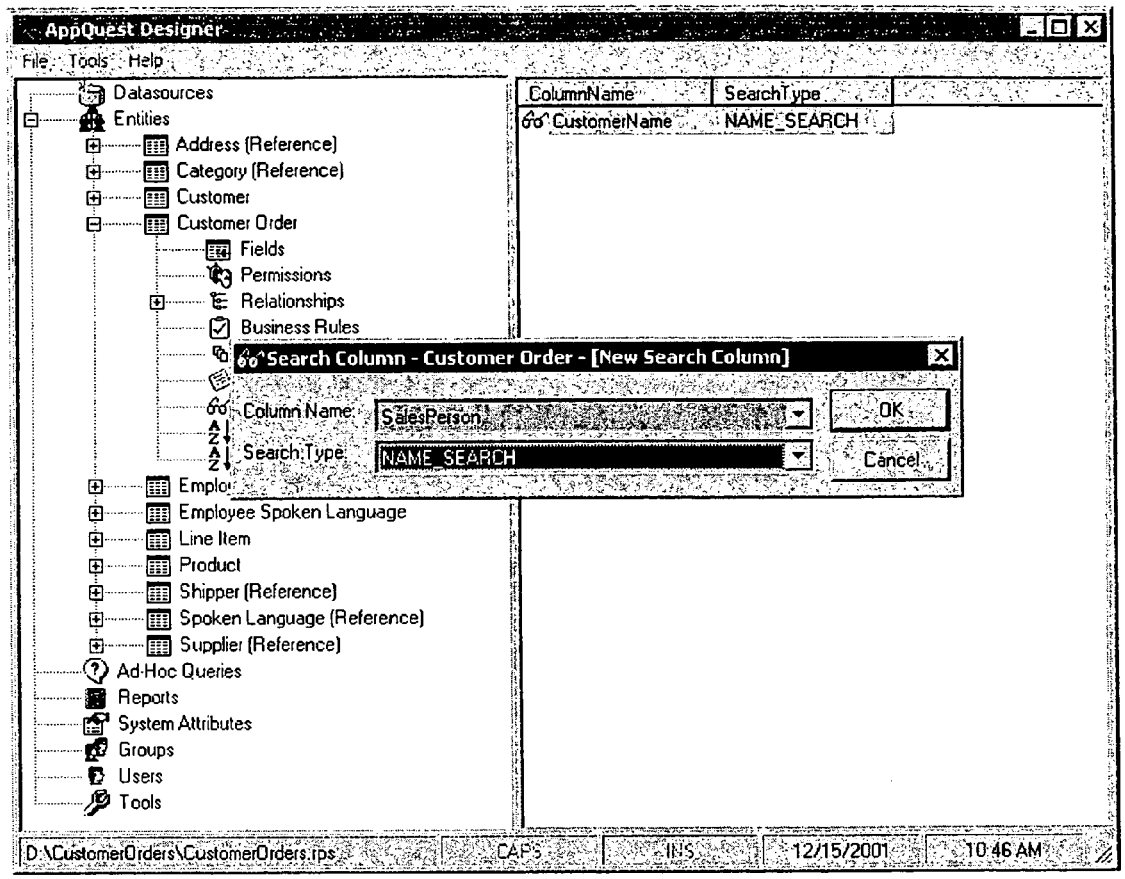
FIG. 65 depicts the definition of a search column for the Customer Order entity.
Figure 66:
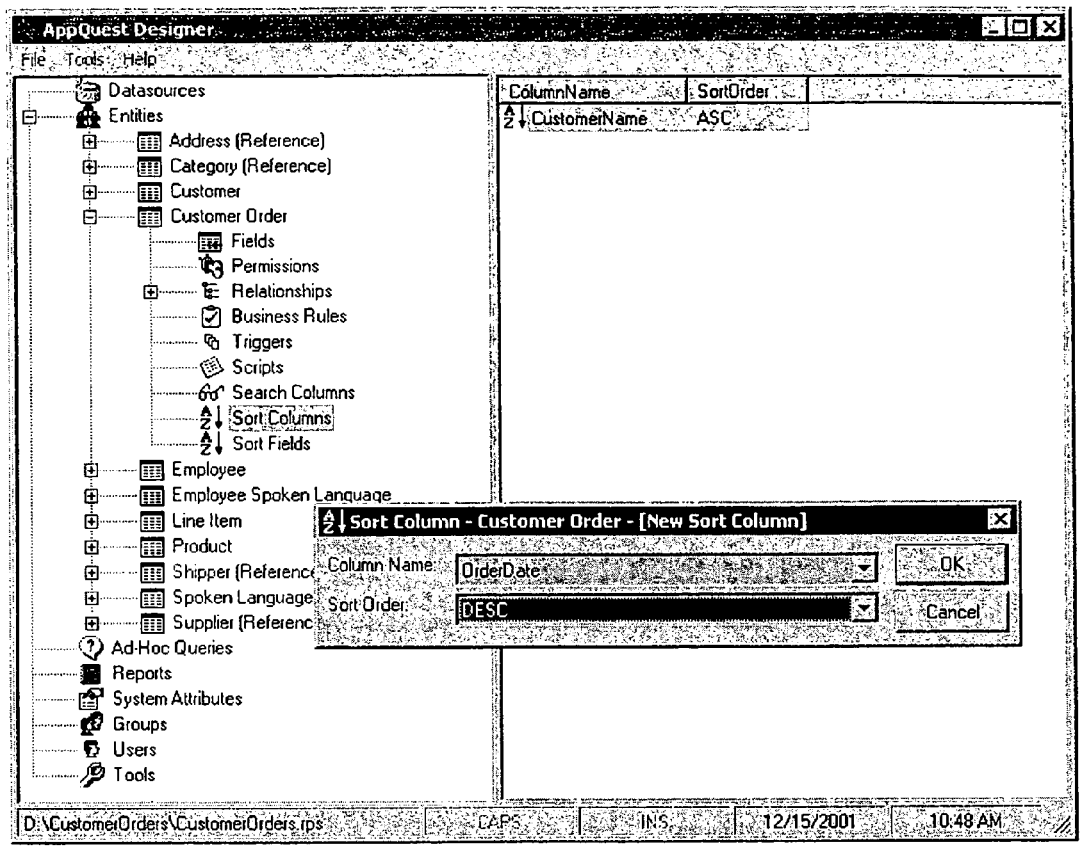
FIG. 66 depicts the definition of a sort column for the Customer Order entity.

In FIG. 65 and FIG. 66, search columns and sort columns are defined for the Customer Order entity.

Figure 67:
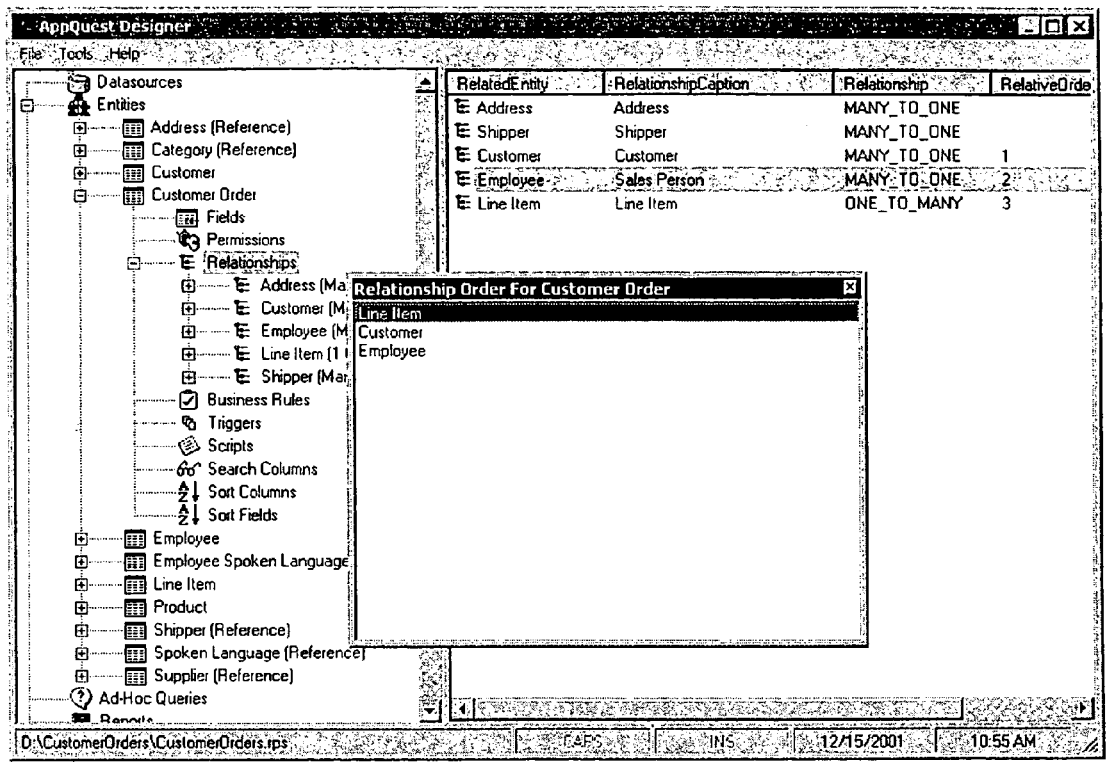
FIG. 67 illustrates setting the order of relationships for the Customer Order entity.

In FIG. 67, the order of Customer Order relationships is modified to place Line Item at the top of the child list.

Figure 68:
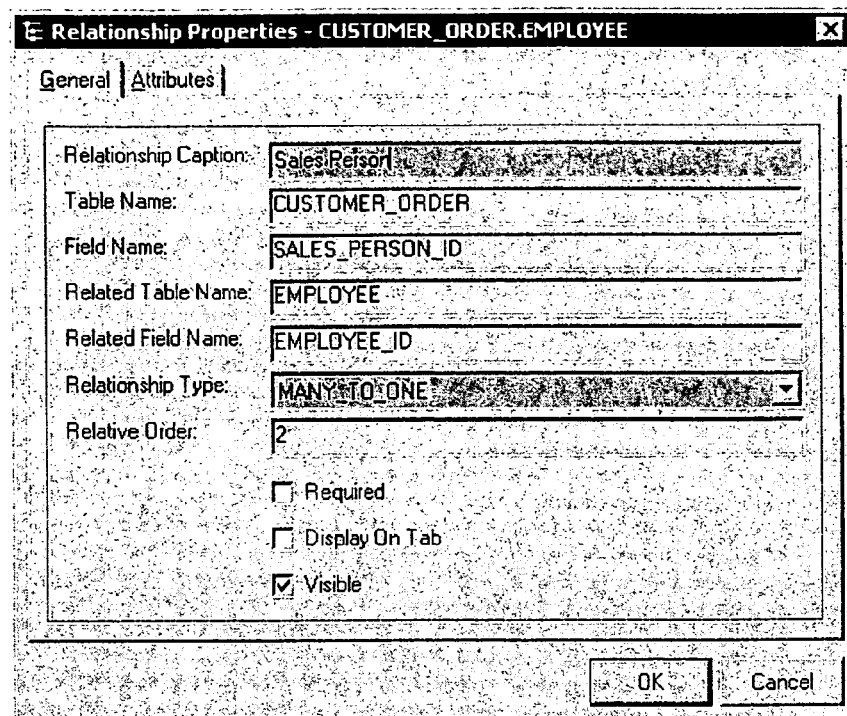
FIG. 68 illustrates changing the Caption attribute of the Employee relationship to Sales Person.

In FIG. 68, the caption of the Employee relationship is changed to Sales Person.

Figure 69:
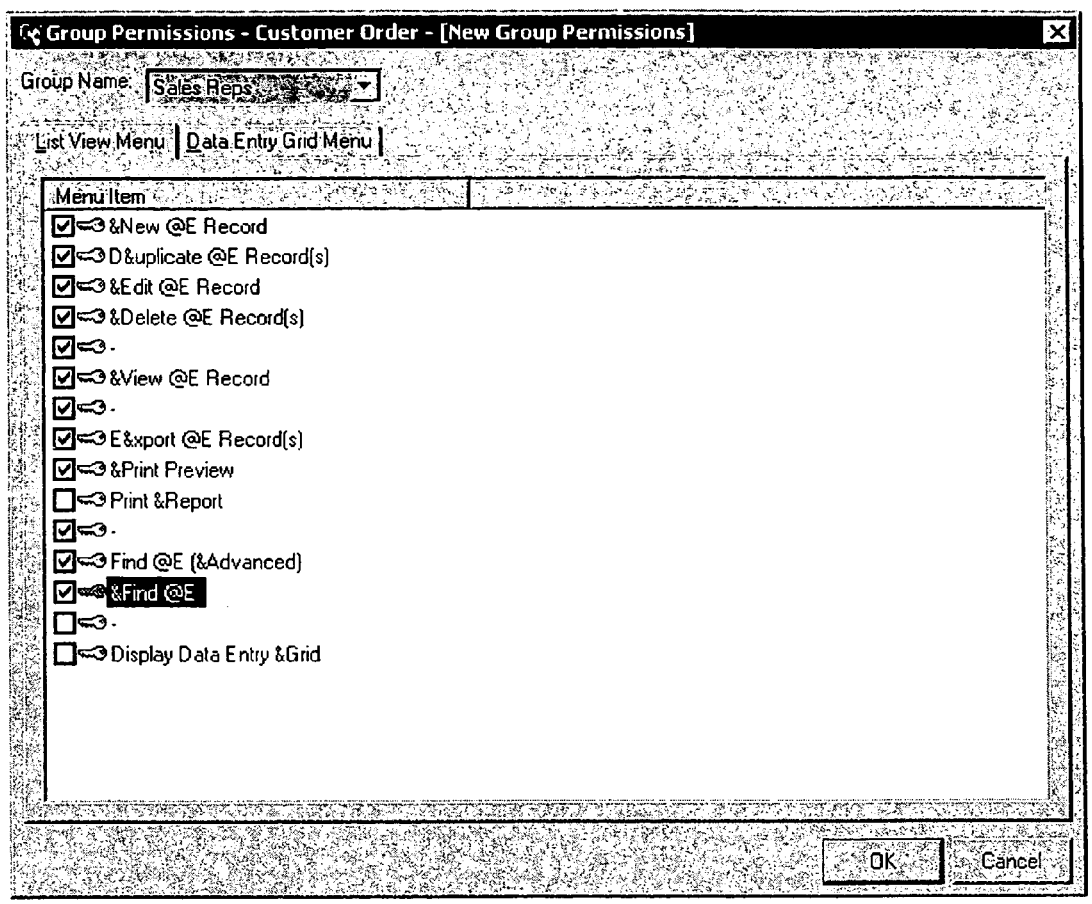
FIG. 69 illustrates granting permissions to the Sales Reps group for the Customer Order entity.

Permissions for the Customer Order entity are assigned to the Sales Reps user group in FIG. 69.

Figure 70:
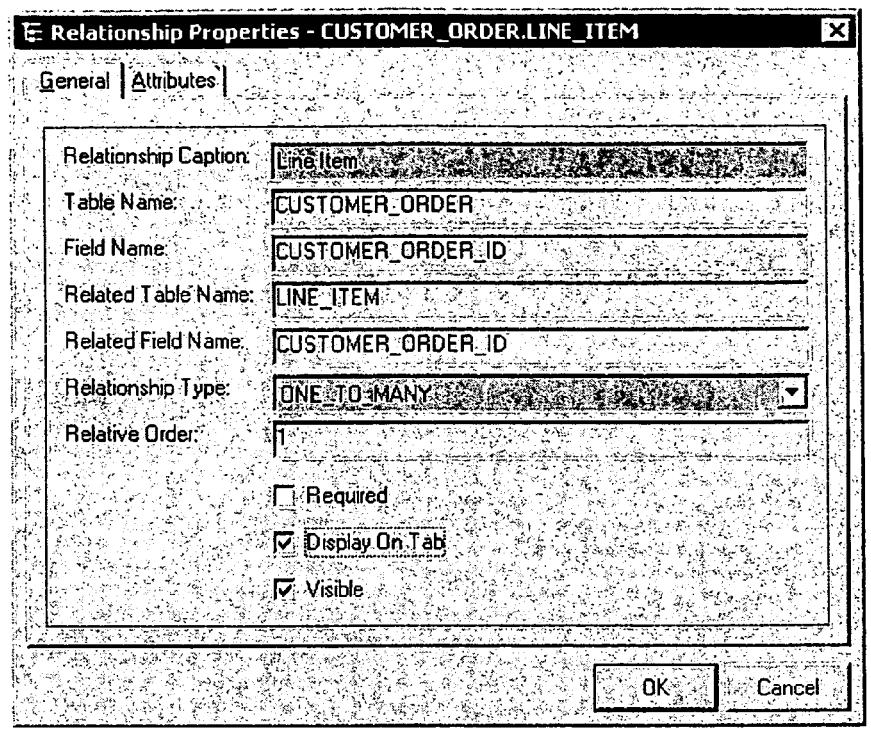
FIG. 70 illustrates setting the Display On Tab entity attribute to TRUE.

The Line Item relationship will appear as a tab on the Customer Order data entry form by setting the Display On Tab attribute to TRUE as illustrated in FIG. 70.

Figure 71:
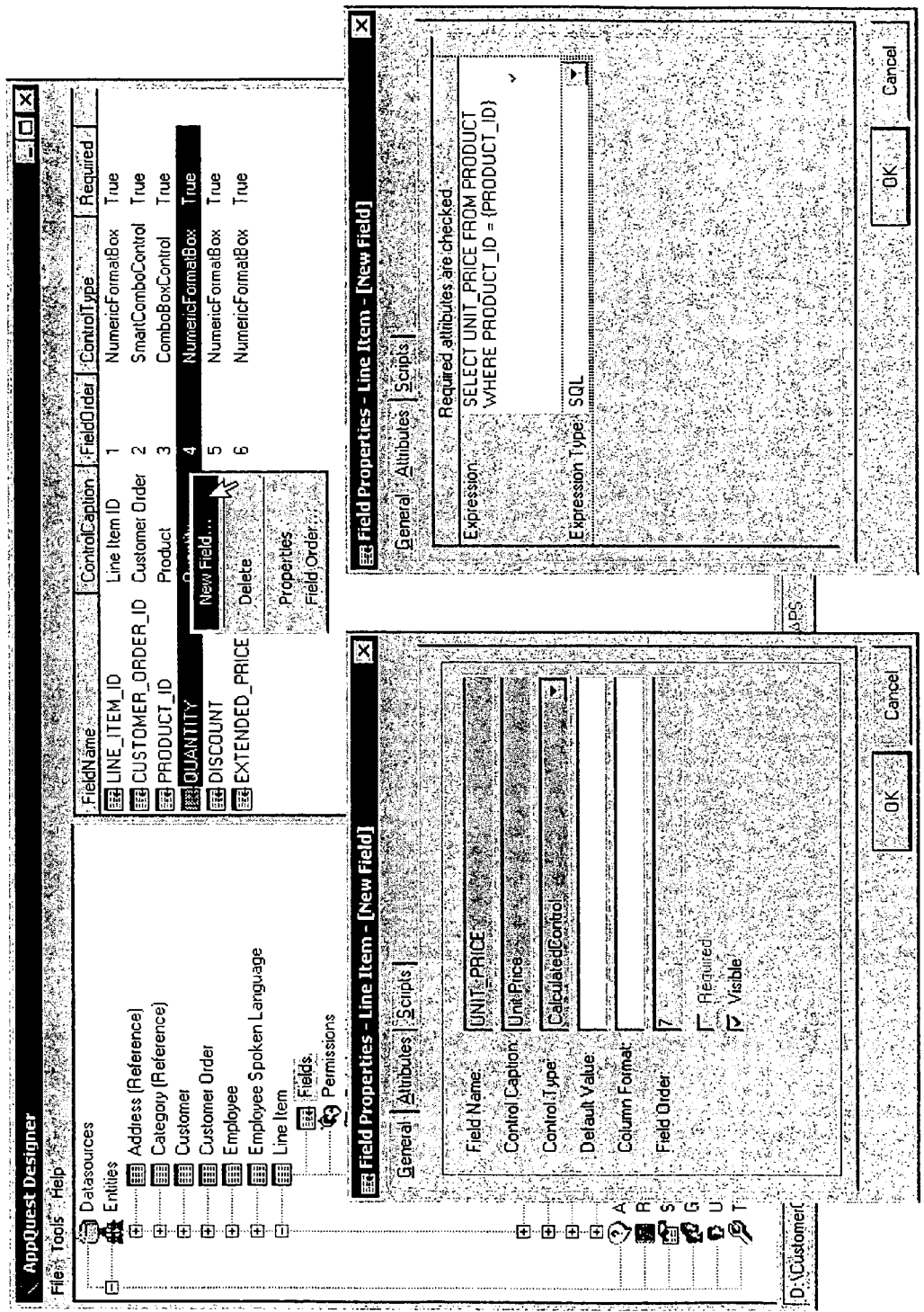
FIG. 71 illustrates the definition of a new unbound CalculatedControl.
Figure 72:
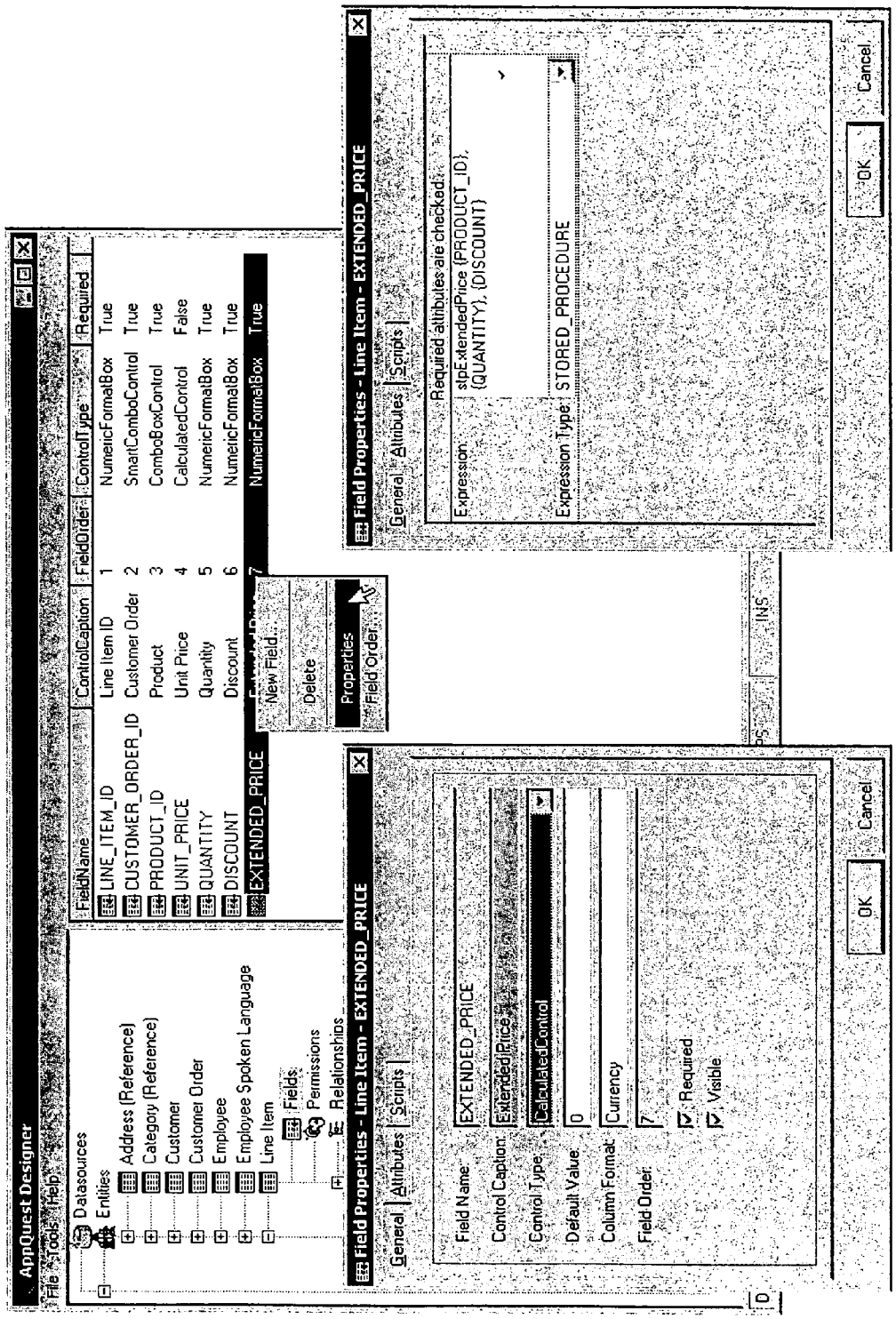
FIG. 72 illustrates the definition of a bound CalculatedControl

In FIG. 71, an unbound CalculatedControl is added to the Line Item entity in order to display the Unit Price on the data entry form. The Extended Price field is modified in FIG. 72 to implement a bound CalculatedControl.

A business rule has been defined to check inventory levels before adding a Line Item to a Customer Order (see FIG. 55). A trigger has also been defined to update inventory on hand immediately after a Line Item is added to a Customer Order (see FIG. 56).

Figure 73:
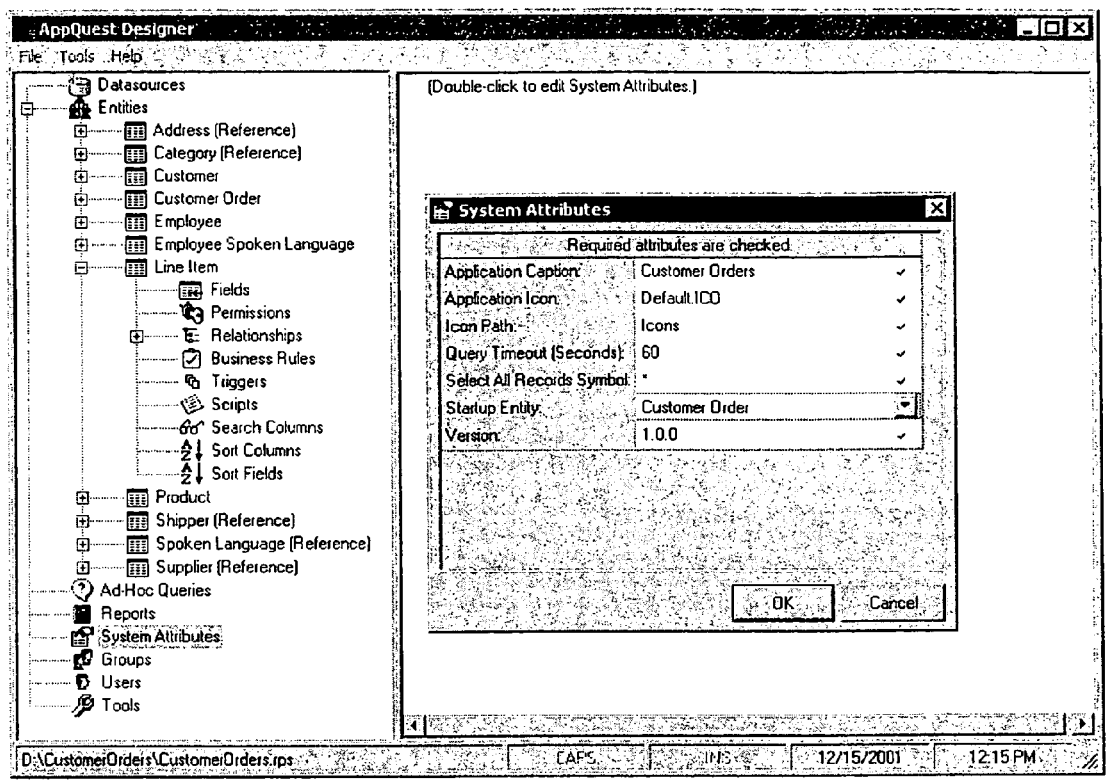
FIG. 73 illustrates the definition of system attributes such as Application Caption and Startup Entity.

In FIG. 73, an Application Caption and Startup Entity are defined in the System Attributes screen. The Startup Entity is the first parent entity to appear when end users log into the UI.

Figure 74:
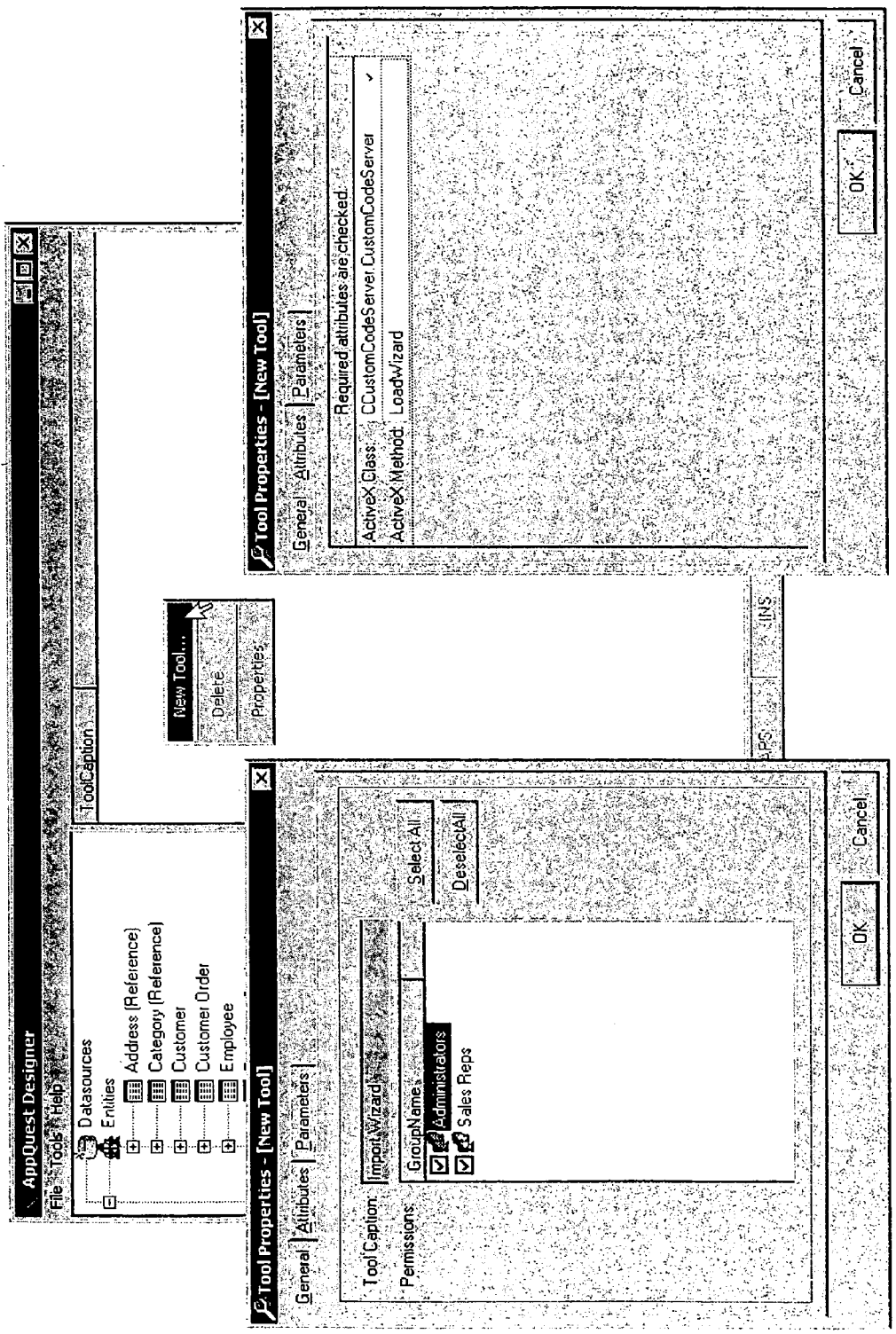
FIG. 74 illustrates the definition of a new Tool called "Import Wizard".

A tool, "Import Wizard", is defined in FIG. 74 in order to integrate an external COM component into the UI.

Figure 75:
FIG. 75 illustrates the modification of the user interface configuration file.

Finally, in FIG. 75, an entry is added to a configuration file to notify the UI of the presence of a new configuration repository. The UI software may now use the new configuration repository to generate a user interface.

User Interface Operation

Many features of the UI have been presented in prior sections of this document. However, continuing with the example in the UTILITY TOOL OPERATION section, the operation of the UI will now be briefly illustrated using the newly created configuration repository from the previous section.

Figure 76:
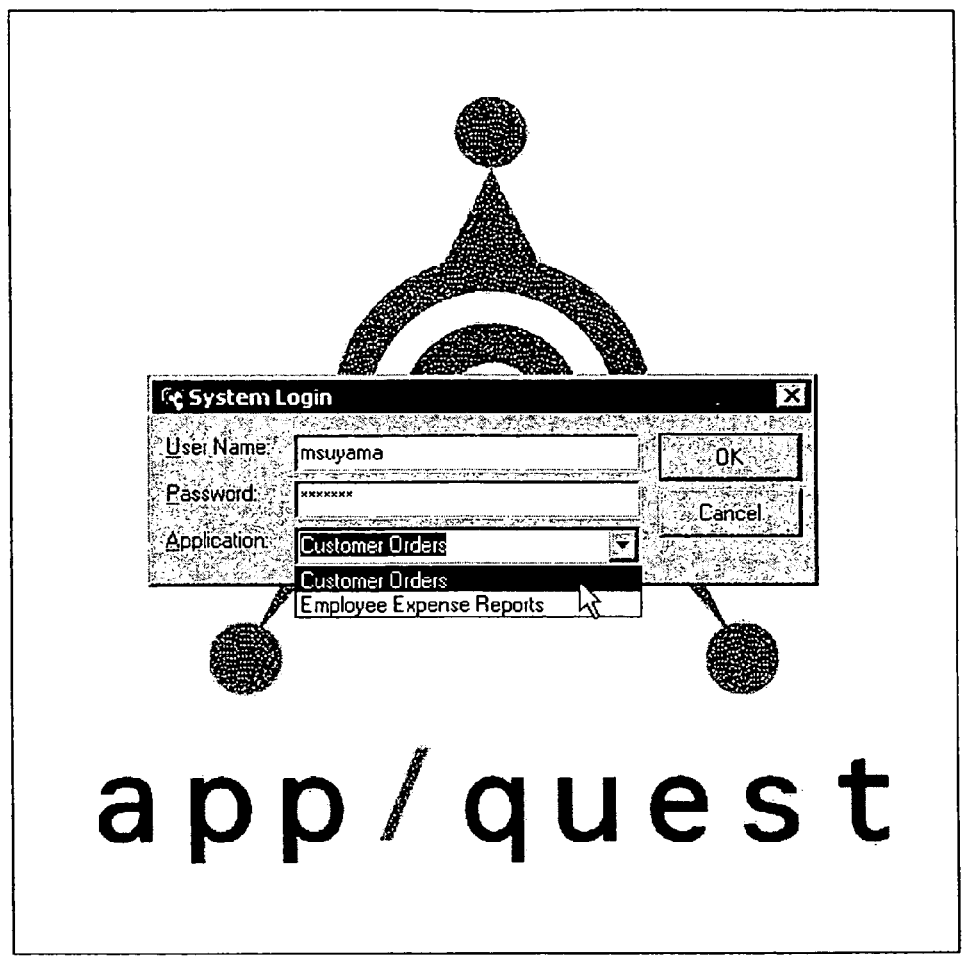
FIG. 76 illustrates the System Login screen of the user interface.

In FIG. 76, a user logs into the UI. Notice that more than one configuration repository exists. Since the UI behavior is controlled by metadata, any number of configuration repositories can be used by a single installation of the UI software.

Figure 77:
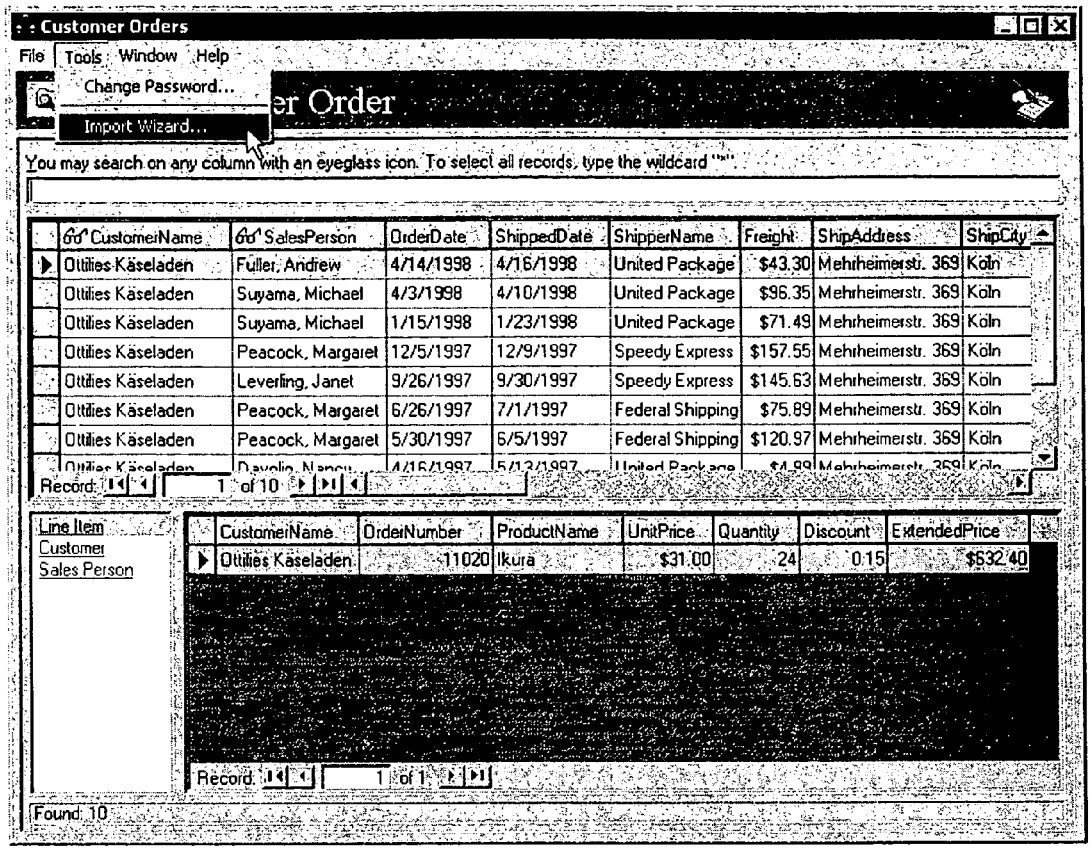
FIG. 77 depicts the Import Wizard tool menu option.

In FIG. 77, the Tools menu now displays an "Import Wizard" menu option. Selecting the menu option launches an external COM component (not shown here).

Figure 78:
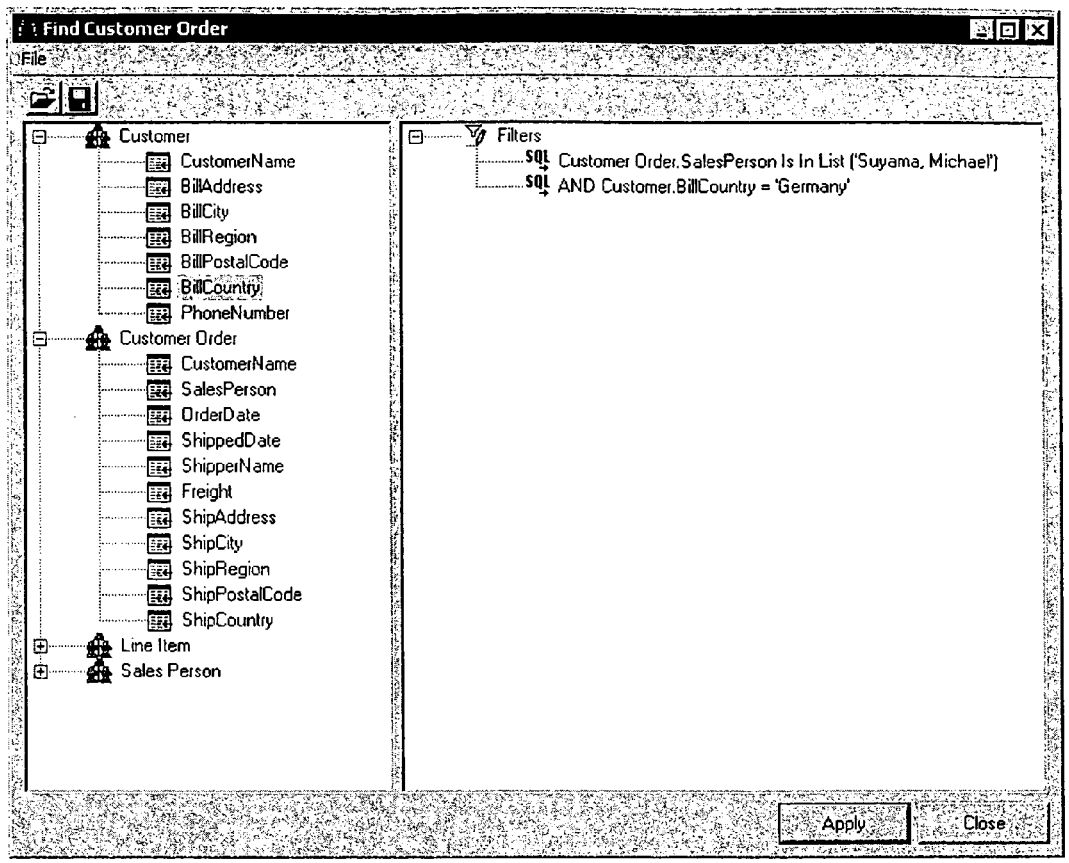
FIG. 78 depicts the Advanced search screen.

An advanced search screen for the Customer Order entity is illustrated in FIG. 78. The default search path configured by the Utility Tool during the Refresh process is used to construct the list of searchable entities.

Figure 79:
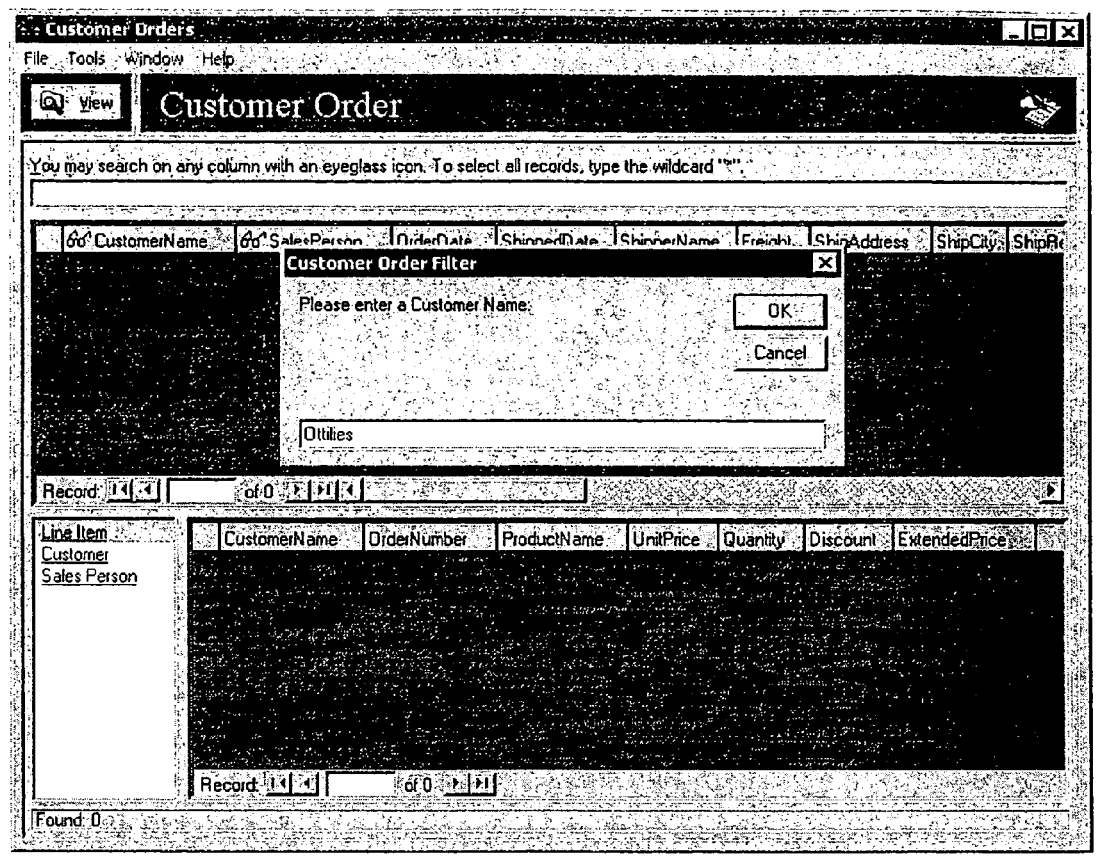
FIG. 79 depicts a custom filter screen.

A simple custom filter (search) is illustrated in FIG. 79. The custom filter screen is provided by an external COM component. Changes made to the internal workings of the COM component have no impact on the UI software.

Figure 80:
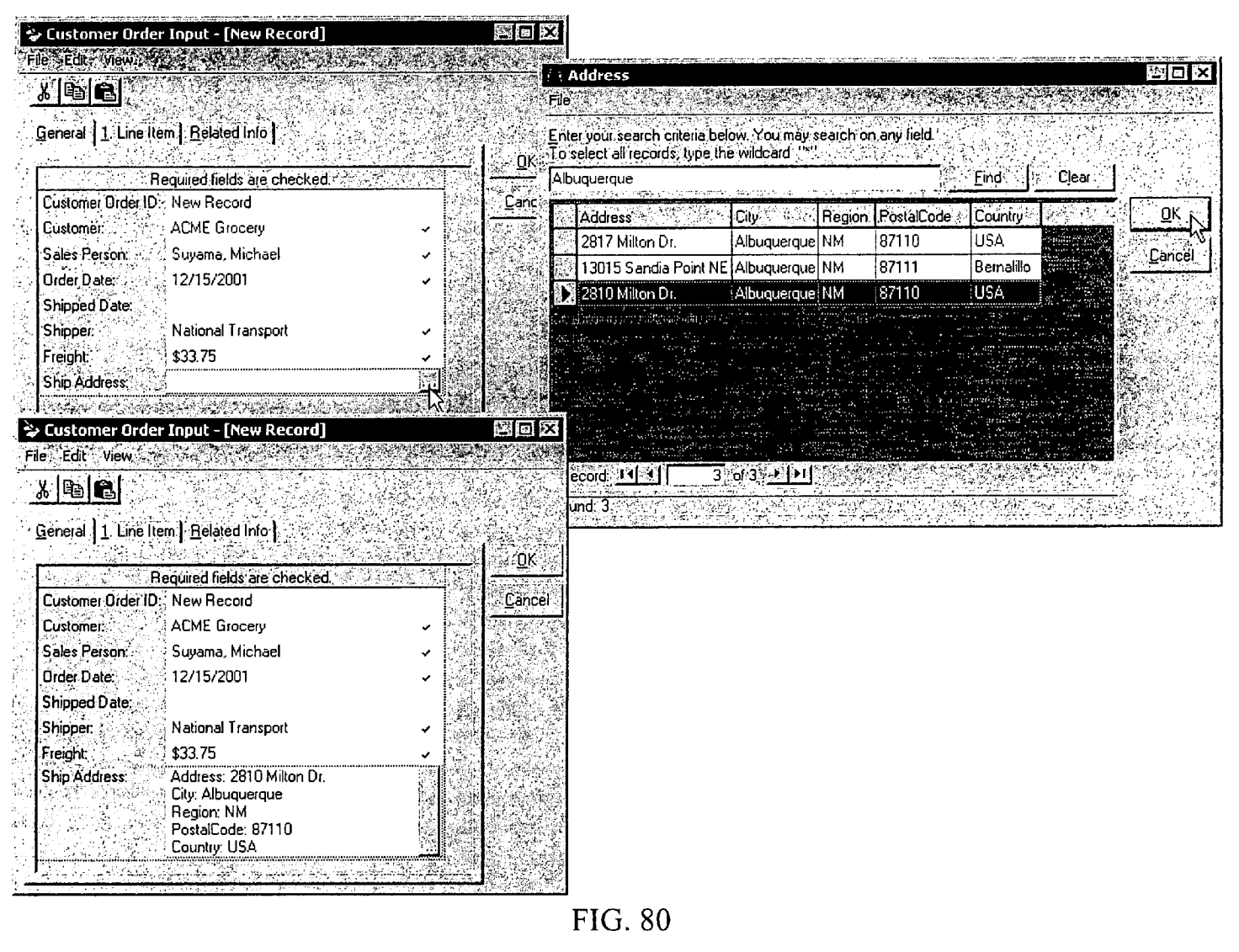

In FIG. 80, a new Customer Order is entered. Notice the Line Item tab on the Customer Order data entry form. Also, notice the use of a SmartComboControl to populate the Address field (remember, addresses are stored in a single table and shared by four entities to ensure the same physical address is entered once and only once).

Figure 81:
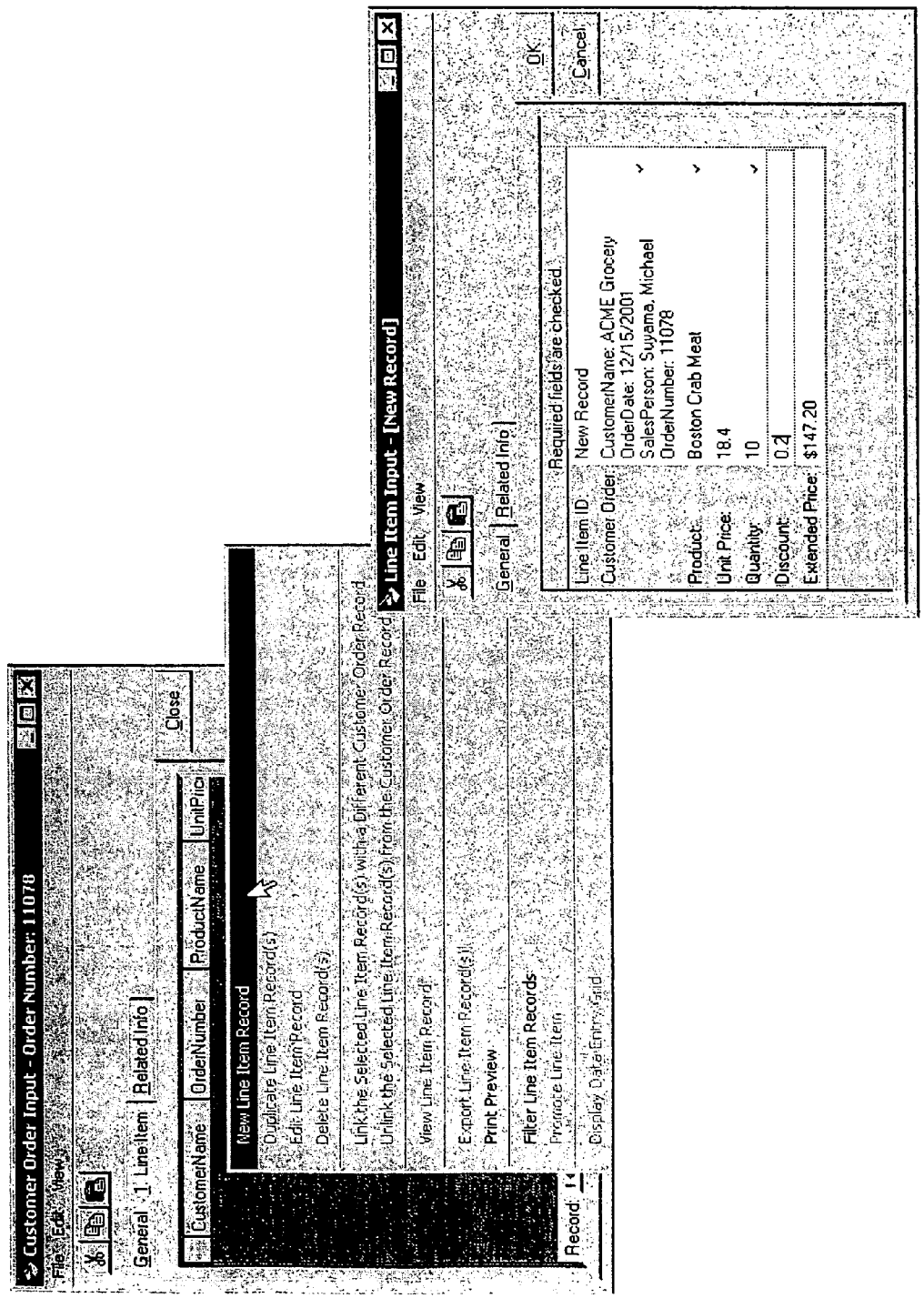
FIG. 81 illustrates adding a new Line Item record to the new Customer Order record.

A Line Item is added to the new Customer Order in FIG. 81. Notice the presence of the unbound Unit Price Calculated-Control.

Figure 82:
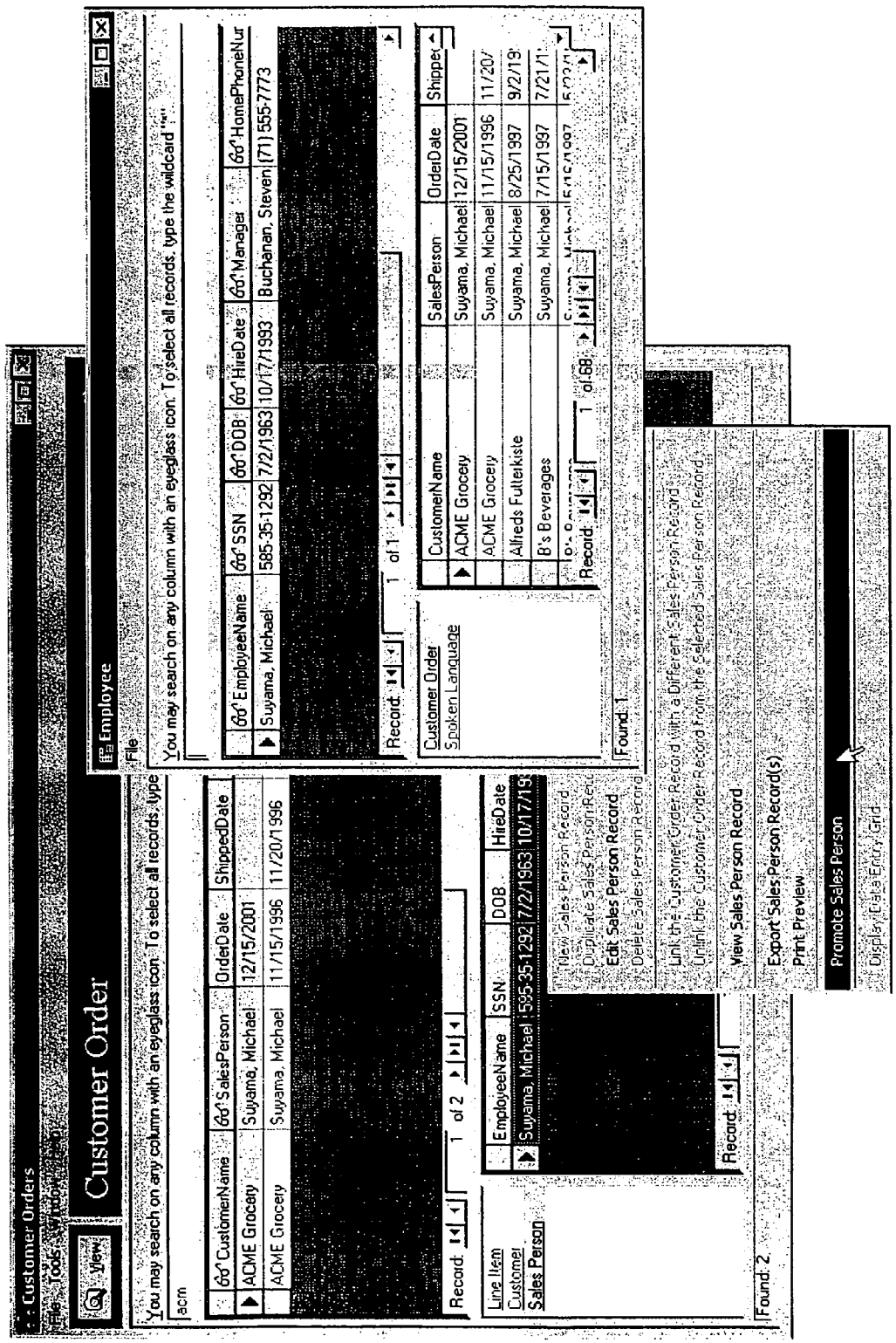
FIG. 82 illustrates promoting the Sales Person (Employee) child entity.
Figure 83:
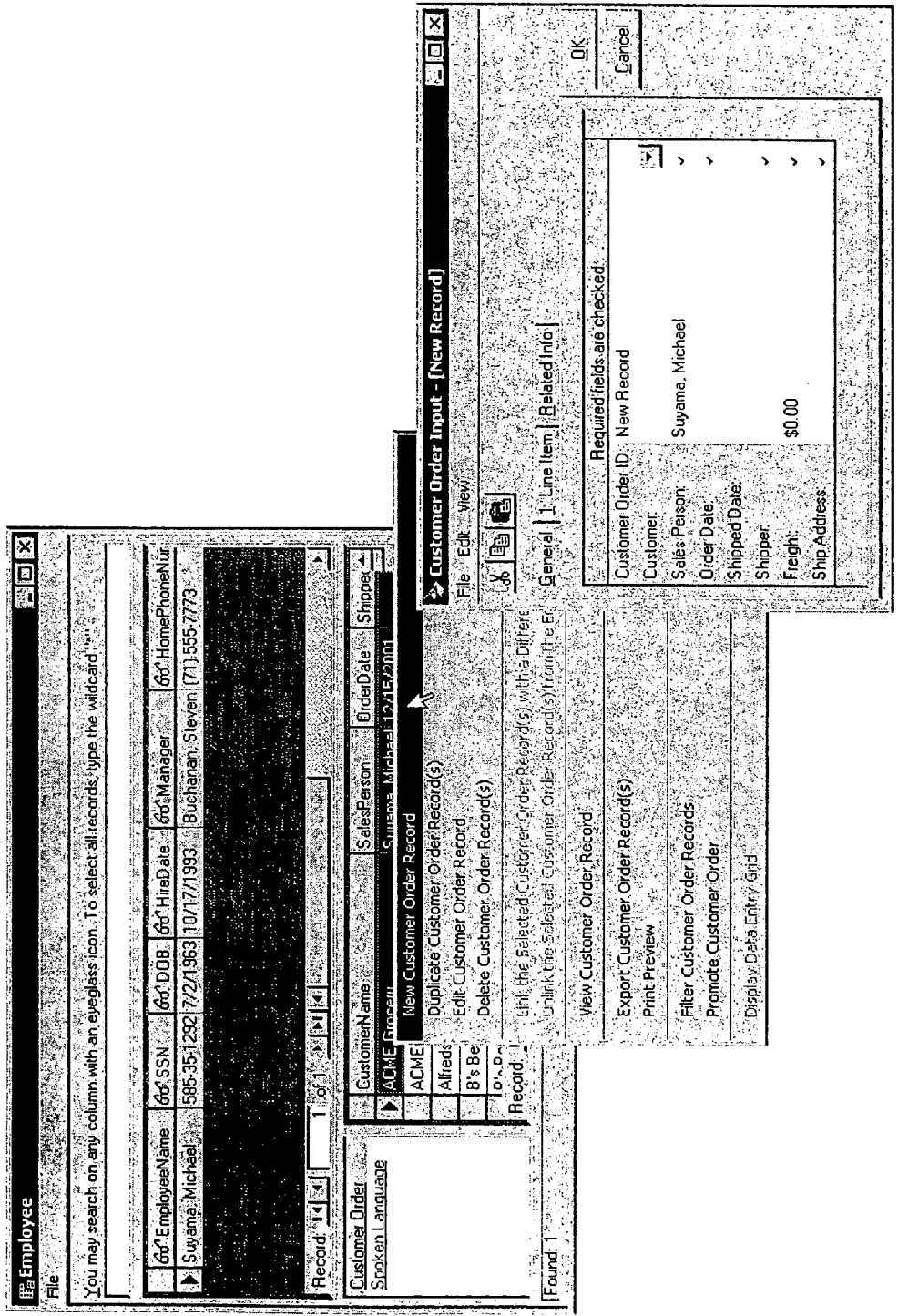
FIG. 83 illustrates adding a new Customer Order when Employee is the parent entity.

Promotion of the Sales Person entity is illustrated in FIG. 82. With Employee as the parent, Customer Orders may be entered using the child menu as shown in FIG. 83. Notice that the Sales Person field is automatically populated when the Customer Order data entry screen is first instantiated.

Figure 84:
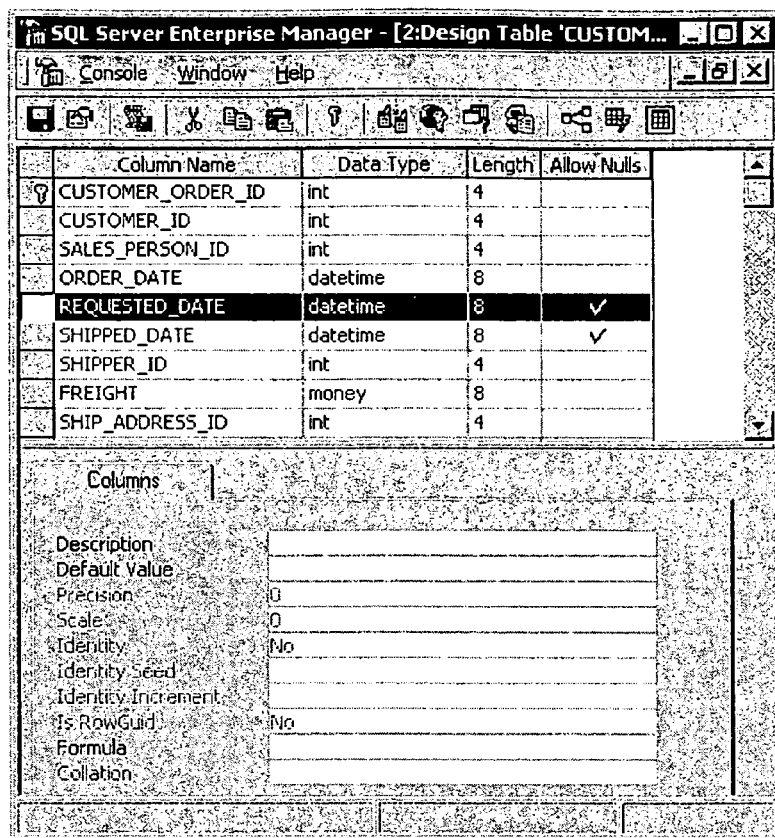
FIG. 84 depicts the addition of a new field to the CUSTOMER_ORDER table in the database.
Figure 85:
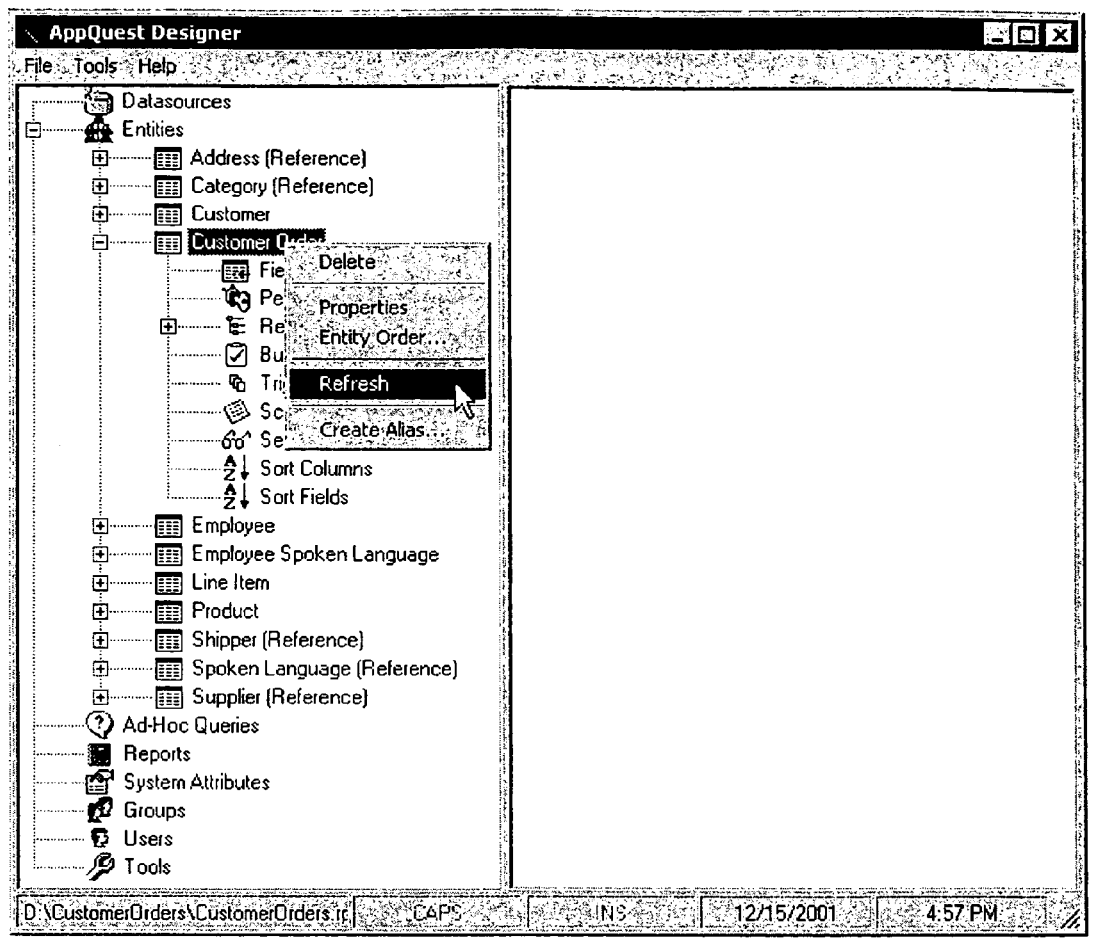
FIG. 85 illustrates the Refresh of the Customer Order entity in the Utility Tool.

In FIG. 84, the CustomerOrders database is modified to add the REQUESTED_DATE field to the CUSTOMER_ORDER table. The configuration repository is Refreshed, in FIG. 85, to generate metadata for the database modification.

Figure 86:
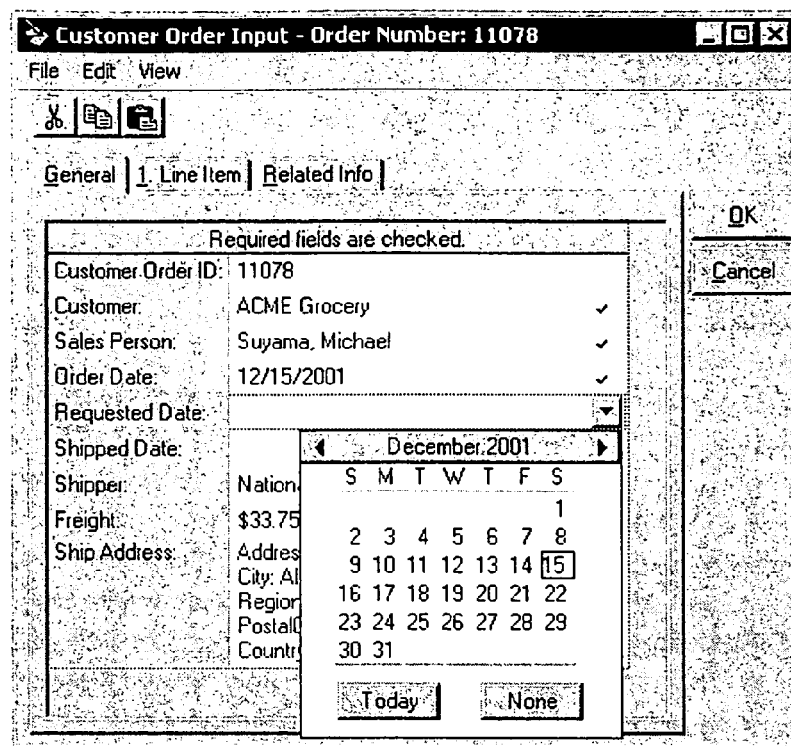
FIG. 86 depicts the newly added Requested Date field on the Customer Order data entry screen.

The new Customer Order data entry form is illustrated in FIG. 86. Notice the Requested Date field now appears and is represented by a DateTimeControl.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. Computer software for automatically generating a graphical user interface for a relational database, said software embodied in a computer readable medium having a set of computer instructions encoded thereon and comprising:
   utility software extracting schema information from the relational database and automatically generating corresponding schema and graphical user interface metadata stored in a repository; and
   user interface software at runtime automatically, and without compilation of code before runtime, developing from the metadata a graphical user interface appropriate to the relational database.

2. The computer software of claim 1 wherein said schema and user interface metadata comprise entities, entity fields, entity relationships, and entity search paths.

3. The computer software of claim 2 wherein said schema and user interface metadata comprise entity relationships comprising one-to-many, many-to-one, and many-to-many relationships.

4. The computer software of claim 2 wherein said schema and user interface metadata additionally comprises platform attributes for abstracting syntactic differences between database implementations.

5. The computer software of claim 3 wherein said automatically developed user interface comprises context menus specific to type of entity relationship.

6. The computer software of claim 1 additionally comprising software permitting addition of non-automatically-generated functionality to said developed user interface selected from the group consisting of scripts, external components, business rules, and triggers.

7. The computer software of claim 1 wherein said utility software refreshes said metadata after schema changes are made to the relational database.

8. Computer apparatus for automatically generating a graphical user interface for a relational database, said apparatus comprising:
   means embodied in a computer readable medium having a set of computer instructions encoded thereon for extracting schema information from the relational database and automatically generating corresponding schema and graphical user interface metadata;
   repository means for containing said metadata; and
   means embodied in a computer readable medium having a set of computer instructions encoded thereon for at runtime automatically, and without compilation of code before runtime, developing from the metadata a graphical user interface appropriate to the relational database.

9. The computer apparatus of claim 8 wherein said schema and user interface metadata comprise entities, entity fields, entity relationships, and entity search paths.

10. The computer apparatus of claim 9 wherein said schema and user interface metadata comprise entity relationships comprising one-to-many, many-to-one, and many-to-many relationships.

11. The computer apparatus of claim 9 wherein said schema and user interface metadata additionally comprises platform attributes for abstracting syntactic differences between database implementations.

12. The computer apparatus of claim 10 wherein said automatically developed user interface comprises context menus specific to type of entity relationship.

13. The computer apparatus of claim 8 additionally comprising software permitting addition of non-automatically-generated functionality to said developed user interface selected from the group consisting of scripts, external components, business rules, and triggers.

14. The computer apparatus of claim 8 wherein said extracting means refreshes the metadata after schema changes are made to the relational database.

15. A method of automatically generating a graphical user interface for a relational database, the method comprising the steps of:
   extracting schema information from the relational database and automatically generating corresponding schema and graphical user interface metadata;
   storing the metadata in a repository; and
   at runtime automatically, and without compilation of code before runtime, developing from the metadata a graphical user interface appropriate to the relational database.

16. The method of claim 15 wherein the schema and user interface metadata comprise entities, entity fields, entity relationships, and entity search paths.

17. The method of claim 16 wherein the schema and user interface metadata comprise entity relationships comprising one-to-many, many-to-one, and many-to-many relationships.

18. The method of claim 16 wherein the schema and user interface metadata additionally comprises platform attributes for abstracting syntactic differences between database implementations.

19. The method of claim 17 wherein the automatically developed user interface comprises context menus specific to type of entity relationship.

20. The method of claim 15 additionally comprising the step of adding non-automatically-generated functionality to the developed user interface selected from the group consisting of scripts, external components, business rules, and triggers.

21. The method of claim 15 additionally comprising the step of refreshing the metadata after schema changes are made to the relational database.

* * * * *